US005555351A

United States Patent [19]

Craig et al.

[11] Patent Number: 5,555,351
[45] Date of Patent: Sep. 10, 1996

[54] HOST COMMUNICATION MESSAGE MANAGER FOR A LABEL PRINTING SYSTEM WITH DATA COLLECTION CAPABILITIES

[75] Inventors: Gina M. Craig, Dayton; James E. Globig, Kettering; Dale E. Lamprecht, Jr., Dayton; James G. Markham, Spring Valley; Donald A. Morrison; Richard E. Schwabe, both of Dayton; Raymond D. Tavener, Kettering; Rex D. Watkins, Franklin, all of Ohio

[73] Assignee: Monarch Marking Systems, Inc., Dayton, Ohio

[21] Appl. No.: 880,718

[22] Filed: May 8, 1992

[51] Int. Cl.⁶ .................................................. G06K 15/00
[52] U.S. Cl. ............................................ 395/114; 395/101
[58] Field of Search ........................... 395/101, 115, 395/116, 114, 250, 275, 117, 112; 235/432, 462, 472, 378, 383, 375; 250/566; 101/93.01, 93.04; 364/401, 402, 403, 404, 405; 400/103

[56] References Cited

U.S. PATENT DOCUMENTS

| | | | |
|---|---|---|---|
| 4,365,148 | 12/1982 | Whitney | 235/383 |
| 4,835,372 | 5/1989 | Gombrich et al. | 235/375 |
| 4,875,174 | 10/1989 | Olodort et al. | 364/519 |
| 5,056,429 | 10/1991 | Hirosaki | 101/93.01 |
| 5,058,055 | 10/1991 | Takemoto et al. | 364/900 |
| 5,202,825 | 4/1993 | Miller et al. | 364/405 |
| 5,287,434 | 2/1994 | Bain et al. | 395/101 |

FOREIGN PATENT DOCUMENTS

WO87/03116 5/1987 WIPO.
WO89/10601 11/1989 WIPO.

OTHER PUBLICATIONS

Patent Abstract of Japan, vol. 12, No. 286 (M–727) 5 Aug. 1988 Publication No. JP63062758 19 Mar. 1988.

Primary Examiner—Mark R. Powell
Assistant Examiner—Dov Popovici
Attorney, Agent, or Firm—McAndrews, Held & Malloy

[57] ABSTRACT

A host communication message manager of a local bar code data processing and printing system allows one or more host processing systems to communicate with the local system to control the maintenance of data including bar code data stored in the local processing system. The host communication message manager also allows one or more host processing systems to communicate with the local system to control the printing of data including bar code data stored in the local system on a bar code printer coupled thereto. The host communication message manager allows both a host processing system in the form of a main frame computer as well as a host processing system in the form of a hand held labeler with data collection capabilities to communicate with the local bar code data processing and printing system to provide an integrated system for data collection, bar code printing and labeling.

79 Claims, 77 Drawing Sheets

HEADCNT, FLDCNT, [GRPCNT:REPEAT,...]
HEAD_DB,FIELD_DB
HEAD_KEY,HEAD_SIZE,FIELD_KEY, FIELD_SIZE,FIELD_SEQ,KEY_DUP,KEY_TYPE
DESTQUEUE
PRINTER LIST
NAME,LEN,FILL,DIR,TYPE
   ...
   ...
   ...
NAME,LEN,FILL,DIR,TYPE

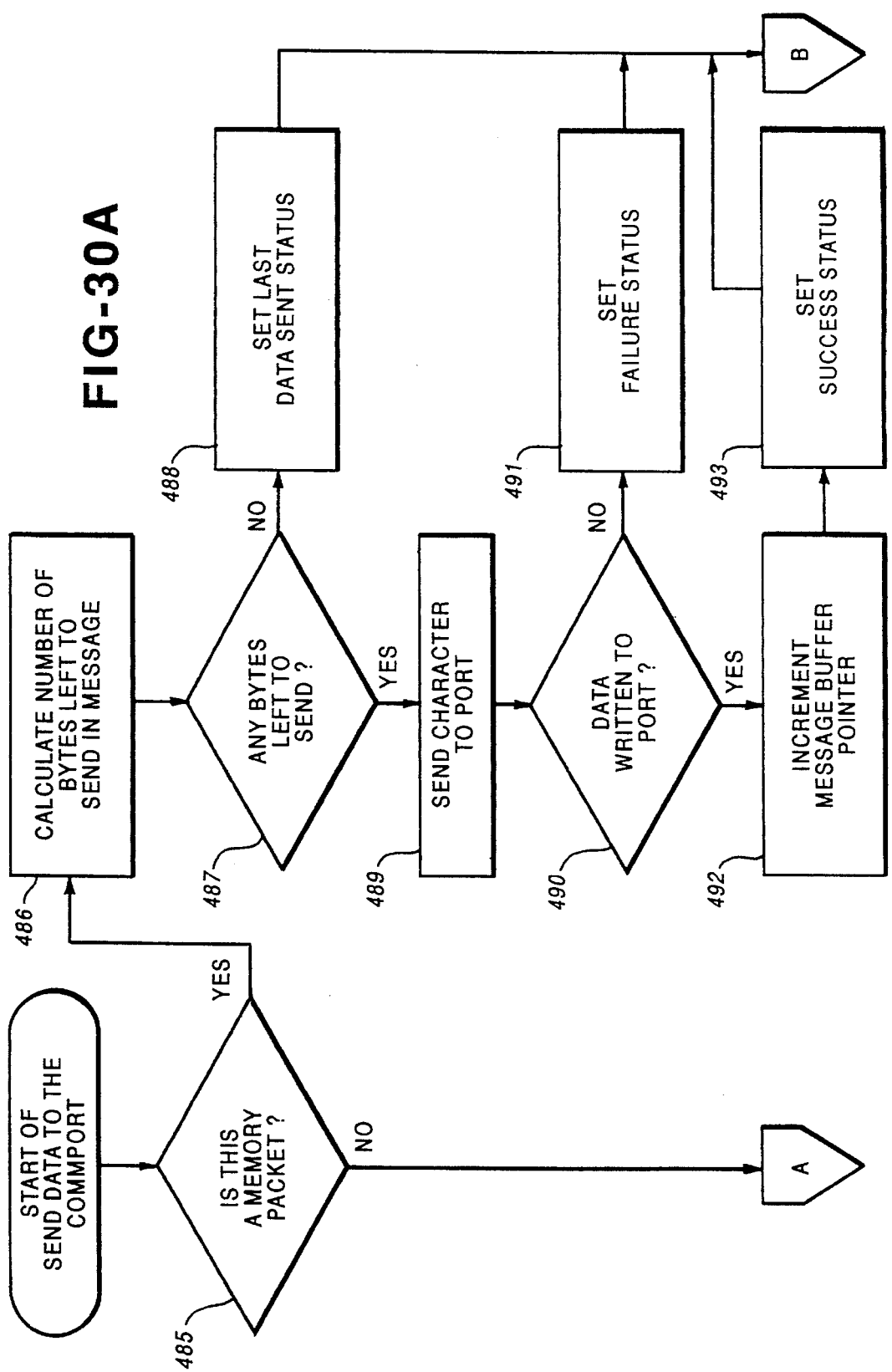

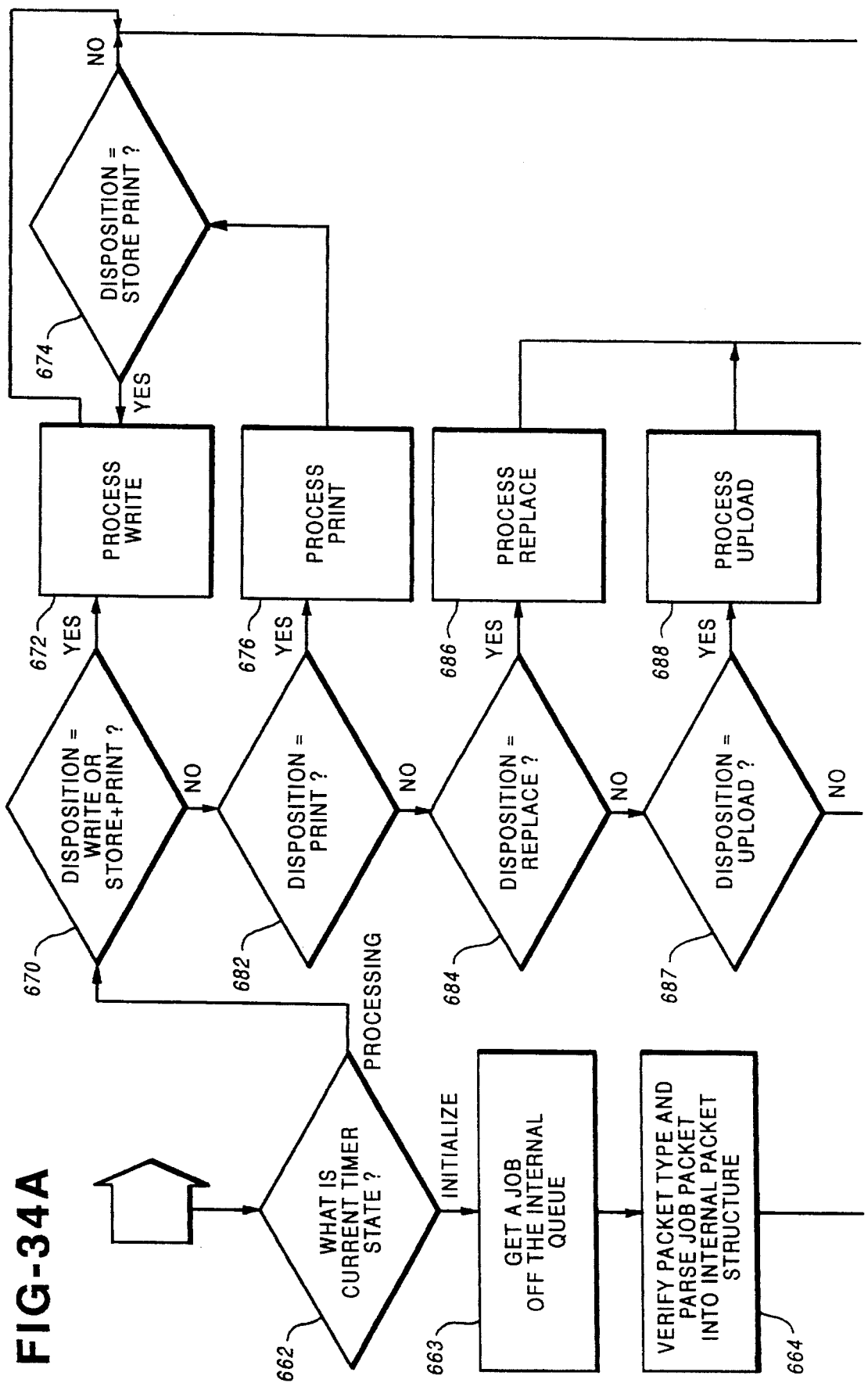

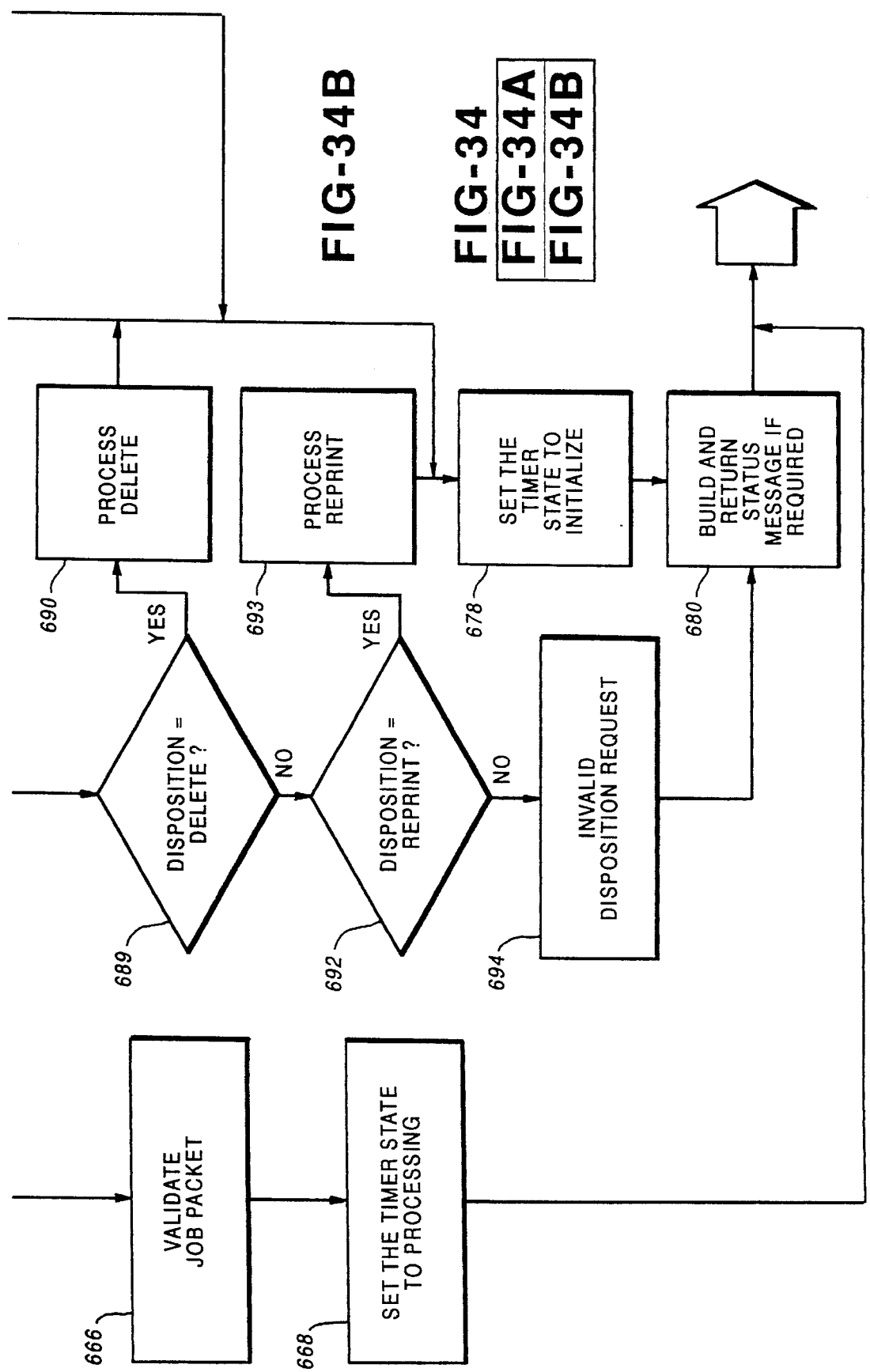

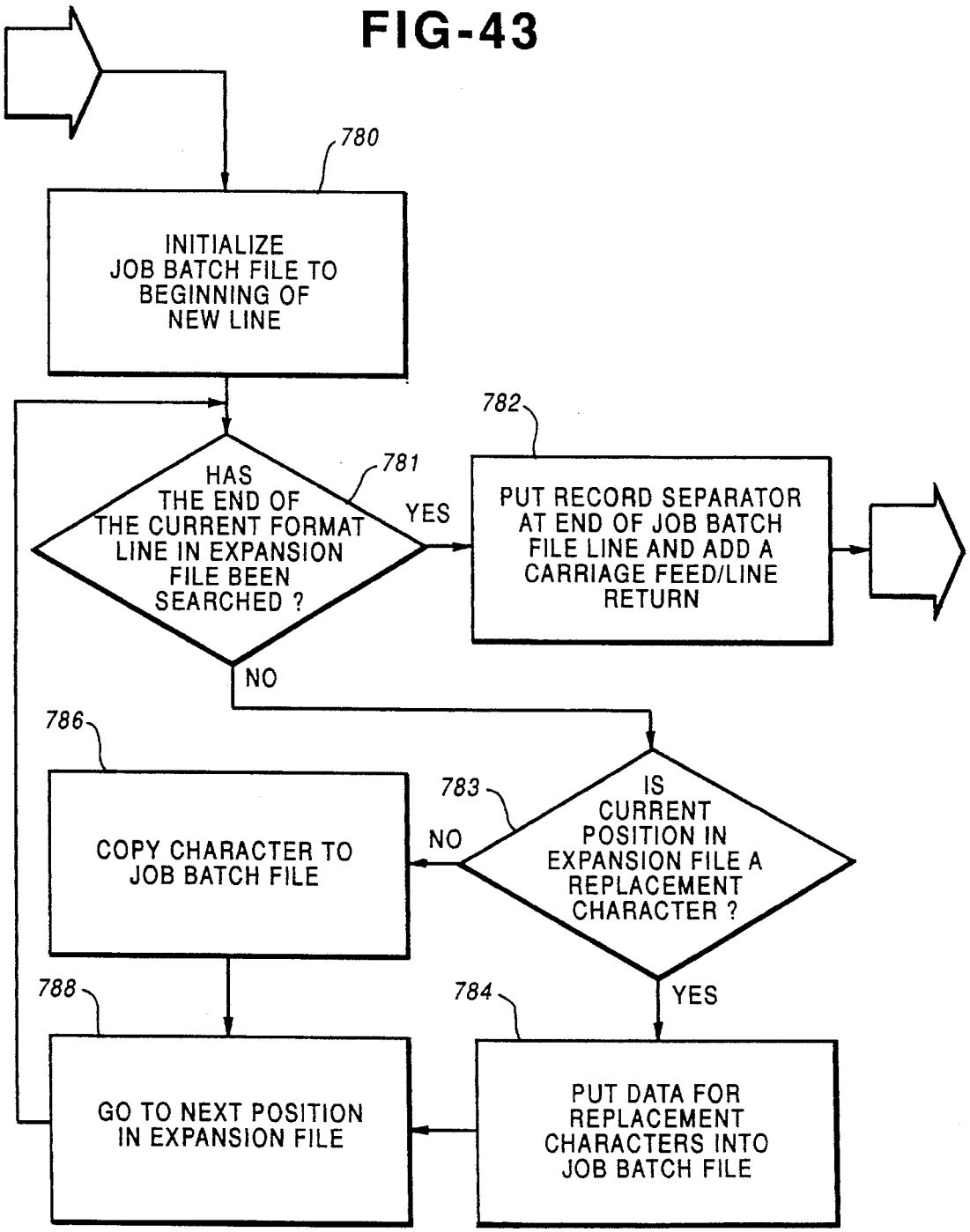

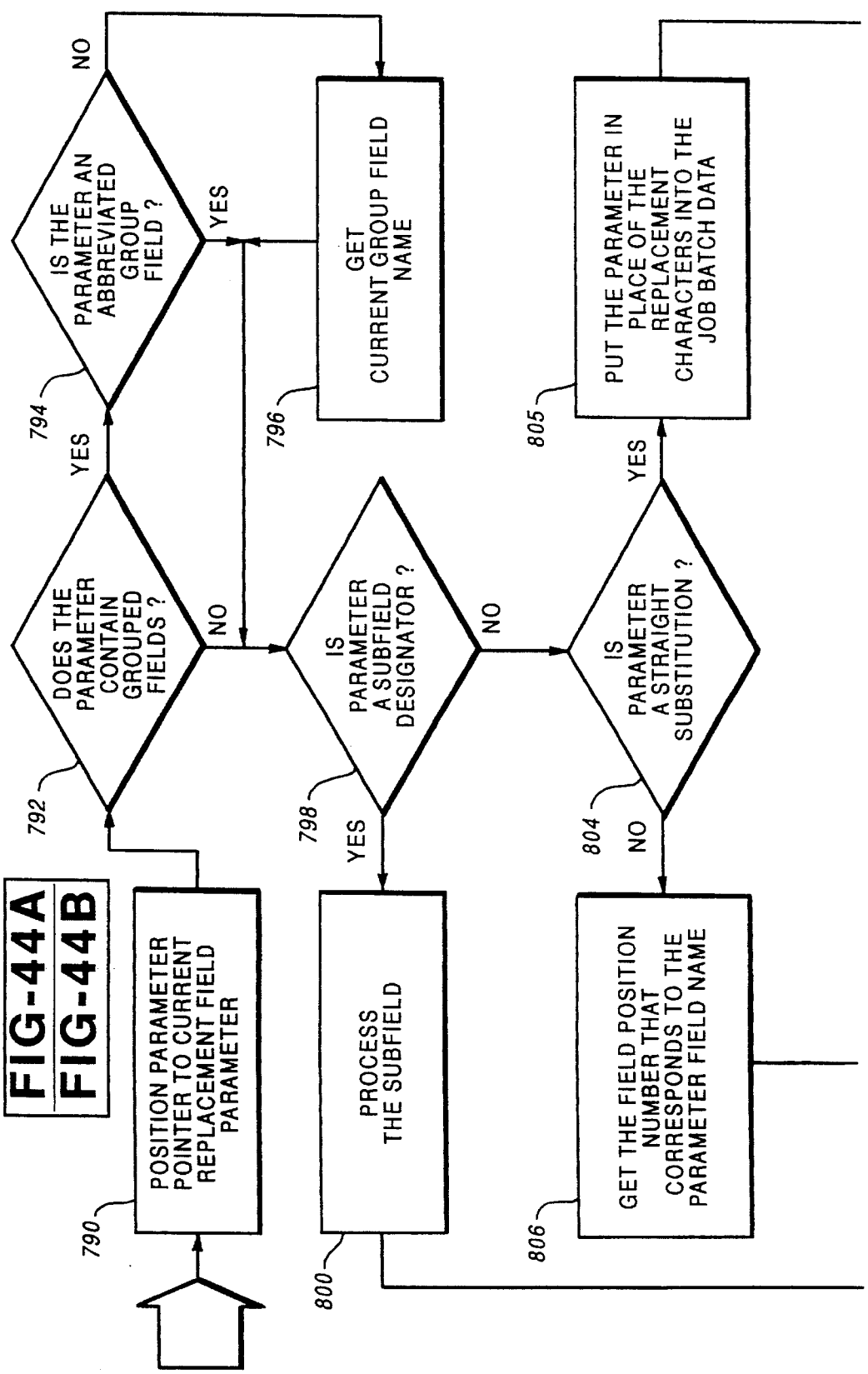

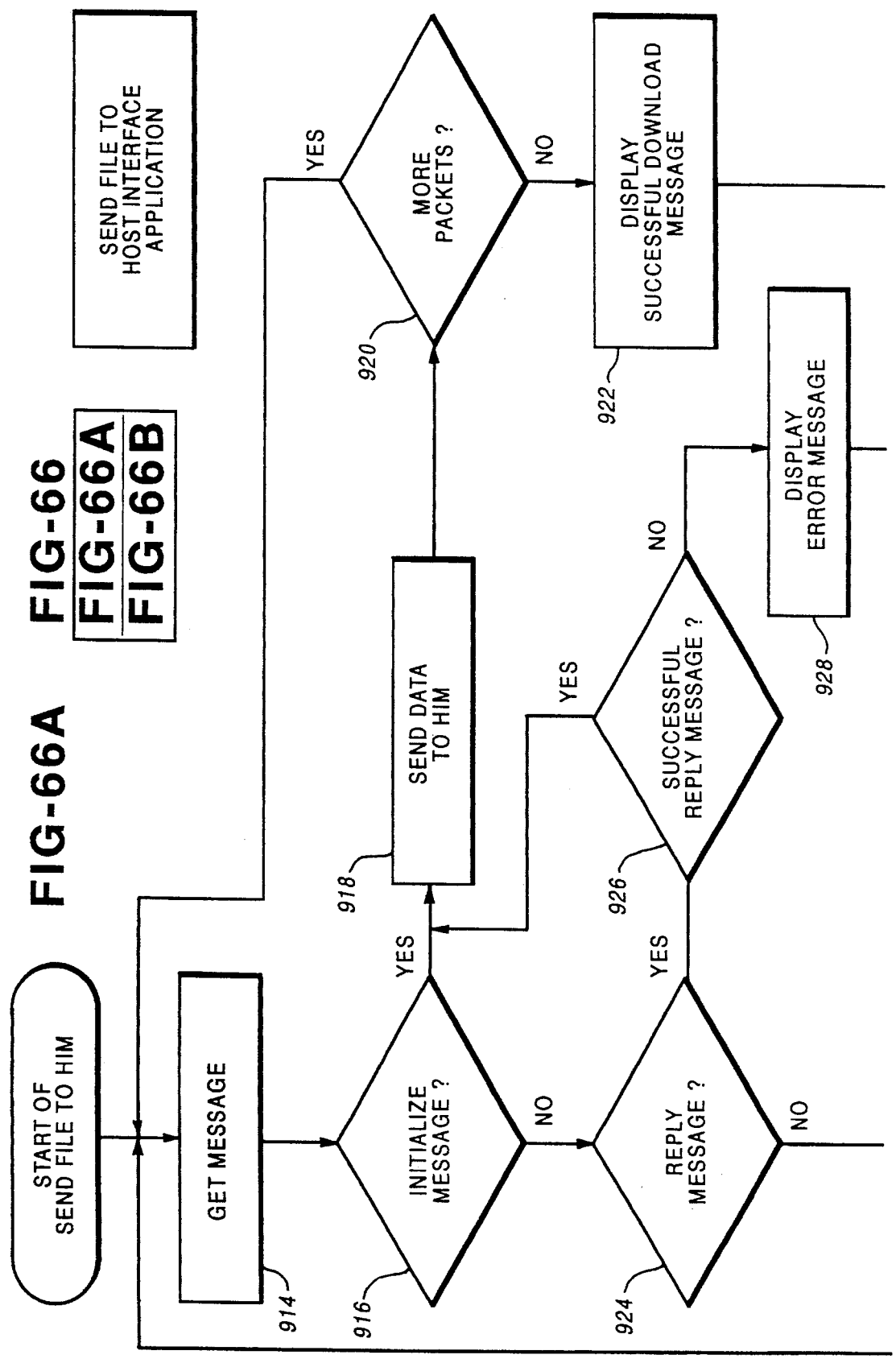

FIG-68

```
{
    WORD wNextMsg;                  /* handle to next message link */
    ULONG ulSequence;               /* incrementing packet sequence (1 is first) */
    union {                         /* flag union */
        WORD wFlags;                /* flags */
        struct {
            WORD fMemory:1;         /* memory/file message type */
            WORD fPCRequest:1;      /* PC request flag */
            WORD fNoSend:1;         /* message with no data to send */
            WORD fJournal:1;        /* flag indicating app journalling is on */
            WORD fReserved:12;      /* reserved for future */
        };
    };
    CHAR szKeyTag[3];               /* key tag identifier string */
    HANDLE hStatMsg;                /* handle to PC initiated status message */
    CHAR szName[78];                /* name of this message */
    union {                         /* address union */
        CHAR szReturnAddress[9];    /* return address */
        CHAR szDestination[9];      /* destination address */
    };
    union {                         /* data packet union */
        CHAR szMessage[512];        /* message data */
        CHAR szFileName[78];        /* file name of data */
    };
} HOSTMSG;
```

FIG-69

| STAFF ID | FIRST NAME | LAST NAME | HIRE DATE | CITY | STATE | SALARY | STATUS |
|---|---|---|---|---|---|---|---|
| 9861 | JOE | SHMO | 9/10/61 | MIAMISBURG | OHIO | 50,000 | 1 |
| 9865 | TOM | JOHNSON | 6/9/79 | VANDALIA | OHIO | 60,000 | 2 |
| 9654 | DICK | JOHNSON | 6/9/79 | DAYTON | OHIO | 35,000 | 1 |
| 7653 | HARRY | JOHNSON | 6/9/69 | DAYTON | OHIO | 32,000 | 1 |
| 6291 | LARRY | SMITH | 2/30/73 | COVINGTON | KENTUCKY | 15,000 | 1 |
| 6290 | MO | JONES | 12/20/85 | KETTERING | OHIO | 27,000 | 2 |
| 8090 | CURLY | JACKSON | 10/4/90 | KETTERING | OHIO | 33,000 | 3 |

FIG-70

DATABASE STORAGE FOR HEADER ("HANGTHDR.DBF")

| JOB NAME | VEND NO. | SEACODE |
|---|---|---|
| 06261991 | 934 | 022* |

FIG-71

DATABASE STORAGE FOR LINE ITEM ("HANGTLNE.DBF")

| JOB NAME | SEQ | SKUNUM | PRICE | STORE001 | QTY001 | STORE002 | QTY002 | STORE003 | QTY003 |
|---|---|---|---|---|---|---|---|---|---|
| 06261991 | 001 | 5143037823 | 1543 | NORTH | 0024 | WEST | 0012 | SOUTH | 0020 |
| 06261991 | 002 | 5143037821 | 1655 | EAST | 0024 | NORTH | 0015 | | 0000 |
| 06261991 | 003 | 5143037822 | 2995 | CENTRAL | 0036 | | 0000 | | 0000 |

HOST COMMUNICATION MESSAGE MANAGER FOR A LABEL PRINTING SYSTEM WITH DATA COLLECTION CAPABILITIES

TECHNICAL FIELD

The present invention is directed to a host communication message manager for a local bar code data processing and printing system to allow one or more host processing systems to communicate with the local system to control the maintenance and printing of data, including bar code data, stored in the local system. The host communication message manager of the present invention allows both a host processing system in the form of a main frame computer or the like as well as a host processing system in the form of a hand held labeler with data collection capabilities to communicate with the local bar code data processing and printing system to provide an integrated system for data collection, bar code printing and labeling.

BACKGROUND OF THE INVENTION

Known local bar code data processing and printing systems used at distribution centers such as a warehouse typically include a bar code printer for printing bar codes and related alphanumeric information on tags, labels or the like. Such systems can typically receive data from a single host computer, such as a main frame computer at a distribution center for printing only. In these known systems, the data transferred from the main frame computer is in the form of a purchase order wherein the local system translates the purchase order data into a print job for a bar code printer. Each field of data in a record of the print job is typically identified by an ordered numeric representing the field's position relative to other fields in the record. This results in a very rigid structure for data transmission making it very difficult to add one or more new data fields to a print job in the middle of a record. Further, because these local systems can typically receive data from the host computer only for printing they do not allow the distribution center main frame computer to control the maintenance and/or manipulation of data stored at the local processing system.

SUMMARY OF THE INVENTION

In accordance with the present invention, the disadvantages of prior local bar code processing and printing systems have been overcome. The local bar code data processing and printing system of the present invention includes a host communication message manager to allow one or more host processing systems to communicate with the local system to control the maintenance and printing of data including bar code data stored in the local processing system. The host communication message manager of the present invention allows both a host processing system in the form of a main frame computer or the like as well as a host processing system in the form of a hand held labeler with data collection capabilities to communicate with the local bar code data processing and printing system to provide an integrated system for data collection, bar code printing and labeling.

More particularly, the local bar code data processing and printing system includes a memory for storing data and at least one bar code printer that is coupled to the local system. The host communication message manager of the local bar code data processing and printing system includes a message handler means that is responsive to a message received from a host processing system for performing one or more allowable operations identified in the message on data also identified in the message. The allowable operations performed by the message handler include a data modification operation to modify data stored in the memory of the local bar code data processing and printing system. The allowable operations also include a data transfer operation to upload data to the host processing system from the local system. A further allowable operation is a data print initiation operation to initiate the printing of data by the bar code printer coupled to the local system. The host communication message manager also includes means for receiving a message from the host processing system and for routing each received message to one of a number of message handlers included in the message handler means.

The host communication message manager of the present invention allows data collected by a labeler host processing system to be received and stored in a memory of the local bar code data processing system. Once the collected data from the labeler is stored, the host communication message manager allows a different host processing system to perform one or more allowable operations on the collected data including a data print initiation operation to initiate the printing of data collected by the labeler on the bar code printer of the local bar code data processing and printing system. Data collected by the labeler host processing system may also be uploaded via the host communication message manager to the other host processing system.

The data collected by the labeler includes header data and line item data. This is the same type of data that may be received from another host processing system so as to initiate a print job on the bar code printer of the local system. Therefore, data received from the labeler host processing system by the local system can easily be combined with data from another host processing system for data collection and/or to form a print job to be printed on a bar code printer at the local system.

The data modification operations performed at the local bar code data processing and printing system as directed by a host processing system include adding data records, deleting data records, searching for selected data records, etc. The data fields within a data record are identified by user assigned names as opposed to numbers so as to greatly simplify the modification of data stored in the local processing system.

The local processing system further includes a display and a user actuable input device to allow a user to select an allowable operation to be performed on data stored in the local processing system. The host communication message manager is responsive to a user selected operation to generate a host message that is coupled to the message handler system to perform the selected operation.

These and other objects, advantages and novel features of the present invention as well as details of an illustrated embodiment thereof, will be more fully understood from the following description and the drawing.

BRIEF DESCRIPTION OF THE DRAWING

FIGS. 30A–B form a flow chart illustrating a Send Data to Commport software routine;

FIG. 34A–B is a flow chart illustrating a Process Timer Message software routine for the DCPS Packet Handler;

FIG. 43 is a flow chart illustrating a Expand the Current Expansion File Format Line into the Job Batch File software routine for the DCPS Packet Handler;

FIG. 44A–B is a flow chart illustrating a Put Data for Replacement Characters into Job Batch File software routine for the DCPS Packet Handler;

FIG. 66A–B is a flow chart illustrating a Send File to Host Interface Application software routine for the Labeler Data Transfer Packet Handler;

FIG. 68 is an illustration of the structure of a message sent between the host interface module and packet handler application;

FIG. 69 is an illustration of a database table for employees.

FIG. 70 is an example of the database storage for header data; and

FIG. 71 is an example of the database storage for line item data.

DESCRIPTION OF THE PREFERRED EMBODIMENT

Figure 1:
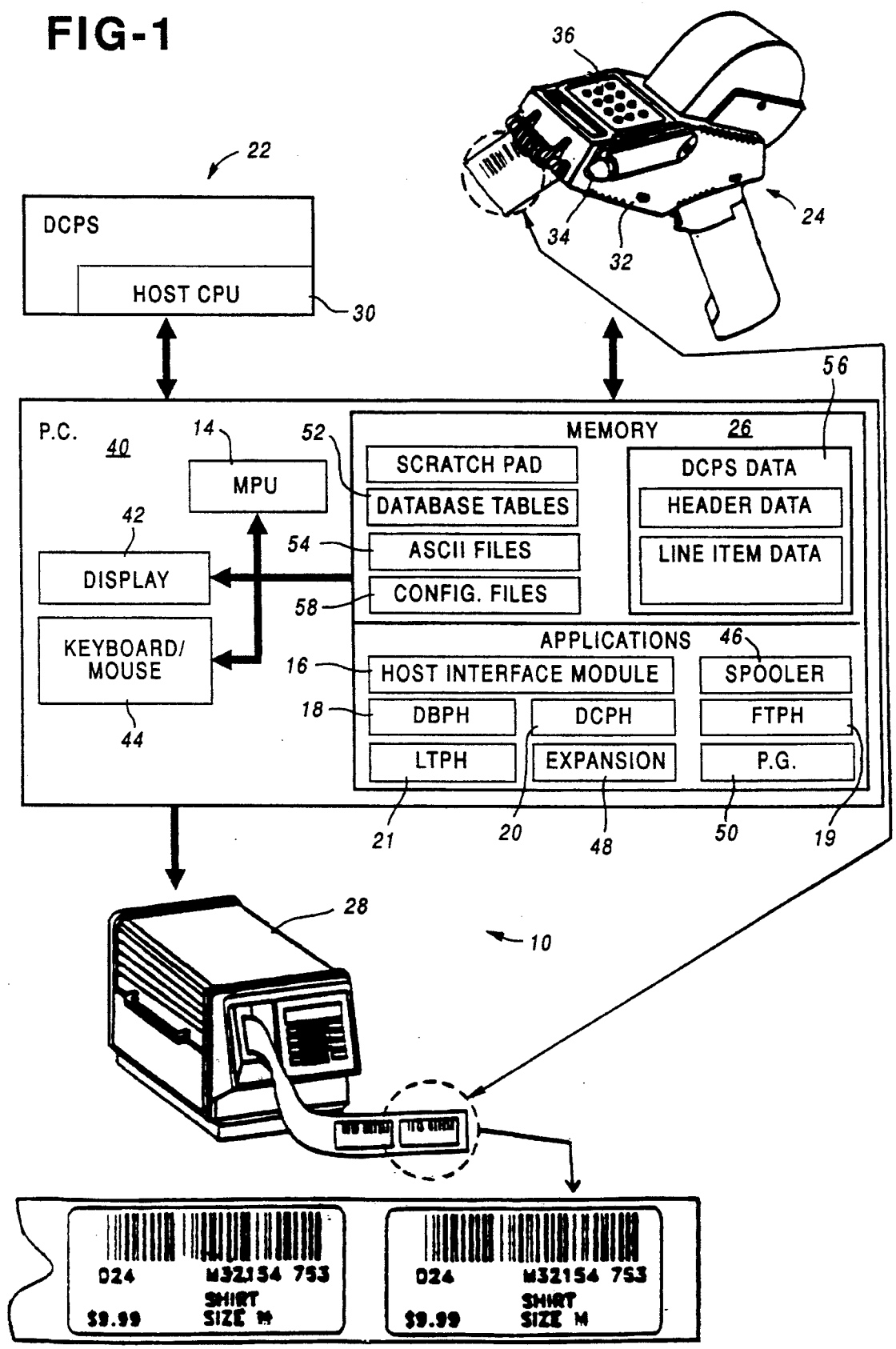
FIG. 1 is block diagram of the integrated system of the present invention illustrating a local bar code processing and printing system and a pair of host processing systems in accordance with the present invention.

The local bar code data processing system 10 of the present invention, as shown in FIG. 1, includes a microprocessor 14 that operates in accordance with a host interface software module 16 and a number of packet handlers 18–21 to control communications between the local system 10 and one or more host processing systems 22 and 24. The host interface module 16 and packet handlers 18-21 further allow one or more of the host processing systems to control the maintenance of data stored in a memory 26 of the local system 10 and to control the printing of data including bar code data on a bar code printer 28. One of the host processing systems may, for example, include a main frame computer 30 or the like of a distribution center processing system, DCPS, which may be located at a warehouse or the like. One of the host processing systems may also take the form of a hand held labeler 32 with data collection capabilities.

A suitable labeler 32 is described in detail in U.S. patent application Ser. No. 07/858,703, entitled "Programmable Hand Held Labeler" filed Mar. 27, 1992, which application is assigned to the assignee of the present invention and incorporated herein by reference. As described therein, the labeler 32 includes a scanner 34 for scanning bar code data and a keyboard 36 for entering data into the labeler. The labeler 32 includes a memory for storing collected data in the form of header data and line item data in a data collect file. The memory of the labeler 32 also stores a look up table that associates data including bar code data with other types of data such as alphanumeric data. The look up table stored in the labeler 32 can be modified by data input into the labeler 32 via the scanner 34 and/or keyboard 36. The labeler 32 may be coupled to the local system 10 via a RS 232 communication interface or the like for communication therewith. Alternatively, the labeler 32 and the local system 10 may use a R.F. communication link to communicate.

The labeler 32 is capable of receiving a configuration file from the local system 10 that includes a software routine for controlling the operation of the labeler 32 as well as various definition records defining the configuration of various buffers needed by the labeler 32 to implement the software routine. The labeler 32 is also capable of receiving a look up table from the local processing system to aid in the collection of data and the printing of data on labels. The data stored in the data collect file of the labeler 32 may be transmitted to the local system 10 for storage in the memory 26, for printing on a label, tag or the like via the bar code printer 28, or for uploading to the host computer 30 of the DCPS processing system 22 as discussed in detail below. It is noted that the DCPS host computer 30 can communicate with the local processing system 10 via either a RS232 communication interface or the like, or via a RF communication link.

The local bar code data processing and printing system 10 may take the form of a personal computer (P.C.) 40 having a display 42 and a user input device(s) 44 such as a keyboard and/or mouse. The microprocessor 14 of the P.C. 40 operates in accordance with application software including the host interface module 16 and packet handlers 18–21 to receive and process messages from one or more of the host processing systems 22 and 24. As discussed in detail below, one of the host messages capable of being processed by the microprocessor 14 in accordance with the host interface module includes a Print message to cause the initiation of the printing of job data, in the form of header and line item data, by a bar code printer 28 that is coupled to the P.C. 40. The microprocessor 14 operates in accordance with a spooler application program 46 to distribute print jobs among a number of bar code printers only one of which, printer 28, is shown. The microprocessor 14 also operates in accordance with an expansion application program 48 to translate the job data into data capable of being handled by a printer 28. The spooler and expansion applications are described in detail in U.S. patent application Ser. No. 07/783,765 entitled "Bar Code Identification System Spooler" filed Oct. 8, 1991, which application is assigned to the assignee of the present invention and incorporated herein by reference. The microprocessor 14 may also operate in accordance with an application program generator 50 to aid a user in generating a software program for the labeler 32 to control the operations thereof. A suitable application program generator is disclosed in U.S. patent application Ser. No. 07/869,253 entitled "Label Printing and Data Collection Program Generator" filed Apr. 15, 1992, which application is assigned to the assignee of the present invention and incorporated herein by reference.

The host interface module 16 and the packet handlers 18–21 form a host communication message manager that manages data exchanges between one or more of the host processing systems 22 and 24 and the P.C. 40. The uploading and downloading of data to and from the P.C. 40 may be initiated by a host processing system 22, 24 via online commands or messages; by a user via the display 42 and user input device 44 or, as will be apparent, by any other application software stored in the memory 26 that is capable of generating an allowable "host" message. The data manipulated by the host communication manager is stored in a data base portion of the memory 26. The data manipulated can be a database packet 52 such as a look up table for the labeler 32; an ASCII file packet 54, such as any P.C. file in any data format; a DCPS job packet 56, including header and line item data from either the DCPS host processing system 22 and/or the data collect file of the labeler 32; or a labeler configuration file 58 including an application program for the labeler 32 as well as configuration records and a look up table for the labeler.

The host interface module 16 as discussed in detail below is the central location for sending and receiving messages. The host interface module 16 is message independent except for a first few characters that identify the message type so that the host interface module can send the message using a router table to the appropriate application software or packet handler 18–21 that processes that message. The host interface module 16 assembles together incoming message packets and based upon a packet's key tag, the first tag of the message, the module 16 routes the packet to a specified packet handler 18–21. Incoming packets are stored in an internal queue. The information needed for connecting a packet to a specific packet handler is stored in a router initialization file that is read upon start up of the host interface module 16. The host interface module 16 performs a communication port monitoring process that is referred to as a session wherein each session has an associated name, communication port and parameters. Multiple sessions can be configured to the same communication port but only one session runs at any given time. Two sessions can be run at the same time, however, as long as each of the sessions is associated with a different communication port. For example, the local system 10 can communicate via one communication port used to communicate with the labeler 32 and via a second communication port used to communicate with the DCPS computer 30.

The host interface module 16 is primarily an unattended gateway to allow a host processing system to perform remote database update and maintenance, file maintenance and DCPS job data maintenance and printing without the need for interaction with a user at the P.C. 40. However, a user is allowed to perform selected requests at the P.C. 14. Allowable user requests include the ability of a user to configure the destination session of an upload request; to upload a sequential file; to upload a database or portion thereof; to upload a DCPS job; to configure the destination spooler queue for DCPS jobs to be printed; to reprint a DCPS job even if it is not stored on a history queue associated with the spooler; to configure the labeler 32; and to send a look up table to the labeler 32. The host interface module as discussed in detail below provides a dialogue with the user to prompt the user for information, the host interface module building a "host" message from the user entered information that is routed by the host interface module 16 to the appropriate packet handler as discussed in detail below.

The structure of a message sent between the host interface module 16 and the packet handlers 18–21 is depicted in FIG. 68. A wNextMsg portion of the message is reserved for the applications to link packet messages together. The ulSequence portion of the message is a value that starts at 0 and is such that each new packet received from a host processing system 22, 24 will increment this value by 1000. This allows for tracking a host message with response packets. The wFlags portion of the message includes the following flags: a Memory flag that signifies that the entire packet message is within the message buffer; a PCRequest flag that signifies that the initial host request message was initiated by a user on the P.C. 40 and was not initially received from a host processing system 22, 24. A NoSend flag signifies that the packet handler has a message to display but has no data to be sent to the host processing system 22, 24; and a Journal flag that indicates to the appropriate packet handlers that application journalling is on or off. The szKeyTag portion of the message is the first tag of the packet which identifies the packet type, as discussed below, as being associated with a particular packet handler. The hStatMsg portion of the message is used for P.C. 40 initiated requests by the packet handlers. When set, this portion of the message contains a handle of the completion message to be displayed to the user upon successful completion or, in the case of an error to be displayed immediately to the user. The szName portion of the message identifies the name of the message. A szReturnAddress/szDestination refers to the logical name of the host processing system. It is the session name from which the host message originated and is reset as the destination when returning a resulting packet back to the host processing system 22, 24. A szMessage/szFileName portion of the message is either the actual packet message if it fits within, for example, 512 bytes, or it is name of the file holding the packet message for larger messages. The maximum packet size may be limited, for example, to 30,000 characters. Any packet larger than the maximum size will be rejected by the host interface module and a negative response returned to the host processing system 22, 24.

The packet handlers 18–21 are specific software modules that communicate with a host processing system 22, 14 through the host interface module 16. Each of the packet handlers 18–21 is automatically started up by the host interface module 16 as needed. The host interface module 16 sends messages to the packet handlers 18–21 and depending upon the type of message, the packet handler either stores the incoming message on its own message queue or processes the message immediately. The packet handler then responds with a success or failure status so that the host interface module 16 can return a positive or negative acknowledgement to the host processing system 22, 24.

The database packet handler 18 performs database maintenance functions for the database tables 52 based upon the message received from the host processing system 22, 14. Whenever a host processing system sends a data base packet, the host interface module assembles the packet and sends it to the database packet handler 18 which performs the functions requested within the message packet. The database packet handler 18 is set up in the router table of the host interface module 16 to process all packets with the key tag, "D.M." The database packet handler 18 provides the host with the ability to perform remote database updates and maintenance without user interaction at the P.C. such as: to insert new records in a database table; to select records from a table to be sent from the P.C. 40 to a host processing system; to update a database table so that a host processing system can change entire records, certain columns of a record or records based on a search criteria; and to delete, i.e. remove, records for an entire database file from the P.C. 40 remotely at any time. As discussed in detail below, a "W" (Write) command is used to carry out the insert function. A "U" (Upload) command is used to carry out the selection function. An "R" (Replace) command is used to carry out the update function and a "D" (Delete) command is used to carry out the delete function of the database packet handler.

Each database packet must begin with the DM key tag that uniquely identifies the packet as a database packet. The DM key tag is followed immediately by a DP tag that defines the operation to be performed on the chosen data base table. The DP tag may be set equal to W for a Write operation, U for an Upload operation, R for a Replace operation or D for a Delete operation. A completion tag CP, which may be optional, specifies whether the database packet handler 18 should send back a completion status or not. When the CP tag is set equal to 3, this tag will cause the packet handler 18 to return a response for the host processing system. When the CP tag is set equal to 0, the tag indicates a successful completion; whereas when the tag is set equal to a value of 100 or greater, the tag indicates a failure. If the CP tag is missing from the message request or if the tag has a value of 2, then no response will be sent back to the host processing system. It is noted that if this tag is placed immediately after the DM tag, then its effect is global to the packet. If the tag is placed after the DP tag, then its effect is only for that function. The CP tag may also be present in both places at the same time. For example, the host processing system can turn off all responses globally for the packet by including a CP=2 tag and including a CP=3 tag for only the functions for which it needs a response returned. A database subfunction tag DS, may be set equal to R for record or T for table. This tag may be optional and provides the user the selection of performing the designated operation on the whole database table or just an individual data record in the database table, with the default value being R for record operations. A key manipulator tag, SD has the following syntax:

SD="[Column Name|Column Number]:High Value:Mode[:Low Value]".

The first field in the key manipulator tag identifies the column to manipulate either by column name or column offset with the first field being one. The second field identifies the data value to be used as either a single limit for an operator comparison or the high value of a range comparison. The third field which may be optional, identifies a search method. There are two types of search methods, an operator search and a range search. An operator search comparison takes the form of SD="DEPT:123:GE" where the packet handler will select all records greater or equal to 123. The range comparison allows the specification of high and low bounds in the search. The search SD="DEPT:12:GELT:100" will select all records where the DEPT field is greater or equal to 12 and less than 100. If the field is not present then the default value is EQ (equal to). The various options available for this field for an operator search are: EQ (equal to), GE (greater than or equal to) and GT (greater than). The options that are valid for this field for a range search are GELE (greater than or equal to high and less than or equal to low), GELT (greater than or equal to high and less than low), GTLE (greater than high or less than or equal to low) and GTLT (greater than high and less than low). It is noted that the fourth field used with the SD tag identifies the data value to be used as the low value of a range comparison. A field data manipulator tag DF has the syntax DF="[Column Name|Column Number]:Value".

The first field in the DF tag identifies the column to manipulate either by column name or column offset with the first field being one. The column name can be up to ten characters with the first character being a letter. The second field identifies the data value. A record manipulator tag DR has the following syntax:

DR="Field1,Field2,Field3, . . . ,FieldN".

The DR tag identifies a whole record with each column or field in the record being specified. A result field manipulator RT has the following syntax:

RT="[Column Name|Column Number], . . .".

The RT tag is used when the database function is a request to select records from a database. The tag allows for selectively choosing what fields of a database record are to be returned. If the tag is not present, then all of the fields of each record selected will be returned.

FIG. 69 represents an example of a database table listing each employee's staff identification number, first name, hire date, city, state, salary and status. It will be used to illustrate the following data base operations. For example, the database packet handler 18 will respond to a request of { DM = "Employee" DP = D CP = 3 SD = "1:6290:LT" SD = "State:Ohio" } with the response:

{ DM = "Employee" DP = D CP = 0 }.

In this example, the database packet handler 18 is responsive to the request to delete all records in the "Employee" database table depicted in FIG. 69 which records match the search conditions of the first column being less than "6290" and the column defined as "State" matching "Ohio". If a host processing system wanted to delete the "Employee" database table, a message request of for example {DM="Employee" CP=3 DP=D DS=T} would be sent and the packet handler 18 would respond with

{DM="Employee" DP=D CP=0 DS=T}.

An example of the inserting of records into a database table is as follows:

{ DM = "Employee"
DP = W
CP = 3
DR = "7789,George"
DR = "1267,Fred,Leadbottom"
DR ="9346,,,8/23/90,Miamisburg,,24,000"
}

This database packet will insert three records into the employee database table. The first record will insert data for the first two columns of the database table. The second record will insert data for the first three columns of the database table. Finally, the third record will insert data for the first, fourth, fifth and seventh columns of the database table. In response to such a request, the database packet handler will return a response of {DM="Employee" DP=W CP=0}

An example of a request to update a record is as follows:

{ DM = "Employee"
DP = R
CP = 3
SD – "1:8090"
SD = "State:Ohio"
DF = "2:Joe"
DF = LastName:Schmo"
}

This database packet request will cause the database packet handler 18 to update the record with the first field containing "8090" and the "State" field containing "Ohio" with the second field being updated to "Joe" and the "LastName" field being updated to "Schmo". An example of the selection of a database record request is as follows:

{ DM = "Employee"
DP = U
SD = "1:8090:LE"
SD = "1:6290:GT"
RT = "StaffID,FirstName,LastName,City,State"
DR ="9346,,,8/23/90,Miamisburg,,24,000"
}

The database packet handler will respond to this request by uploading the records from the employee database table that match the search condition of the first field, i.e. those records whose first field is less than or equal to "8090". Whereas a failed response will not contain any DR tags, a successful response will be as follows:

```
{ DM = "Employee"
  DP = U CP = 0
  DR = "6291,Larry,Smith,Covington,Kentucky"
  DR = "7653,Harry,Johnson,Dayton,Ohio"
  DR ="8090,Curly,Jackson,Kettering,Ohio"
}
```

A file transfer packet handler 19 performs the maintenance of P.C. files based upon file transfer message packets received from a host processing system. The file transfer packet handler 19 is set up in the router table of the host interface module 16 to process all packets with the key tag FF. The file transfer packet handler 19 carries out a write function that allows a host processing system the ability to send data to be written to a file or to be appended to an existing file; a read function that allows a host processing system to request a file to be sent to the host from the P.C. 40; and a delete function to allow a host to remove files from the P.C. 40. The write function is carried out utilizing a "W" (Write) command and an "A" (Append) command. The read function is carried out by a "U" (Upload) command and the delete function is carried out by a "D" (Delete) command. Each file transfer packet must begin with FF key tag which uniquely identifies the packet as a file transfer packet and names the PC file that this packet will reference. The FF tag is followed by a DP tag that defines the file function or operation to be performed on the identified file. As discussed above, the DP tag may be set equal to W for Write, U for Upload, D for Delete or A for Append. The completion tag CP is as discussed above for the database packet handler. Further, a tag AT designates an ASCII transfer. An example of a request to write a file to the PC is as follows:

```
{ FF = "d:\platform\formats\test.fmt"
  DP = W CP = 3
  AT = "[F,1,C,R,M|}"
}
```

This request is responded to by the file transfer packet handler 19 creating or overwriting the file "test.fmt" in the directory "d:\platform\formats". The file transfer packet handler 19 will then return a response of {FF= "d:\platform\format\stest.fmt" DP=W CP=0}

A distribution center packet handler 20 takes incoming DCPS job packets, i.e. header and line item data packets from either a distribution processing system CPU 30 or from the data collect file of the labeler 32 and stores these packets as an internal data file. If the DCPS data is to be printed, the data is placed in a file for pre-expansion by a portion of the DCPS packet handler and then sent to the spooler and expansion applications 46 and 48. The data is then used with corresponding expand and configuration files to build a series of batch packets. These batch packets are passed back to the expansion application 48 for further processing and to the spooler application 46 for routing to the selected bar code printer 28 for printing. The distribution center packet handler 20 is set up in the router table of the host interface module 16 to process all packets with the key tag JT. The distribution center packet handler provides a host processing system 22, 24 with the ability to perform remote job maintenance and printing without user interaction at the P.C. 40. More specifically, this packet handler allows a host processing system to add jobs, i.e. header and line item data to the local processing system 10; to replace an entire job with a new one; to store and print a job so that a host processing system can add job data and print it utilizing one request; to delete or remove records or entire tables from the P.C. 40; to upload job information back to a host processing system; and to reprint a job that has previously been sent to the spooler even though it may not be maintained on a history queue. The add function is implemented utilizing a "W" command. The replace function is implemented utilizing an "R" command, the print function is implemented utilizing a "P" command, the store and print function is implemented utilizing an "S" command, the delete function is implemented using a "D" command, the upload function is implemented utilizing a "U" command and the reprint function is implemented using a "T" command. Each DCPS packet must begin with the JT key tag which uniquely identifies this packet as a DCPS packet as well as identifying which expand and configuration files to use. The JT tag is followed by a JN tag to define a unique job name for the DCPS packet. A key tag DP is used to define the operations to be performed. For example, the DP tag may be set equal to W for Write, R for Replace, P for Print, S for Store and Print, D for Delete, U for Upload or T for Reprint. The completion tag, CP, is also utilized in a DCPS packet as discussed above with respect to the database handler packet. The key tag HD has the syntax: HD="field1,field2, . . . fieldx". This header data tag will support up to, for example, 250 fields with a maximum of, for example, 254 characters per field. The header data tag, HD, defines the field data to be used when expanding different header batches. A line data tag, LD, has the following syntax: LD="field1,field2, . . . fieldx". This line data tag will support 250 fields with a maximum of 254 characters per field, for example. An example of a request to delete a job from the data base is as follows: {JT="HANGTAG" JN="PO1234" DP=D CP=3}.

Figures 18, 19:
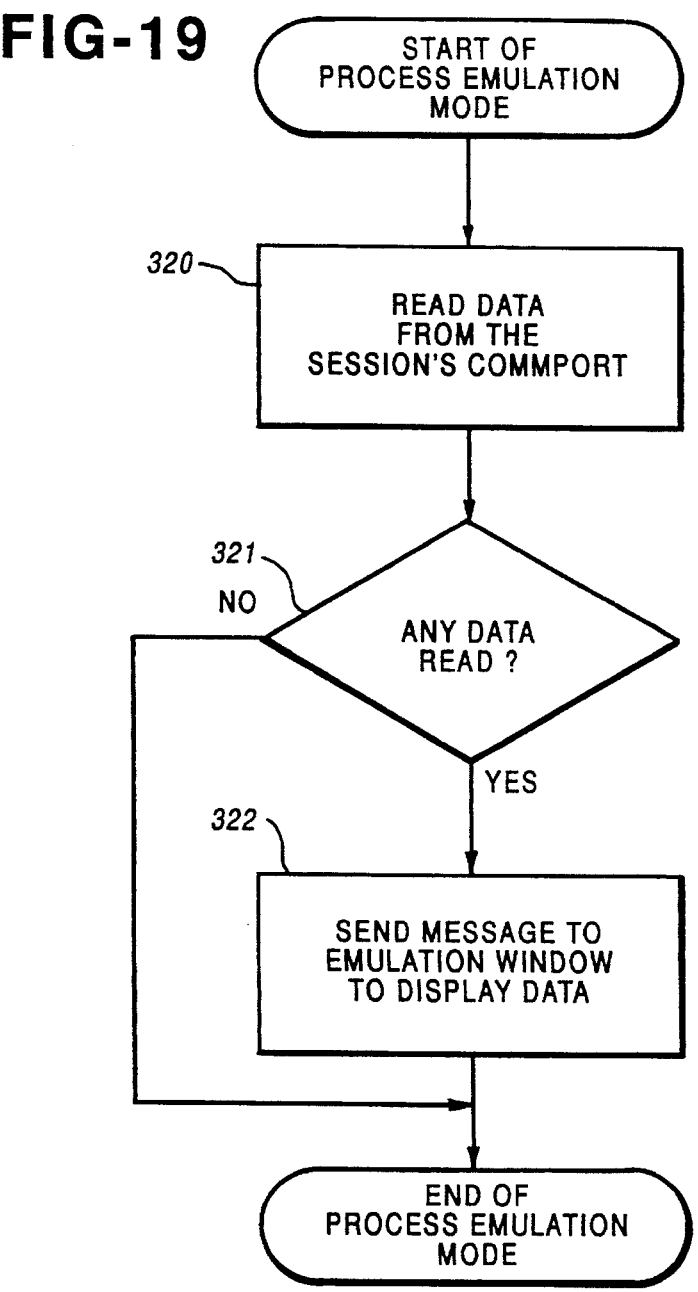
FIG. 18 illustrates the structure of a job configuration file.
FIG. 19 is a flow chart illustrating a Process Emulation Mode software routine.
Figure 20:
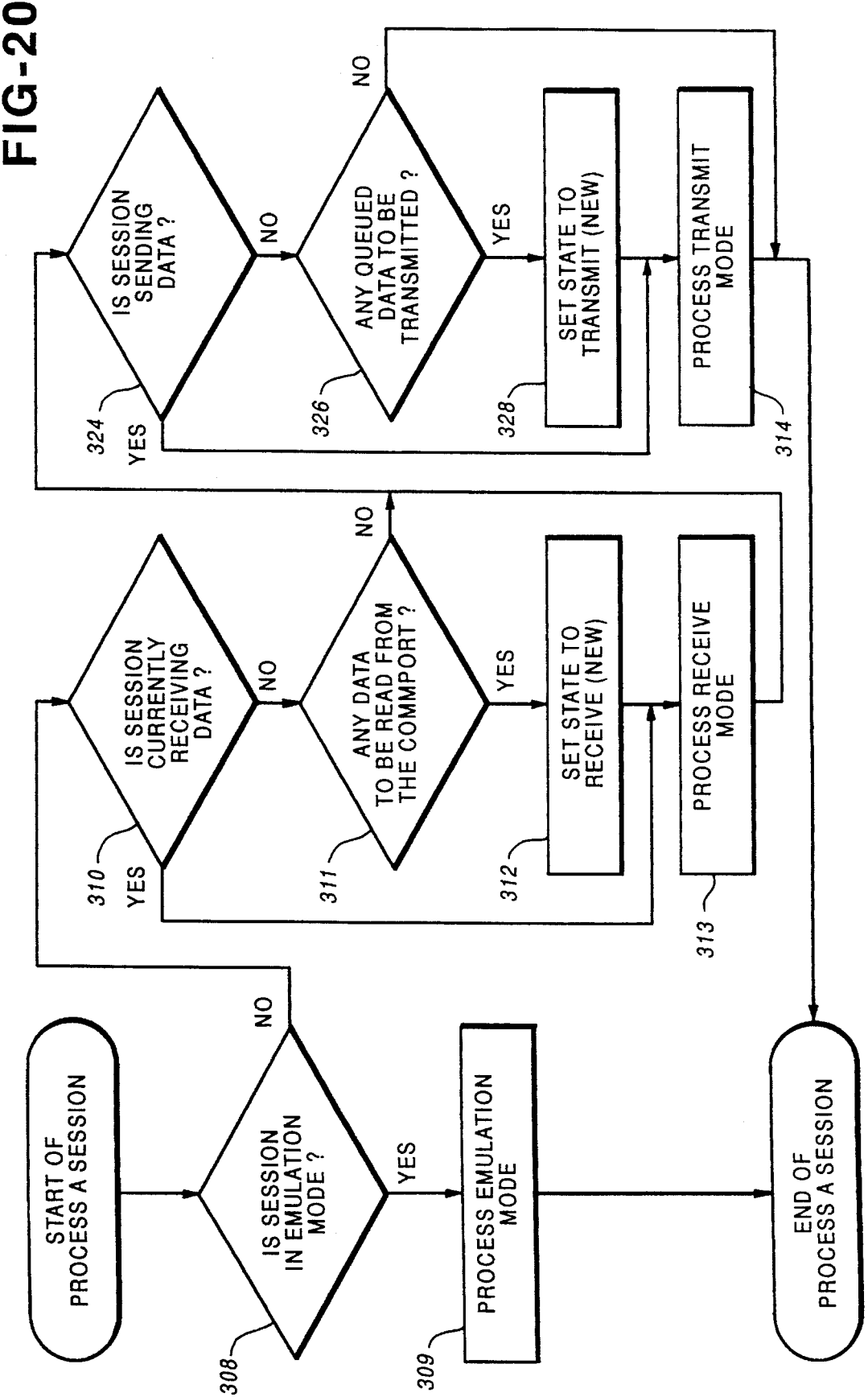
FIG. 20 is a flow chart illustrating a Process A Session software routine.

The job configuration file and expand file are used to print a DCPS job on the bar code printer 28 when the microprocessor 14 operates in accordance with the spooler and expansion programs 46 and 48 as well as the pre-expansion portion of the DCPS packet handler. The job configuration file describes the layout of each data field in the expand file, there being a one-to-one correspondence between the job configuration file and expand file. The structure of the job configuration file is as shown in FIG. 18. The HEADCNT term represents the number of header items. The term FLDCNT is a count of single occurrence fields. The term GRPCNT:REPEAT indicates a group of fields that will be repeated. The value GRPCNT represents the number of fields that will be repeated within the group. The range of GRPCNT is from 1 to 9. The value REPEAT indicates the number of occurrences of the group. This is a shortcut for indicating like fields being repetitively specified for a line item such as the print quantity. For example, where there are 100 quantities, instead of indicating a FLDCNT of 100 and listing 100 individual quantity fields (QTY001,QTY002,. . . QTY100), A GRPCNT:REPEAT value of 1:100 with a "NAME" value of QTY may be used. The term HEAD DB is the name of the database that will be used to store the header data items. The term FIELD DB is the name of the database used to store the line items. The term HEAD KEY refers to the column name of the header database for the job name. The term HEAD SIZE refers to the length of the "HEAD KEY" database field. The FIELD KEY term refers to the column name of the line item database for the job name. The term FIELD SIZE refers to the length of the FIELD KEY database field. The term FIELD SEQ, if specified, refers to the name of the database field that will be used to maintain the lines in the correct order as received for the job. If this value is not present, the fields will be retrieved in the order as stored in the line item database. This field is set and incremented by the DCPS packet handler 20. The term KEY_DUP is a flag indicating that the database search key data can be duplicated in the database. The term KEY_TYPE refers to the data type for the HEAD KEY and FIELD KEY columns and can be set to C for character type or N for numeric type. DESTQUEUE indicates the name of the spooler queue on which the job is to be printed. PRINTER LIST is a comma separated list of the names of printers that the job can print on. The field NAME refers to the database's field name. The term LEN represents the maximum number of characters in the field. The term FIL represents the data field's fill character. The term DIR represents the fill direction such as "L" for left to right or "R" for right to left. The term TYPE is optional and identifies the data type for the name column. It may be set to a C for character or N for numeric.

The following is an example of a job configuration file.

2,3,1:100
HDRHANG,HANGTAG
PO,15,PONUM, 15,SEQ,DUP,N
QUEUE1
9402,9425
HDRFLD1,8,<space>,L,N
HDRFLD2,3,<space>,L,C
SKU, 12,<space>,L
PRICE,8,<space>,R
DESC,20,<space>,L
QTY,10,<space>,R This job configuration file indicates in the first line that there are two header fields, three line item fields and one line item group. The second line indicates that the header data goes to the HDRHANG database whereas the line item data goes to the HANGTAG database. The third line indicates that PO is the column name to store the job name in the HDRHANG database and is 15 characters in length whereas PONUM is the column name to store the job name in the HANGTAG database and is 15 characters in length. Seq is the column name in the HANGTAG database for the sequence numbering. The key search data may be duplicated and the PO and PONUM columns are numeric in type. The fourth and fifth lines respectively indicate that the name of the spooler Queue is QUEUE1 and that the job can print on a model 9402 printer or on a model 9425 printer. The sixth and seventh lines indicate that there are two fields defined for the header database, HDRFLD1 and HDRFLD2. The eighth, ninth and tenth lines indicate that there are three fields defined for the line item database, SKU, PRICE and DESC. The first and last lines indicate that one quantity field, QTY is defined in a repeating group of 100 times and will be stored in the line item database as QTY001,QTY002, . . . ,QTY100.

The expand file is used to generate batch data for a print job to be printed on a bar code printer 28. The structure of the expand file is as follows:

HEADCNT,FLDCNT,QTY,DIST,STAR,PROCESS
BATCH
BATCHHDR
STORE
KEYREC

The HEADCNT field represents the number of header items. The FLDCNT term represents the number of fields per line of the job. More particularly, this term represents a summation of all of the line item data fields in the job configuration file not including grouped line items. The QTY field represents the maximum number of times to expand a purchase order line (i.e. the number of quantity fields on a line). The DIST field represents the method as to how the data is to be processed. If the data is to be processed by columns for predistribution, DIST is set equal to 0; or if the data is to be processed by rows for post-distribution, DIST is set equal to 1. The STAR field indicates which star field on the first line of the batch data definition expands as a batch quantity. For most applications, the only star field on the first line is the quantity field and this number would be a "1". The PROCESS field specifies the order in which tags or labels are to be printed in relation to the header tags. If the value is 0, then the headers will appear before the tags/labels. If a value of 1 is specified for this term, then the tags/labels are printed before the headers so that the headers actually become trailers. The term BATCH is a description of the batch packet that is to be printed for the labels/tags. The term BATCHHDR represents the description of the data that is to be printed for the batch header. The term STORE represents the description of the data that is to be printed for the distribution header. The term KEYREC is a description of the data that is to be printed for the keyrec header. If KEYREC, STORE, or BATCHHDR headers are not desired, their descriptions may be omitted from the expand file.

The following is an example to illustrate a DCPS job that is processed by the DCPS packet handler 20. An incoming packet from a host processing system 22, 24 may be as follows:

{JT = "HANGTAGS" JN = "06261991" DP = W
HD = "934,002"
LD = "5143037823,1543,NORTH,24,WEST,12,SOUTH,20"
LD = "51430377821,1655,EAST,24,NORTH,15"
LD = "5143037822,2995,CENTRAL,36"
} and the job configuration file may be as follows:

2,2,2:3
HANGTHDR,HANGTLNE
QUEUE1
9402,9425
JOBNAME,15,JOBNAME,15,SEQ
VENDO, 3, ,L
SEACODE,3, ,L
SKUNUM, 10, ,R
PRICE,7, ,R
STORE, 10, ,L
QTY,4,0,R

The DCPS packet handler 20 as discussed in detail below checks the incoming message packet against the job configuration file for validity. Once the message packet information is validated, the distribution center packet handler adds the new information to the DCPS portion 56 of the database memory adding the single HD record to the header database and the multiple LD records to the line item database. More particularly, the database storage for the header, HANGTHDR is as shown in FIG. 70 whereas the database storage for the line item data, HANGTLNE is as shown in FIG. 71.

Figure 2:
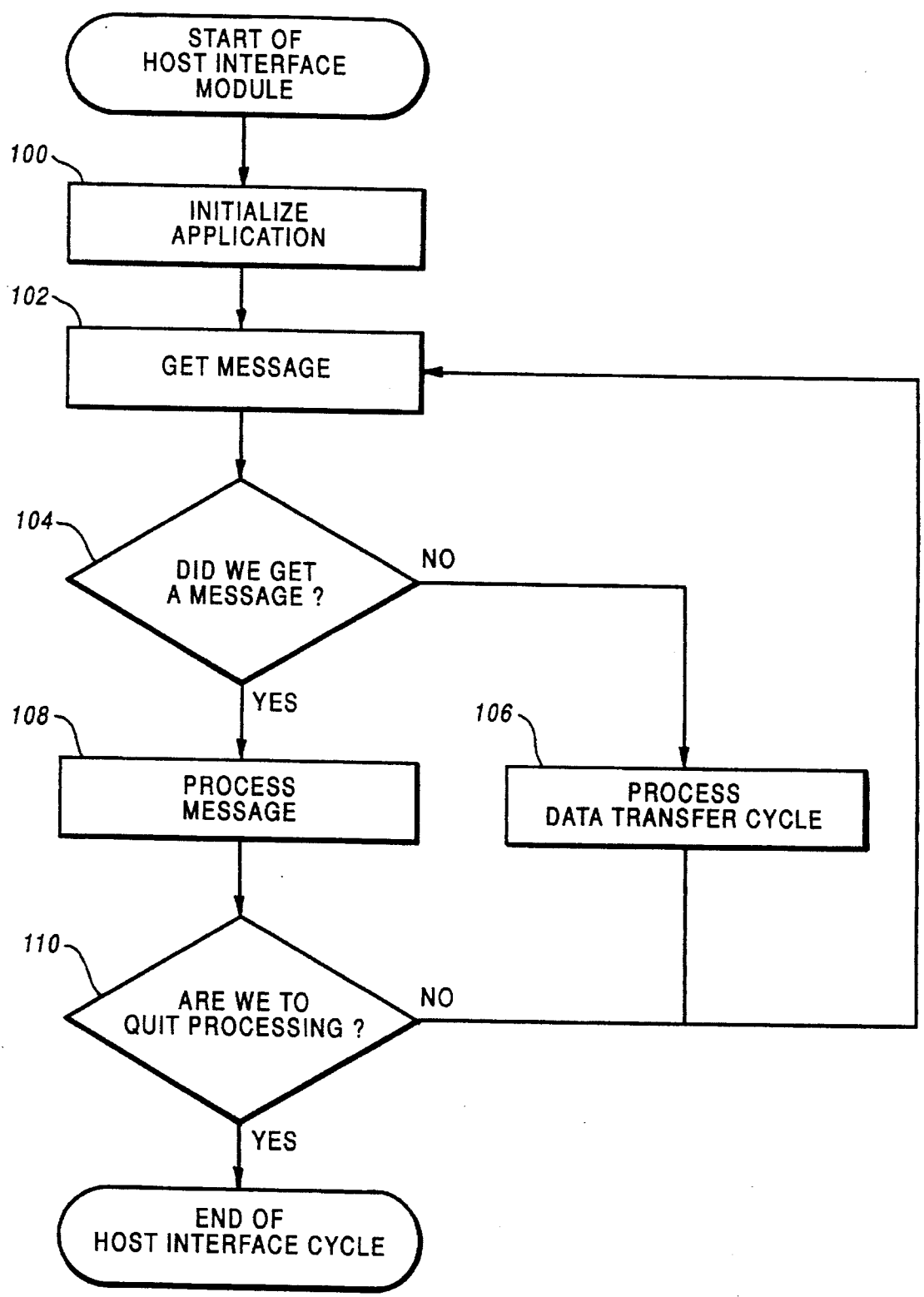
FIG. 2 is a flow chart illustrating a Host Interface software module.
Figure 3:
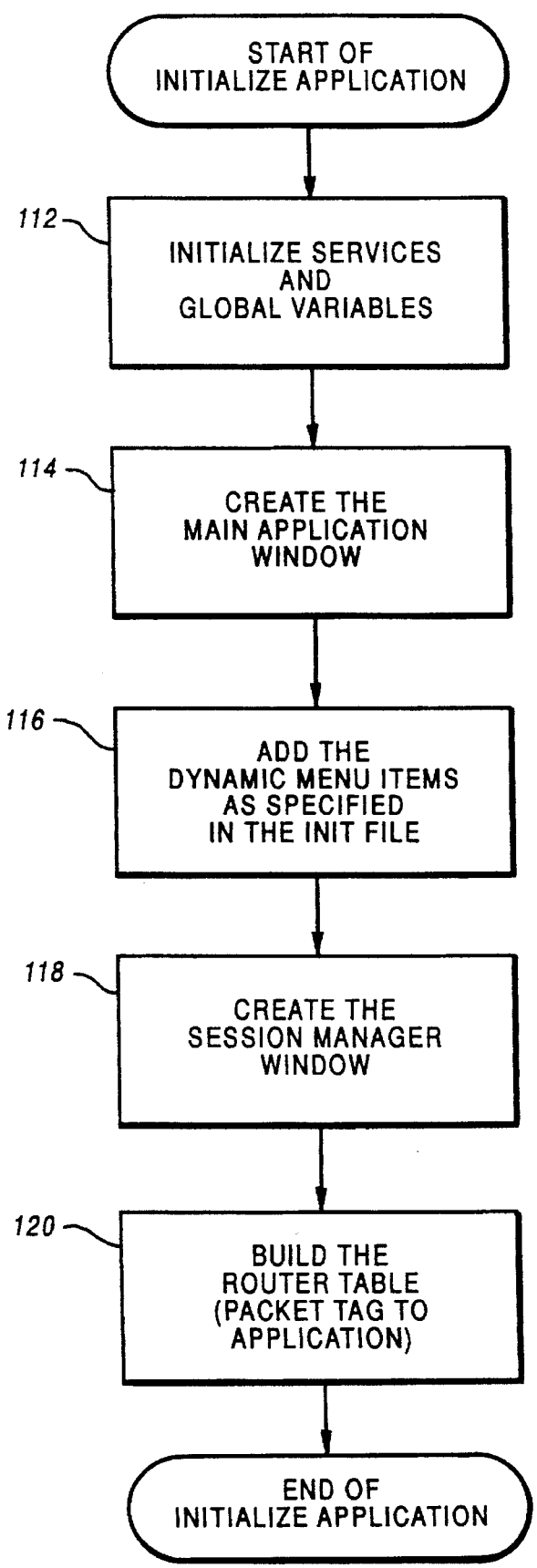
FIG. 3 is a flow chart illustrating an Initialization software application.

The host interface module 16 will now be described in detail with respect to FIGS. 2–32. As shown in FIG. 2, at the start of the host interface module 16, the microprocessor 14 initializes the host interface module application at a block 100 as depicted in FIG. 3. Thereafter, the microprocessor 14 proceeds to block 102 to get a message. At a block 104 the microprocessor 14 determines whether a message was obtained such that the message originated at the P.C. 40, i.e. the message is sent from an application running on the P.C. 40 or the message originates from a user of the P.C. 40. If so, the microprocessor 14 proceeds to block 108 to process the message in accordance with the flow chart depicted in FIG. 4. Otherwise, the microprocessor proceeds from block 104 to block 106 to check the communication ports of the P.C. 40 to process a message from a host processing system 22, 24. If the microprocessor determines at a block 110 that the host interface module is to stop processing, the microprocessor 14 exits the routine.

At the start of the initialization application for the host interface module as depicted in FIG. 3, the microprocessor 14 at a block 112 initializes various counters and variables to their default states. Thereafter, at a block 114, the microprocessor 14 creates a main application window to be displayed on the display 42 of the P.C. 40. This main window depicts at menu that lists various items which are not dependant upon the presence or absence of a particular packet handler. For example, at block 114, the microprocessor 14 creates a main window depicting a set up option and a help option for selection by the user wherein the set up option allows the user to set up sessions and communication parameters between a host processing system 22, 24 and the P.C. 40. At a block 116, the microprocessor 14 adds to the main application window displayed on the display 42 those dynamic menu items that are dependent on the presence of a particular packet handler. If all of the packet handlers 18–21 are present, the microprocessor at block 116 adds an upload option and a reprint option to the main window menu. If for example, the distribution center packet handler 20 is not present on the local system 10, at block 116, the microprocessor will not display the reprint option since this option is only offered for a DCPS job. If the user selects the dynamic menu item Upload, a new window will be displayed on the display 42 indicating that the user has the choice of uploading database records, an ASCII file, a DCPS job, or labeler configuration file if the respective packet handler 18, 19, 20 and 21 is present on the system. If, for example, the file transfer packet handler 19 is not present on the system, the user will not be given the choice to upload an ASCII file, i.e. this choice is not displayed on the display 42 when the upload option is selected. After adding the dynamic menu items to the main window menu of the display 42, the microprocessor proceeds from block 116 to block 118. At block 118, the microprocessor displays a list of all of the available active and inactive sessions along with the main menu items created at blocks 114 and 116 to allow a user to generate a session manager message or an emulation message as discussed below. Thereafter, at a block 120, the microprocessor 14 builds a router table from the initialization file to associate the key tags for a packet with its associated packet handler so that, for example, the key tag JT is associated with the distribution center packet handler 20.

Figure 4:
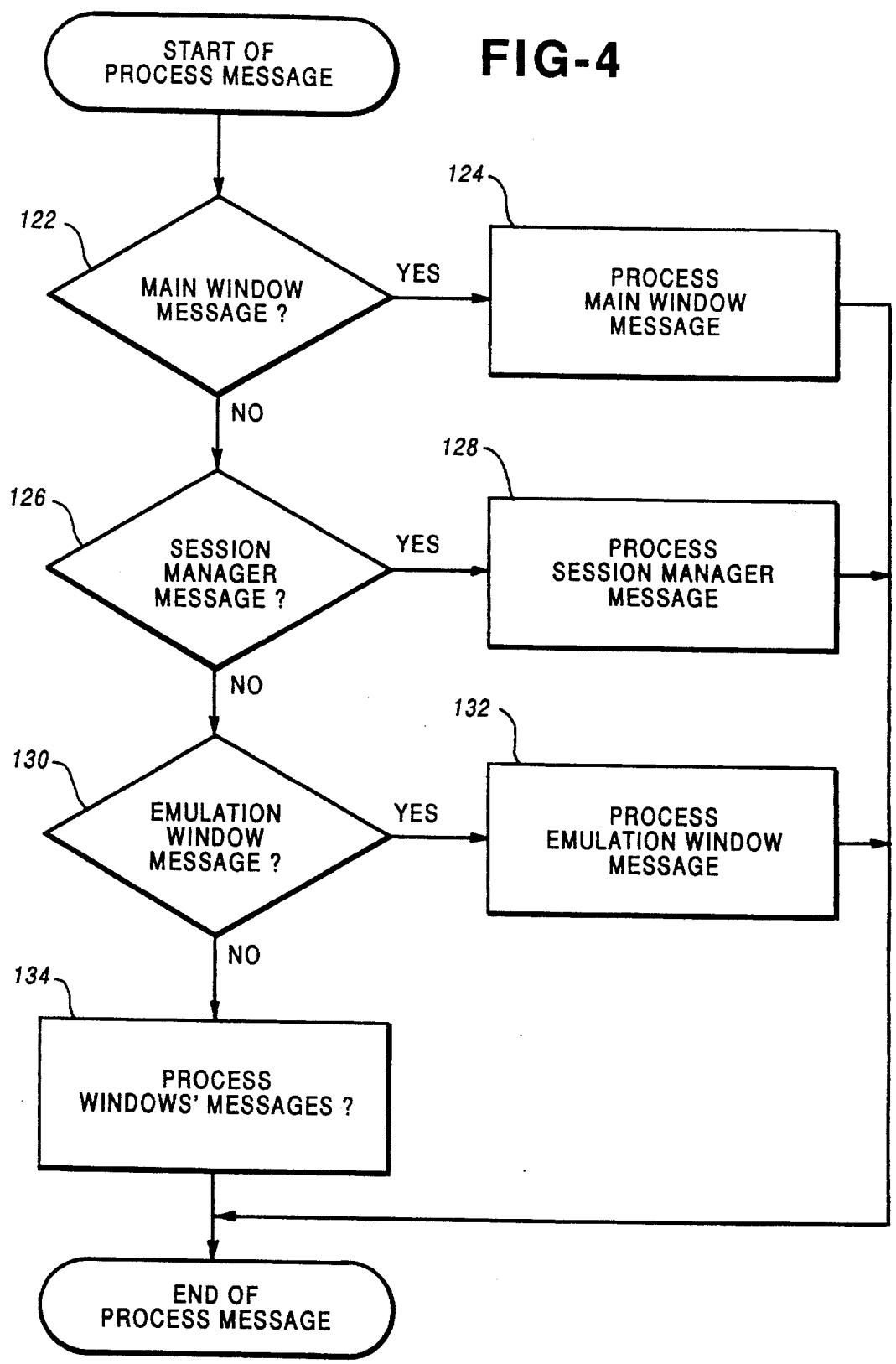
FIG. 4 is a flow chart illustrating a Process Message software routine.
Figure 5:
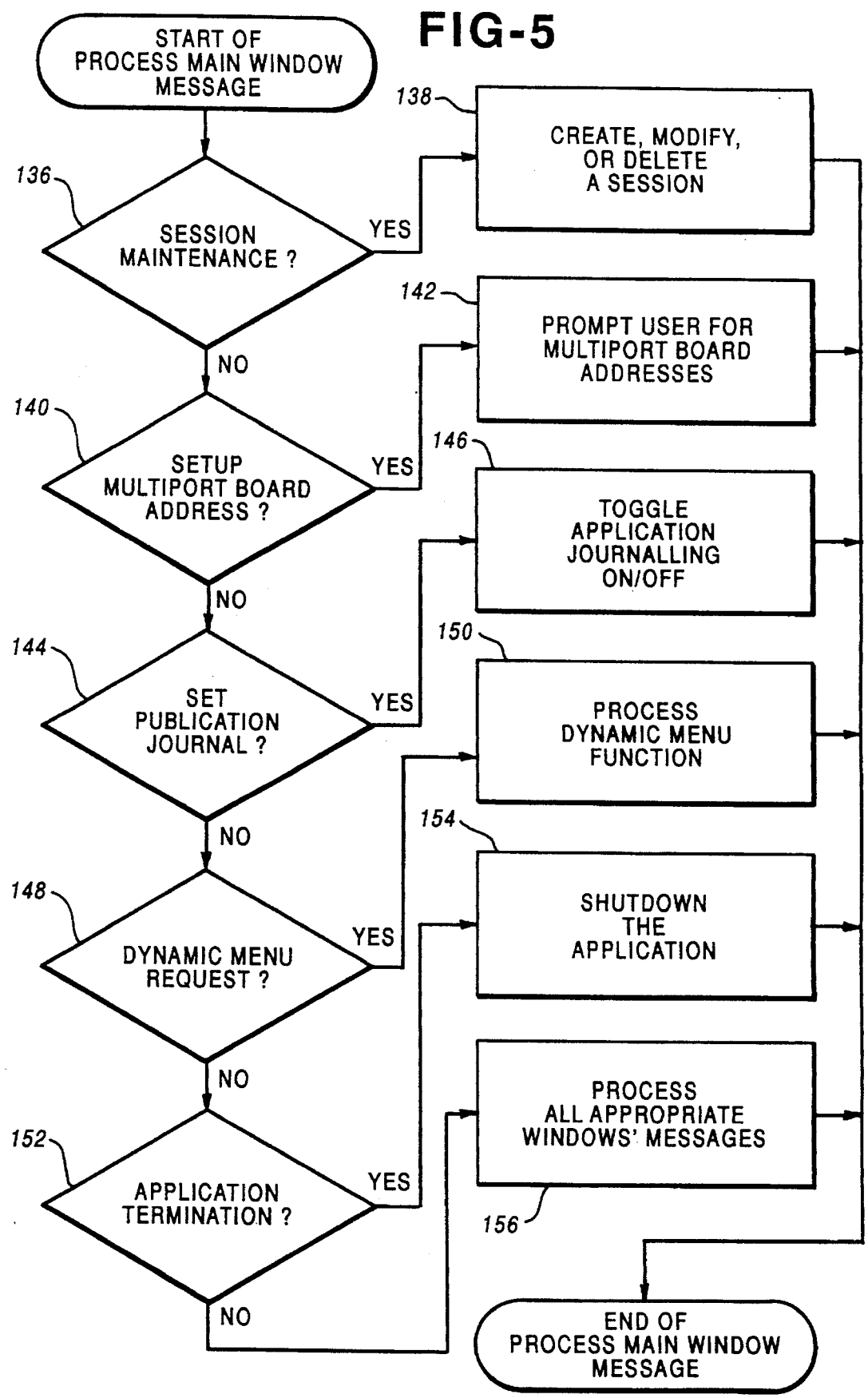
FIG. 5 is a flow chart illustrating a Process Main Window Message software routine.

The microprocessor 14 operating in accordance with the process message routine depicted in FIG. 4 determines at a block 122 whether the user has selected a displayed option generating a main window message and if so, the microprocessor proceeds to block 124 to process the main window message as depicted in FIGS. 5–8. If the user has not selected a displayed option that generates a main window message as determined by the microprocessor at block 122, the microprocessor proceeds to block 126. At block 126, the microprocessor 14 determines whether a session manager message has been generated by a user selected option and if so, the microprocessor proceeds to block 128 to process the session manager message in accordance with the routines depicted in FIGS. 9–13. If the microprocessor determines at a block 130 that an emulation window message has been generated, the microprocessor proceeds to block 132 to process the emulation window message in accordance with the flow chart depicted in FIGS. 14–16. If the microprocessor determines at the block 130 that an emulation window message was not received, the microprocessor proceeds to block 134 to process a window's operating system message. The microprocessor 14 upon entering the process main window message routine depicted in FIG. 5 first determines whether a set up session menu option has been selected by the user so as to generate a corresponding message. If so the microprocessor proceeds to block 138 to create, modify or delete an existing session from a list of currently configured host sessions depicted on the display 42. If the microprocessor determines at a block 140 that a set up multiport address option has been selected by the user, the microprocessor 14 proceeds to block 142 to prompt the user via the display 42 for a board address. At block 144, the microprocessor determines whether the user has selected to set up application journalling for the transfer of job data and if so, the microprocessor proceeds to block 146 to toggle the application journalling flag on or off as requested by the user. At a block 148, the microprocessor 14 determines whether a dynamic menu request has been received, i.e. an upload or a reprint request and if so, the microprocessor proceeds to block 150 to process the dynamic menu function requested in accordance with the flow chart depicted in FIG. 6, discussed below. If the microprocessor determines at a block 152 that the application is to be terminated, the microprocessor proceeds to block 154 to shut down the application in accordance with the flow charts depicted in FIGS. 7 and 8. Otherwise, the microprocessor at a block 156 processes all other appropriate window messages.

Figure 6:
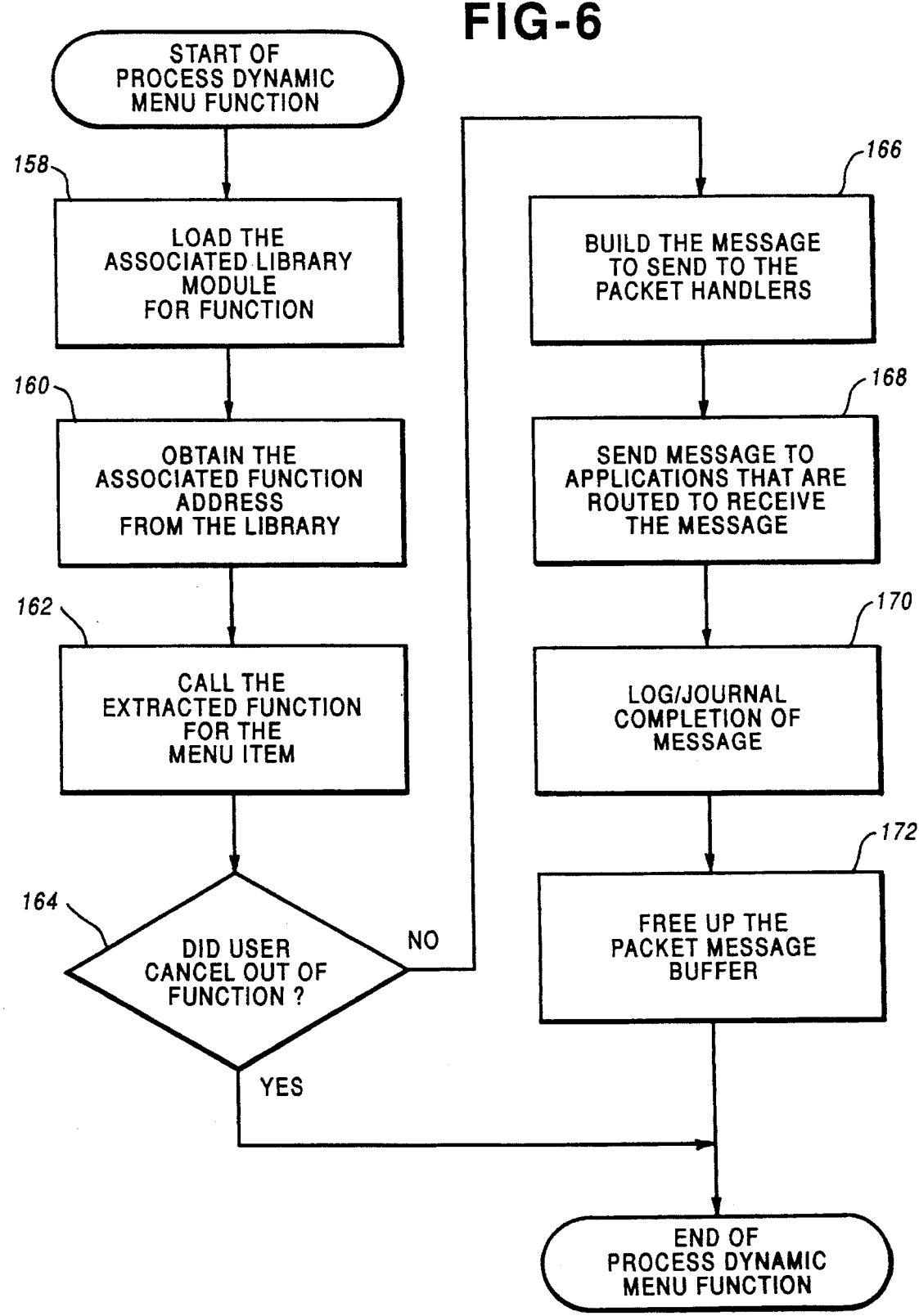
FIG. 6 is a flow chart illustrating a Process Dynamic Menu Function software routine.

Upon entering the process dynamic menu function routine depicted in FIG. 6, the microprocessor 14 loads the direct link library user interface file for the packet handler associated with the user selected dynamic menu item at a block 158. Thereafter, at a block 160, the microprocessor 14 obtains the particular address of the associated packet handler from the library. At a block 162, the microprocessor 14 calls the extracted routine for the selected dynamic menu item and proceeds to block 164 to determine whether the user canceled the function or not. If not, the microprocessor proceeds from block 164 to block 166 to build a "host" message for the user selected menu item. Thereafter, at a block 168, the microprocessor 14 sends the "host" message to the particular packet handler in accordance with the host interface module's router table. At a block 170, the microprocessor 14 logs or journals the completion of the message and at block 172 frees up the packet message buffer that was used at block 166 to build the "host" message.

Figure 7:
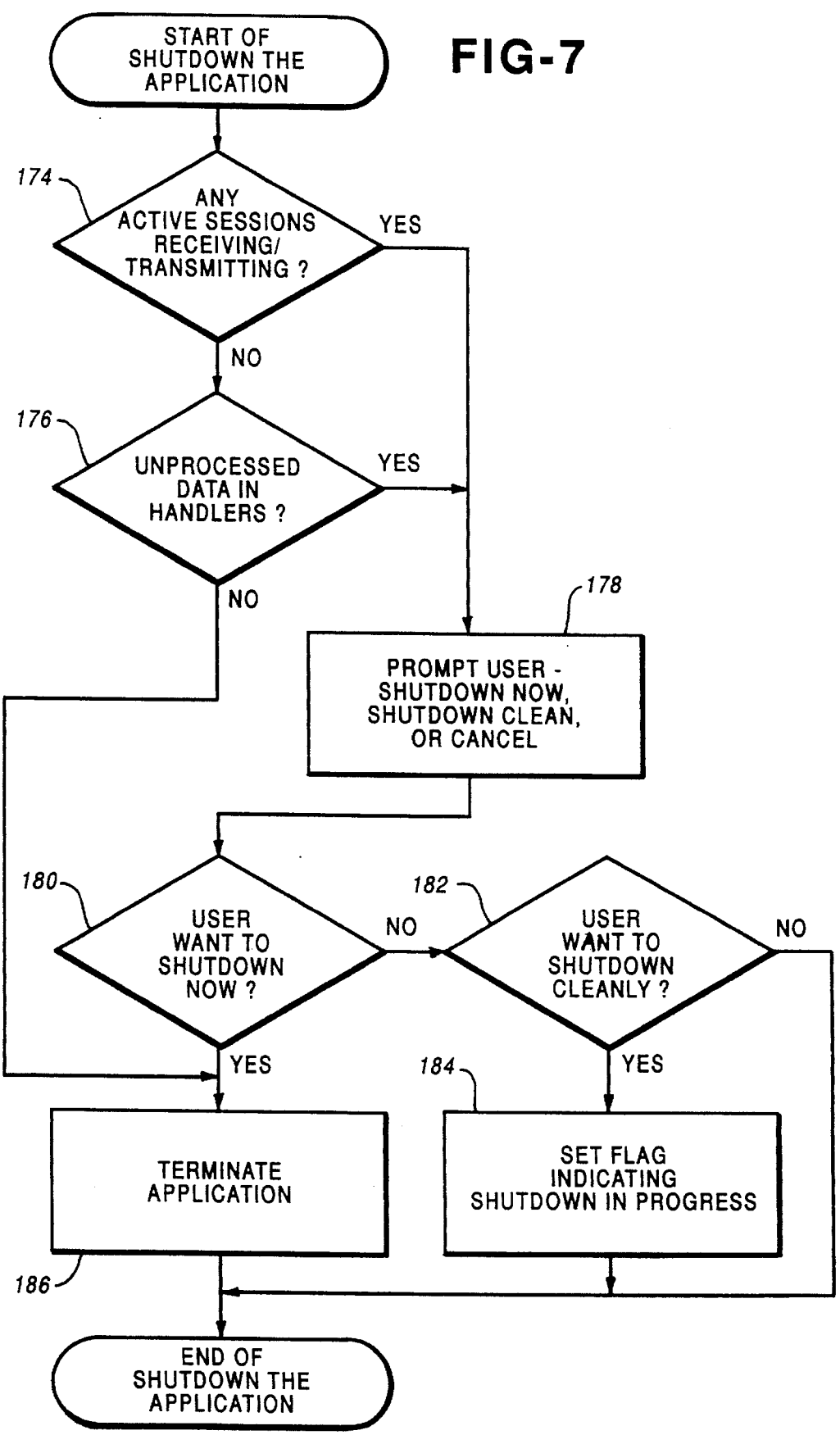
FIG. 7 is a flow chart illustrating a Shut Down Application software routine.
Figure 8:
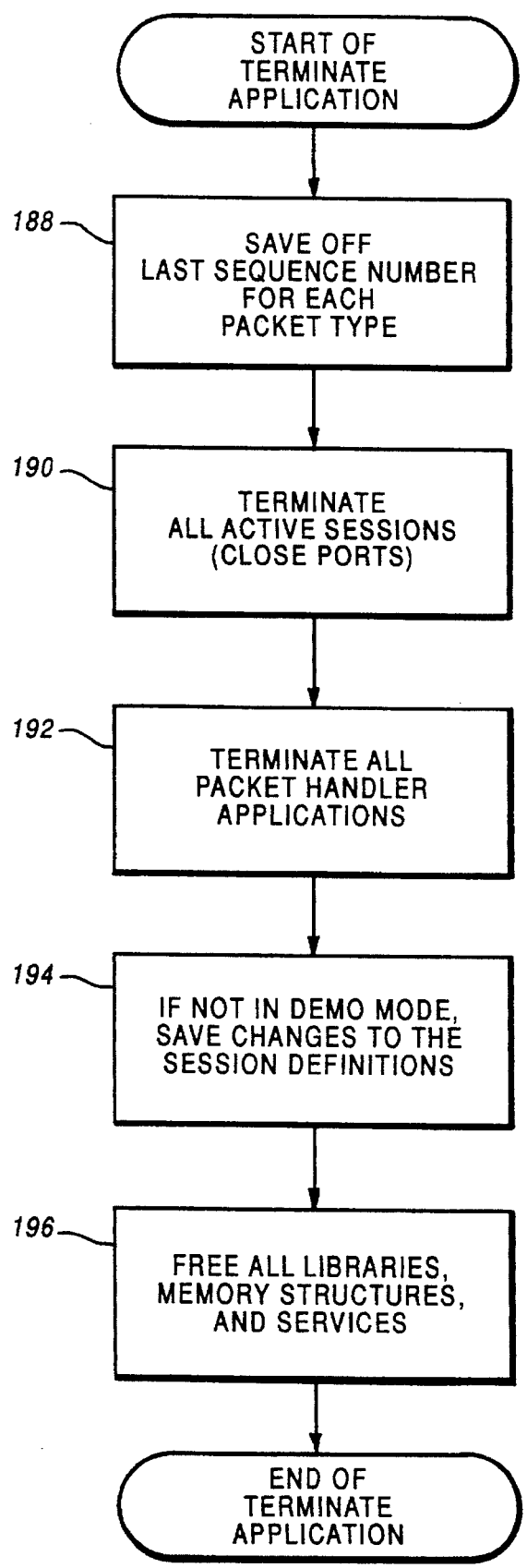
FIG. 8 is a flow chart illustrating a Terminate Application software routine.

Upon entering the routine depicted in FIG. 7 to shut down the application, the microprocessor at a block 174 first determines whether there are any active sessions either receiving or transmitting and if so, the microprocessor proceeds to block 178 to prompt the user to shut down now, to shut down cleanly, or to cancel. If the microprocessor determines at a block 180 that the user has selected to shut down now, the microprocessor proceeds to block 186 to execute the terminate application routine depicted in FIG. 8. Otherwise, the microprocessor proceeds to block 182 from 180 to determine whether the user wants to shut down cleanly. If so, the microprocessor proceeds to block 184 to set a flag indicating that shut down is in progress. If the microprocessor determines at block 174 that there are no active sessions receiving or transmitting, the microprocessor proceeds to block 176 to determine whether there is any unprocessed data in a packet handler 18–21 and if so, the microprocessor proceeds to block 178 as discussed above. As shown in FIG. 8, at the start of the terminate application routine, the microprocessor 14 saves the last sequence number for each packet type and at block 190 terminates all of the active sessions. At block 192 the microprocessor 14 then terminates all of the packet handler applications 18–21. At block 194, if the microprocessor 14 determines that the host interface module is not operating in a demonstration mode, the microprocessor saves the changes to the session definitions that might have been made and at block 196 frees all of the libraries, memory structures and services.

Figure 9:
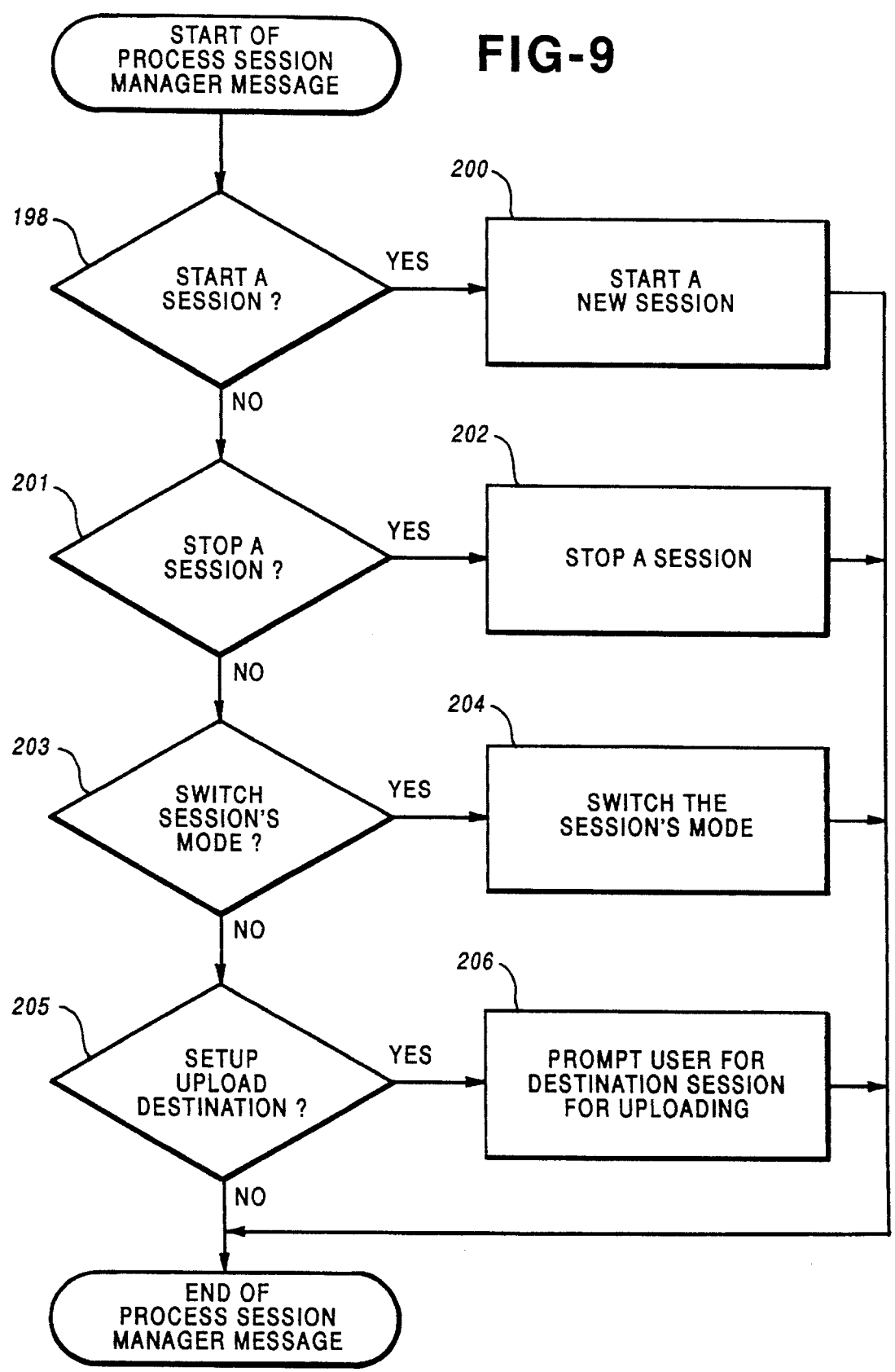
FIG. 9 is a flow chart illustrating a Process Session Manager Message software routine.
Figure 10:
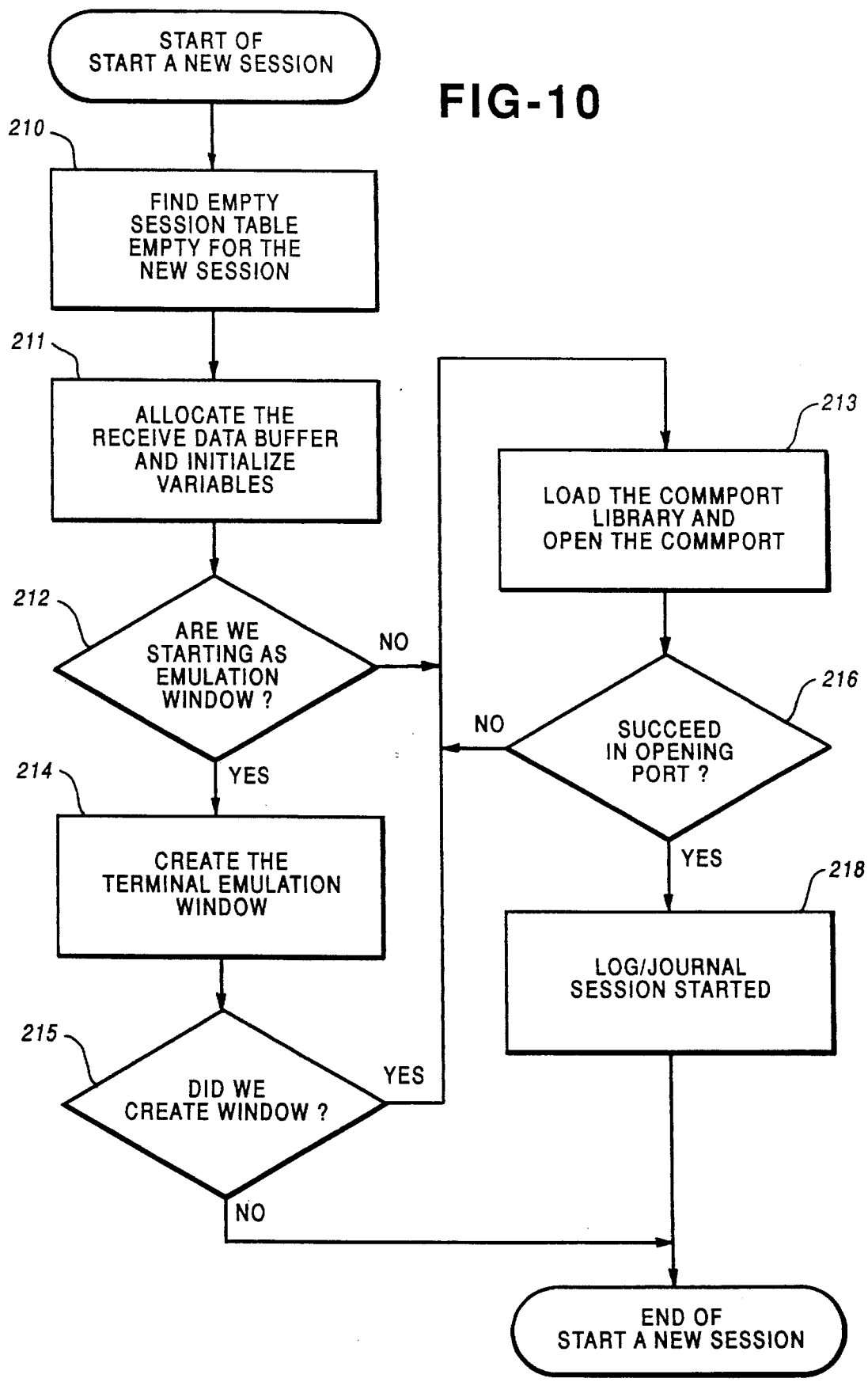
FIG. 10 is a flow chart illustrating a Start a New Session software routine.

If the user has selected an option generating a session manager message, the microprocessor proceeds to process the message in accordance with the routine shown in FIG. 9. At a block 198, the microprocessor 14 determines whether the user wants to start a session and if so, the microprocessor proceeds to block 200 to start a new session as depicted in FIG. 10. If the microprocessor determines at a block 201 that the user wants to stop a sessions, the microprocessor proceeds to block 202 to stop a session in accordance with the routine depicted in FIGS. 11 and 12. If the microprocessor determines at a block 203 that a session's mode is to be switched between an emulation mode and a nonemulation mode, the microprocessor proceeds to block 204 to switch the session's mode in accordance with the routine depicted in FIG. 13. If the microprocessor determines at block 205 that the user wants to set up the upload destination, the microprocessor proceeds to block 206 to prompt the user for the destination session for uploading.

At the beginning of the start a new session routine depicted in FIG. 10, the microprocessor 14 at a block 210 finds an empty session table entry for the new session. Thereafter, at a block 211, the microprocessor 14 allocates the receive data buffer and initializes various variables. At a block 212 the microprocessor determines whether an emulation window is needed and if so, proceeds to block 214 to create the terminal emulation window. From block 212 or block 215 if an emulation window was created, the microprocessor proceeds to block 213 to load the communication port library and to open the communication port selected for the session. Thereafter, at a block 216 the microprocessor 14 determines whether the opening of the communication port was successful and if so, the microprocessor logs or journals at a block 218 at message indicating that the session has started.

Figure 11:
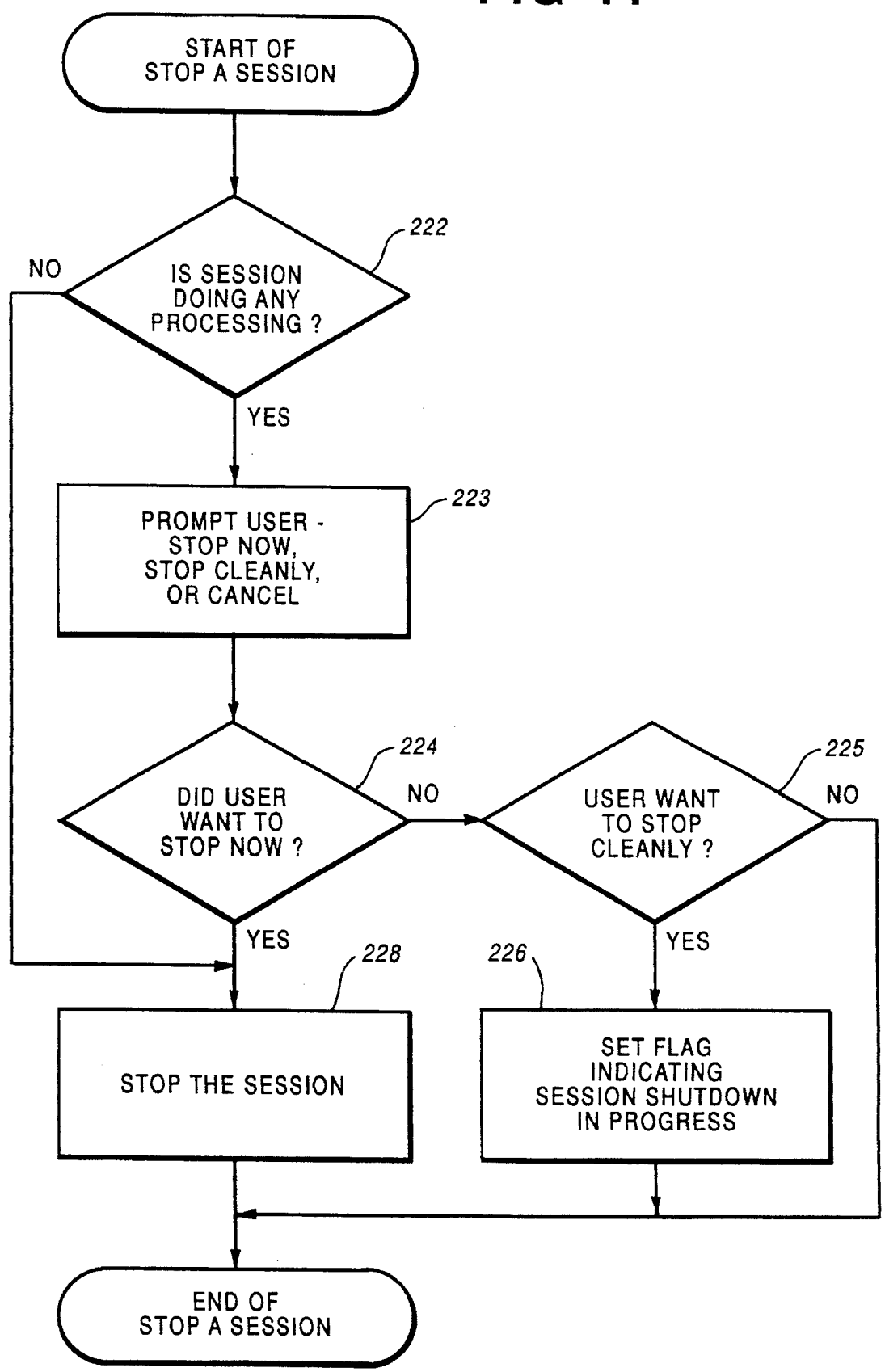
FIG. 11 is a flow chart illustrating a Stop a Session software routine.
Figure 12:
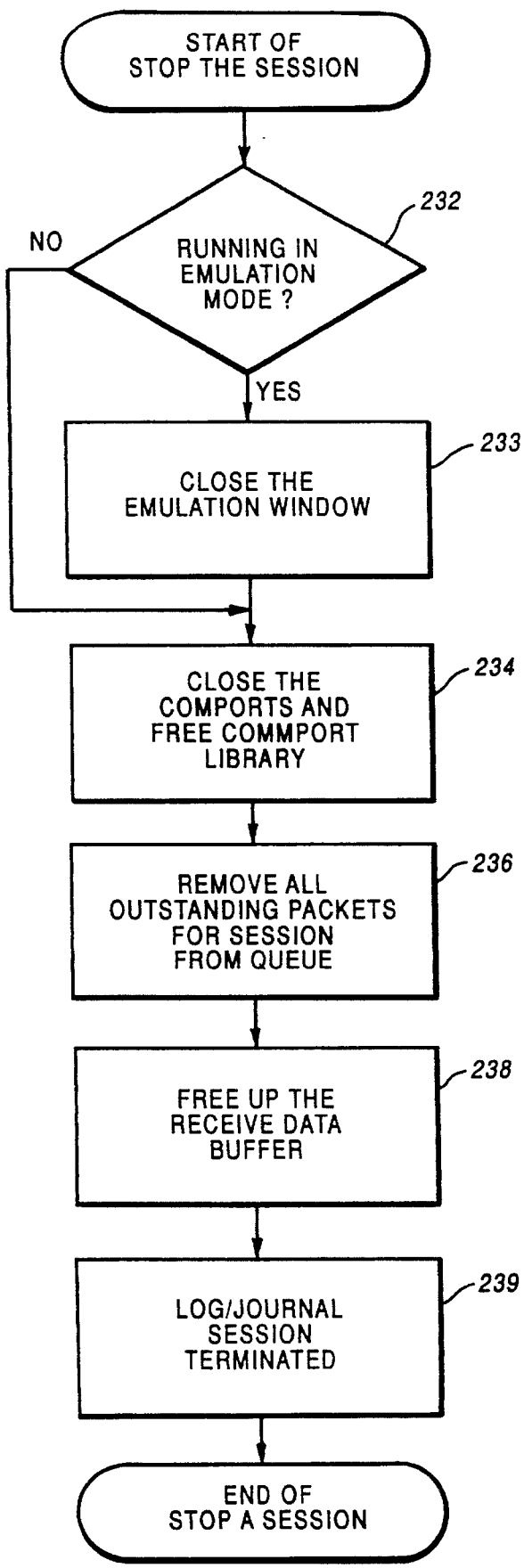
FIG. 12 is a flow chart illustrating a Stop the Session software routine.

At the beginning of the stop a session routine depicted in FIG. 11, the microprocessor 14 at a block 222 determines whether the session is doing any processing. If not, the microprocessor proceeds to block 228 to stop the session in accordance with the flow chart depicted in FIG. 12. If, however, the microprocessor 14 determines that the session is processing, the microprocessor proceeds to block 223 to prompt the user to either stop now, stop cleanly or to cancel. The microprocessor then proceeds to block 224 to determine whether the user wants to stop now and if so, proceeds to block 228 to store the session. If, however, the user selected to stop cleanly as determined by the microprocessor at block 225, the microprocessor proceeds to block 226. At block 226 the microprocessor sets a flag indicating that session shut down is in progress. As shown in FIG. 12, upon entering the stop the session routine, the microprocessor 14 at a block 232 determines whether the session is running in the emulation mode and if so, the microprocessor at block 233 closes the emulation window. From either of blocks 232 or 233 the microprocessor proceeds to block 234 to close the communication ports associated with the session and to free the communication port library. At a block 236, the microprocessor 14 removes all of the outstanding packets for the session from the host interface module queue and thereafter proceeds to block 238 to free up the receive data buffer. At a block 239 the microprocessor 14 then logs or journals a message indicating that the session has terminated.

Figure 13:
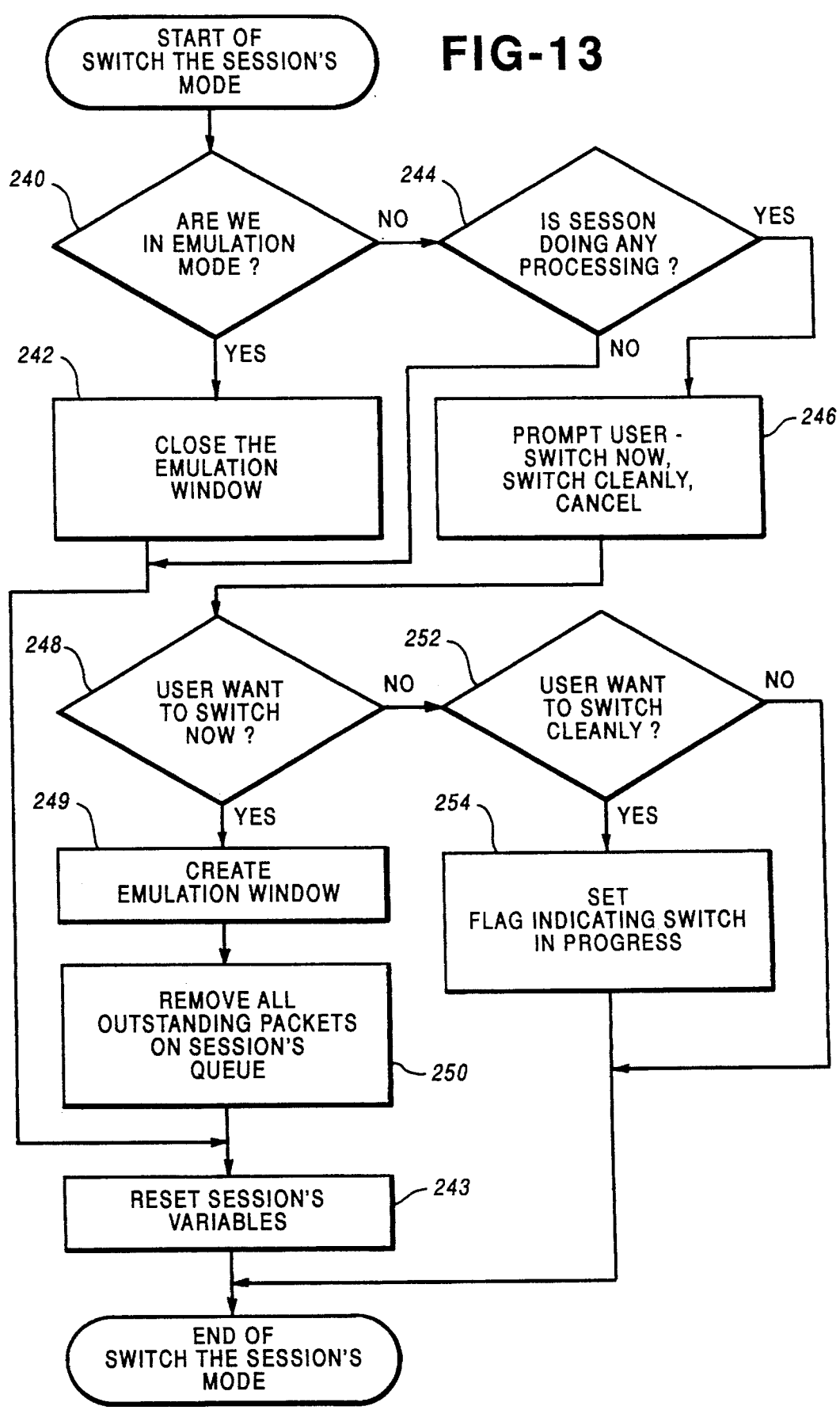
FIG. 13 is a flow chart illustrating a Switch the Session's Mode software routine.

As shown in FIG. 13, at the beginning of the switch the sessions mode routine, the microprocessor 14 at a block 240 determines whether the host interface module is in the emulation mode and if so, the microprocessor proceeds to block 242 to close the emulation window and to block 243 to reset the session's variables. If the host interface module is not in the emulation mode, the microprocessor proceeds to block 244 to determine whether the session is doing any processing. If so, the microprocessor proceeds to block 246 to prompt the user to select to either switch now, switch cleanly or to cancel. If the microprocessor determines at a block 248 that the user wants to switch the session's mode now, the microprocessor proceeds to block 249 to create an emulation window and thereafter, proceeds to block 250 to remove all outstanding packets on the session's queue. Thereafter, the microprocessor proceeds to block 243. If the microprocessor determines at a block 252 that the user wants to switch modes cleanly, the microprocessor proceeds to block 254 to set a flag indicating that a switch in modes is in progress.

Figure 14:
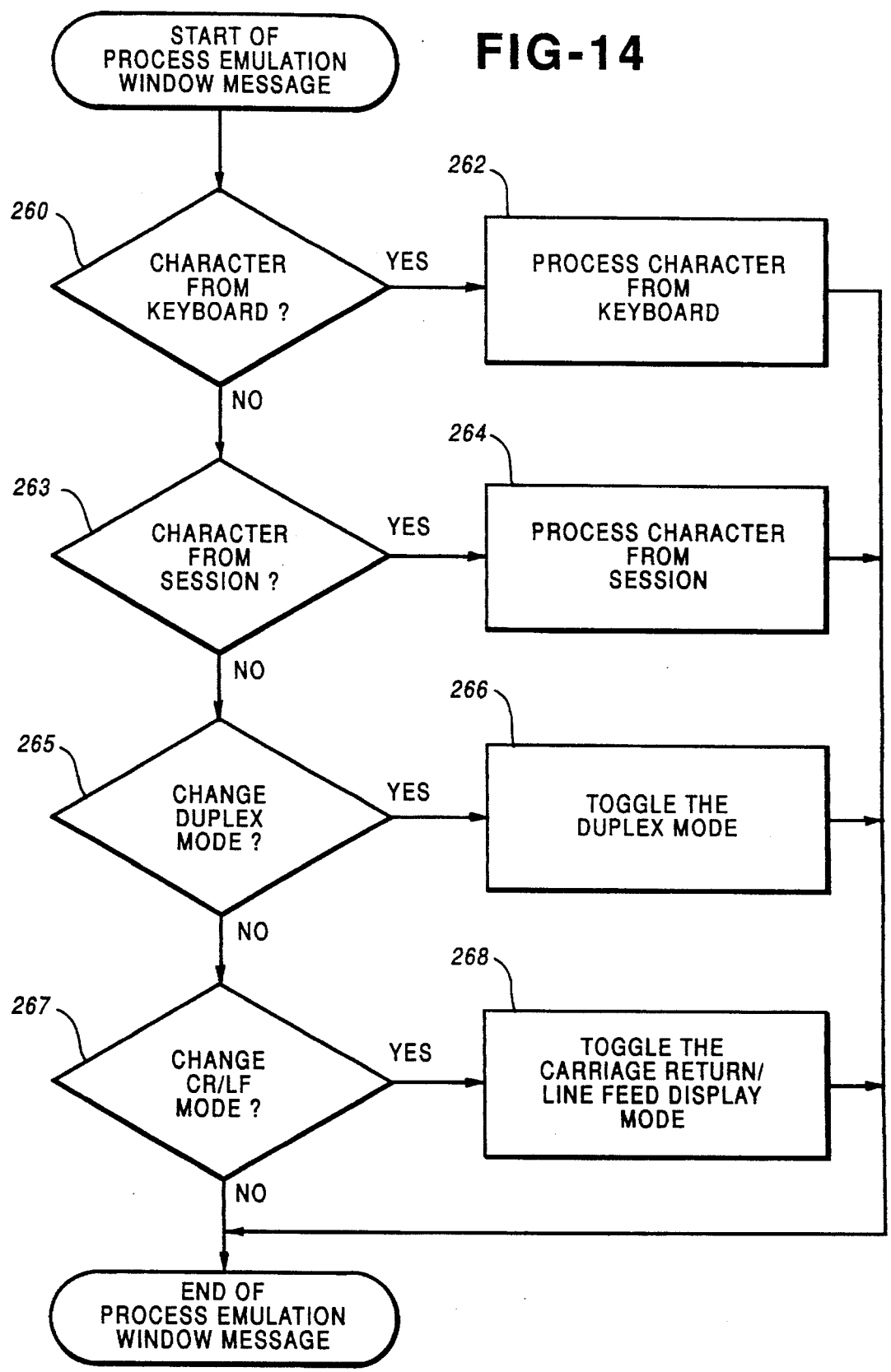
FIG. 14 is a flow chart illustrating a Process Emulation Window Message software routine.
Figure 15:
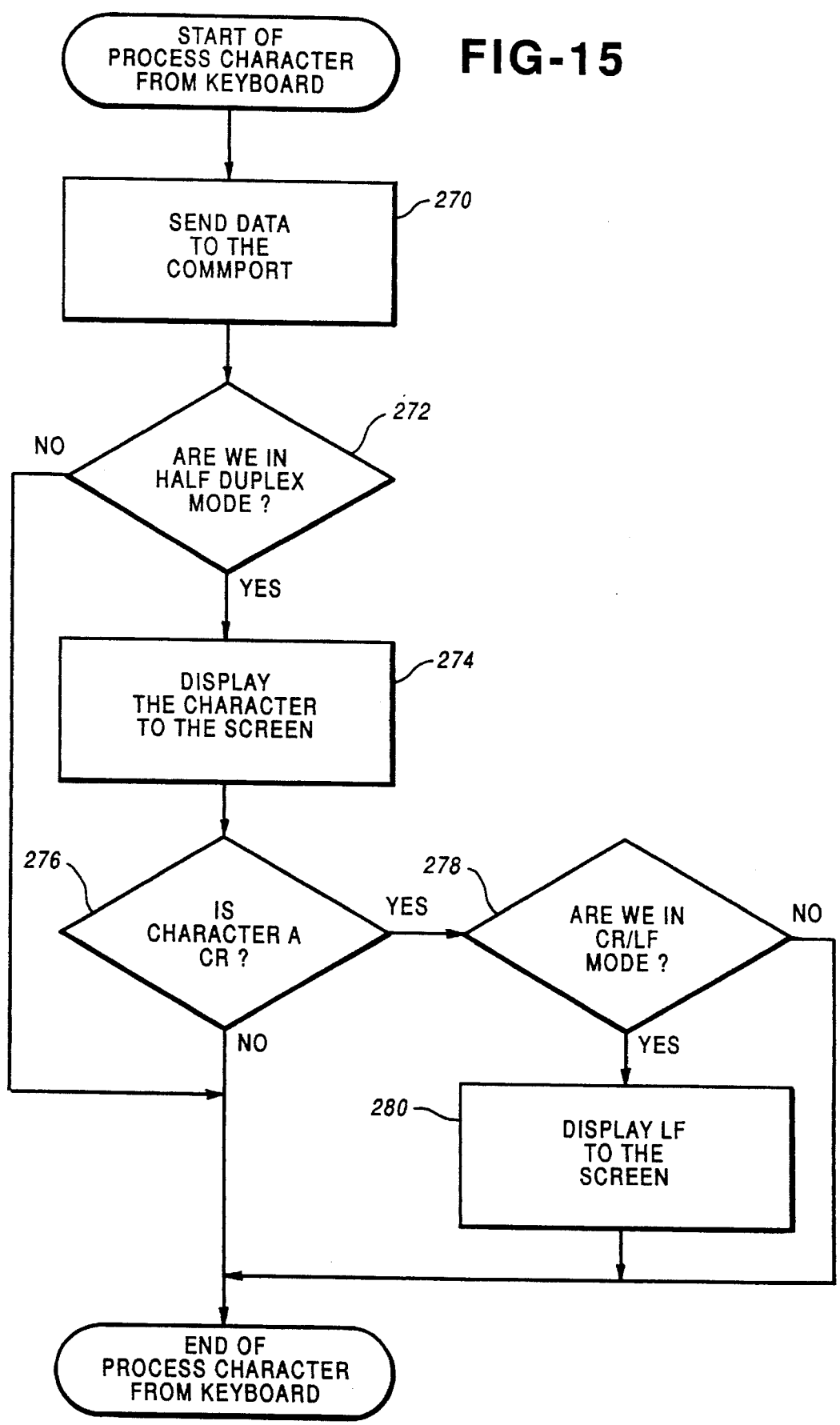
FIG. 15 is a flow chart illustrating a Process Character from Keyboard software routine.
Figure 16:
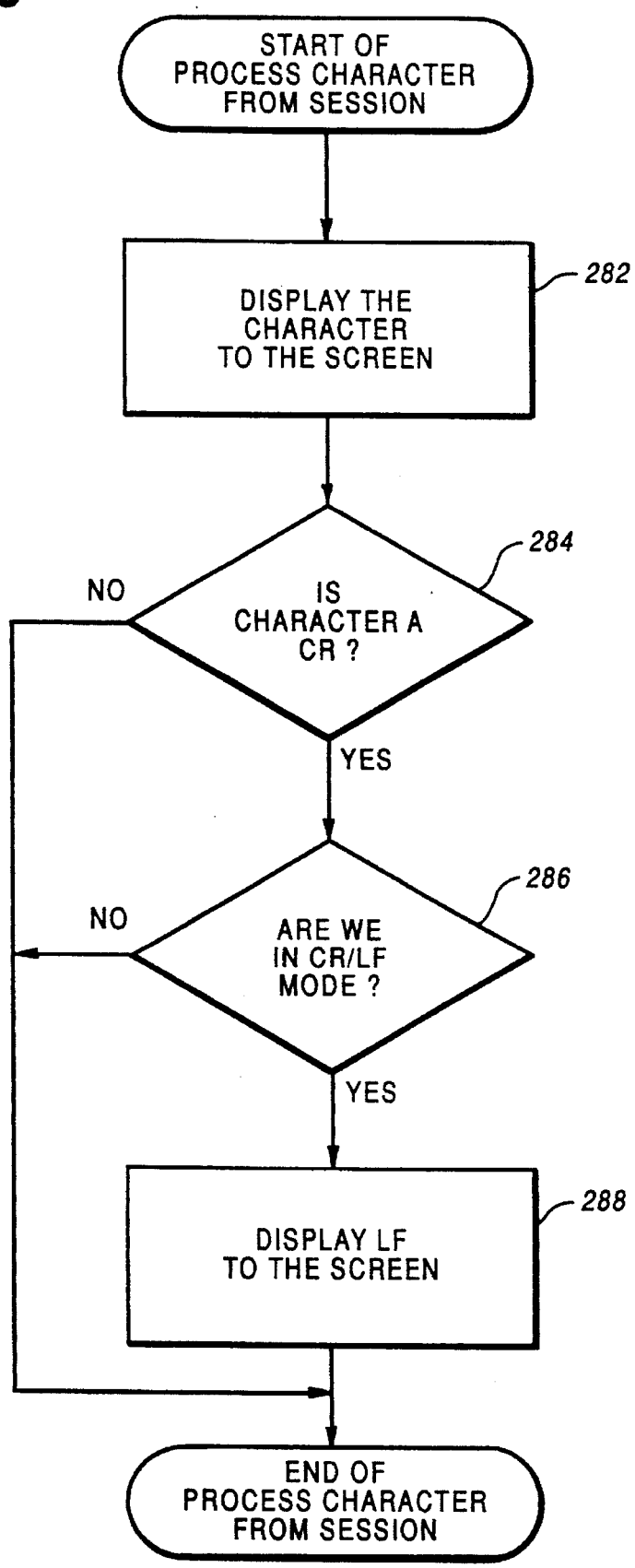
FIG. 16 is a flow chart illustrating a Process Character from Session software routine.

As shown in FIG. 14, in order to process an emulation window message, the microprocessor 14 determines at a block 260 whether a character has been received from the keyboard or not and if so, the microprocessor proceeds to a block 262 to process the character from keyboard routine depicted in FIG. 15. If the microprocessor determines at a block 263 that a character from a session is to be processed, the microprocessor 14 proceeds to block 264 to execute the routine depicted in FIG. 16. If the microprocessor determines at a block 265 that the duplex mode is to be changed, the microprocessor proceeds to block 266 to toggle the duplex mode. If the microprocessor 14 determines the mode is to be changed to or from a carriage return mode/line feed display mode, the microprocessor proceeds to a block 268 to toggle the carriage return/line feed display mode flag.

The microprocessor 14 in accordance with the process character from keyboard routine depicted in FIG. 15, sends data to the designated commport. Thereafter, the microprocessor determines at a block 272 whether the mode is a half duplex mode and if so, the microprocessor proceeds to block 274 to display the character to the screen. The microprocessor thereafter at a block 276 determines whether the character is a carriage return and if so, the microprocessor proceeds to block 278 to determine whether the mode is a carriage return/line feed display mode. If so, the microprocessor at block 280 displays the line feed to the screen. At the start of the process character from session routine depicted in FIG. 16, the microprocessor 14 displays the character to the display 42 at a block 282 and thereafter proceeds to block 284 to determine whether the character is a carriage return. If the character is a carriage return, the microprocessor proceeds to block 286 to determine whether the mode is the carriage return/line feed mode and if so, the microprocessor proceeds to block 288 to display the line feed to the display 42.

Figure 17:
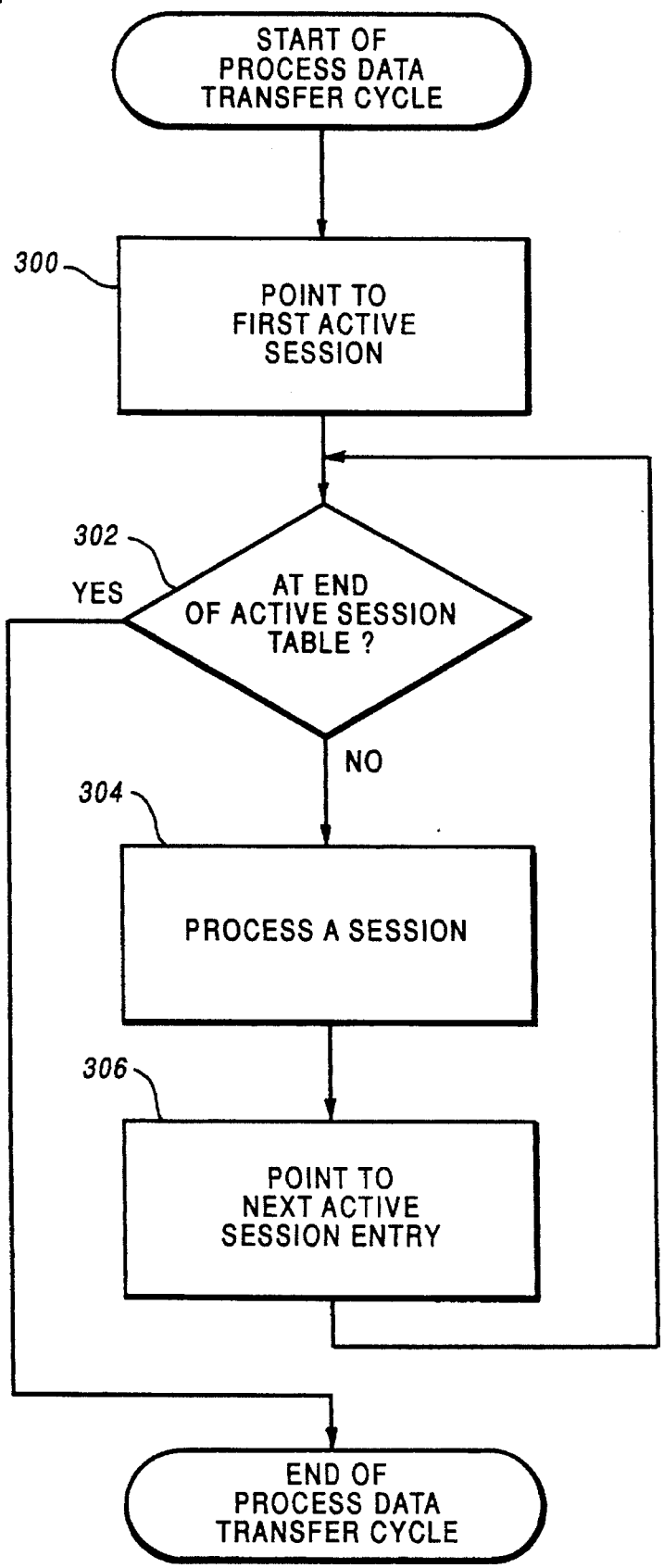
FIG. 17 is a flow chart illustrating a Process Data Transfer Cycle software routine.

Upon entering the process data transfer cycle, the microprocessor in accordance with the routine depicted in FIG. 17 first points at a block 300 to the first active session. Thereafter, the microprocessor proceeds to block 302 to determine whether it is at the end of the active session table. If not, the microprocessor proceeds to block 304 to process the active session to which it is pointing in accordance with the routine depicted in FIG. 18. Thereafter, the microprocessor proceeds to block 306 to increment the pointer to the next active session entry in the active session table, returning to block 302 thereafter.

Upon entering the process a sessions routine shown in FIG. 18, the microprocessor 14 at a block 308 determines whether the active session is in the emulation mode and if so, the microprocessor proceeds to block 309 to process the emulation mode. If not, the microprocessor proceeds to block 310 to determine whether the session is receiving data. If the session is receiving data, the microprocessor proceeds to block 311 to determine if any data is to be read from the communication port. If not, the microprocessor 14 proceeds to block 324. Otherwise, the microprocessor 14 sets the state to receive (new) at a block 312 and proceeds to block 313 to process the receive mode. At block 324 the microprocessor determines whether the session is transmitting data and if so it proceeds to block 314 to process the transmit mode. Otherwise, the microprocessor proceeds to block 326 to determine whether any queued data is to be transmitted. If so at block 328 the microprocessor sets the state to transmit (new).

As shown in FIG. 19, in order to process the emulation mode, the microprocessor at a block 320 tries to read data from the active session's communication port and proceeds to block 321 to determine whether any data was read. If so, the microprocessor at block 322 sends a message to the emulation window to display the data on the display 42.

If the active session is receiving data, the microprocessor 14 enters the process receive mode routine and at a block 332 sets a continue flag on. Thereafter, the microprocessor 14 determines at a block 334 whether processing is to continue. If so, the microprocessor proceeds to block 336 to determine whether the active session is in a new receive state. If the session is, the microprocessor proceeds from block 336 to block 340 to process the new receive state as discussed below. If the microprocessor determines at a block 338 that a session is in the continue receive state, the microprocessor proceeds to block 342 to process the continue receive state. If the session is neither in the new receive state or in the continue receive state, the microprocessor proceeds from block 338 to block 344 to process the end receive state.

Figure 22:
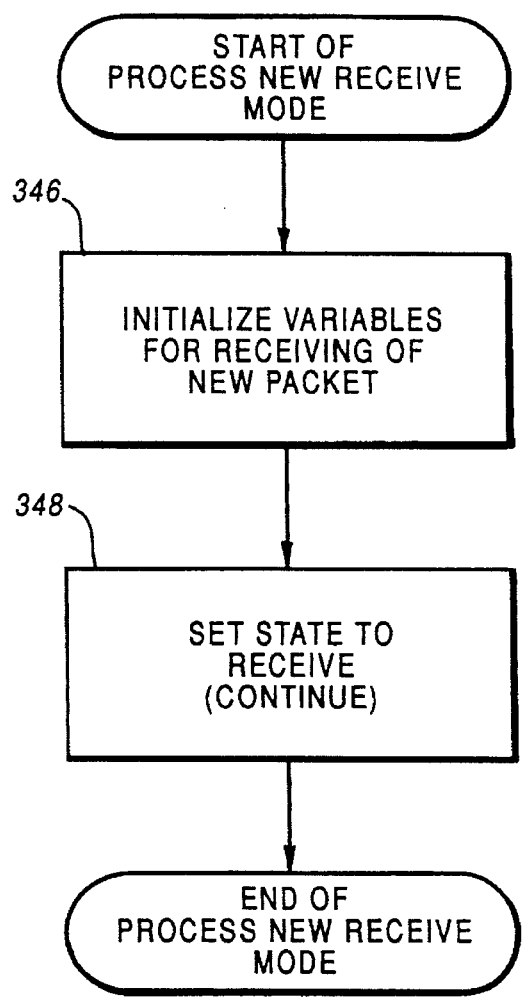
FIG. 22 is a flow chart illustrating a Process New Receive Mode software routine.
Figure 24:
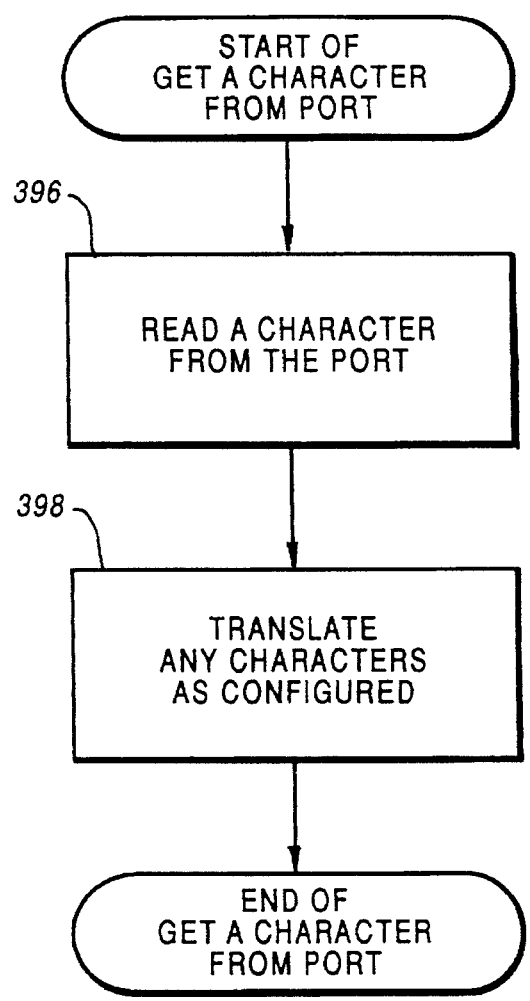
FIG. 24 is a flow chart illustrating a Get a Character From Port software routine.
Figure 23A:
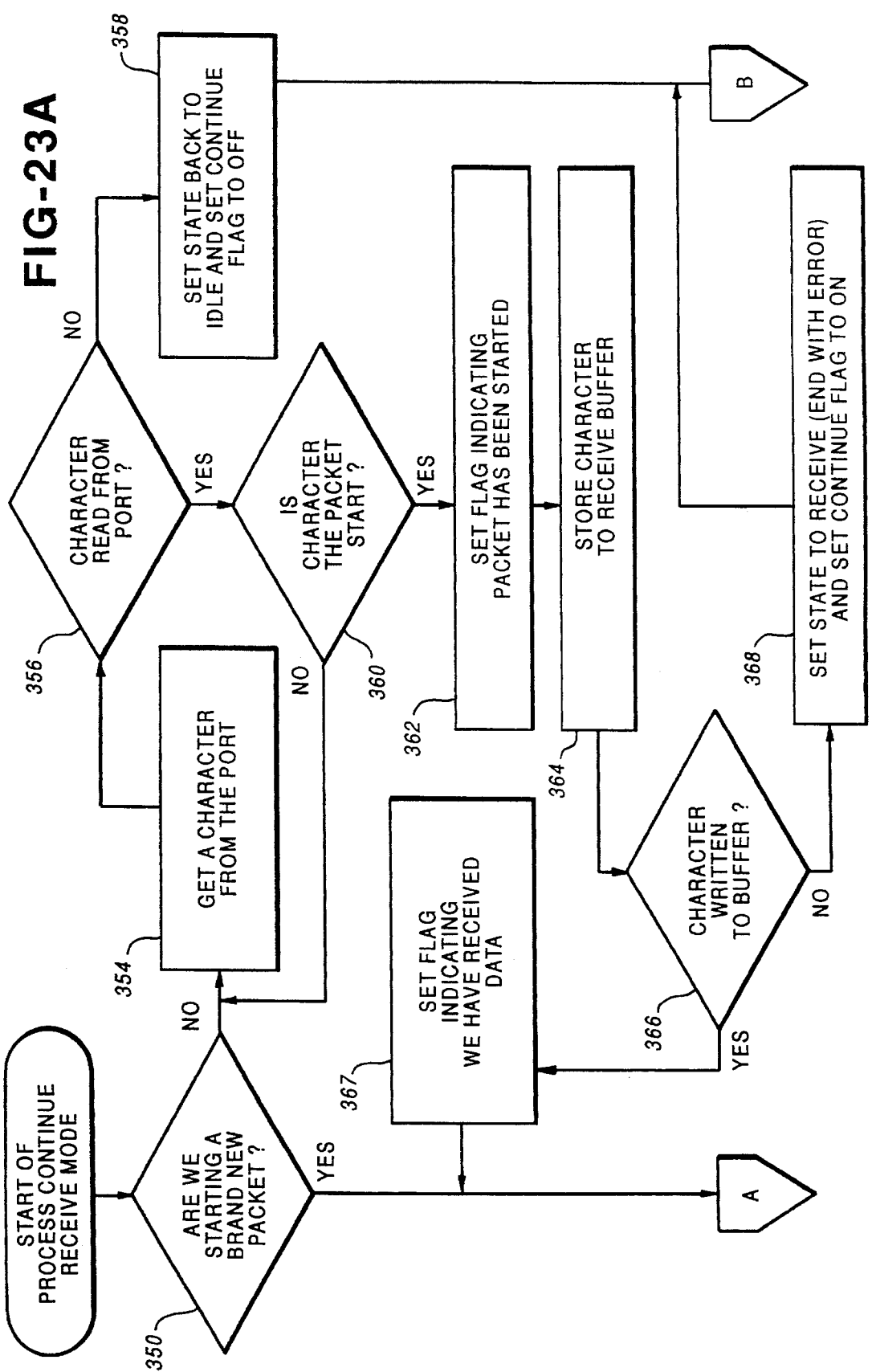
FIGS. 23A–C form a flow chart illustrating a Process Continue Receive Mode software routine.
Figure 23B:
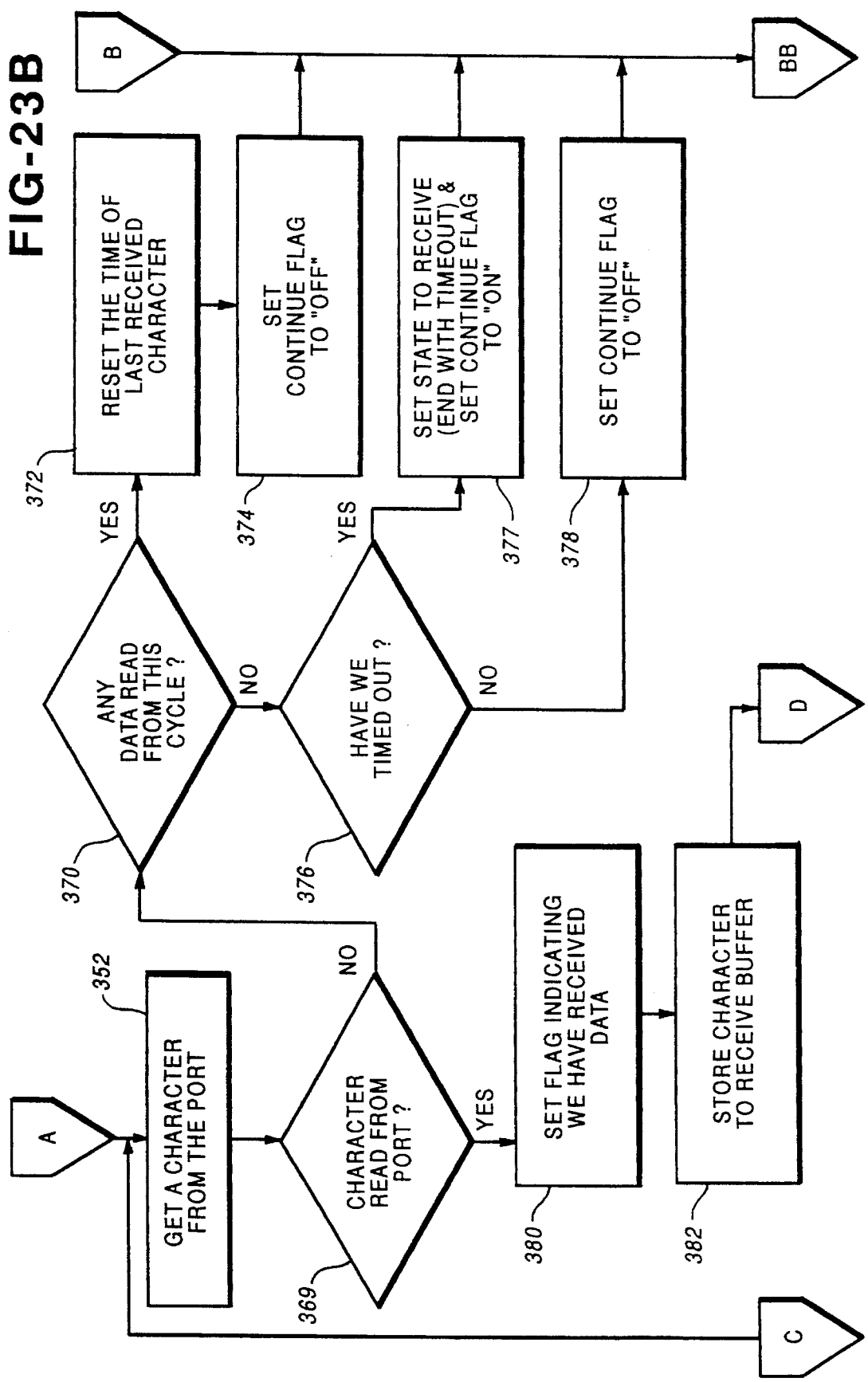
Figure 23C:
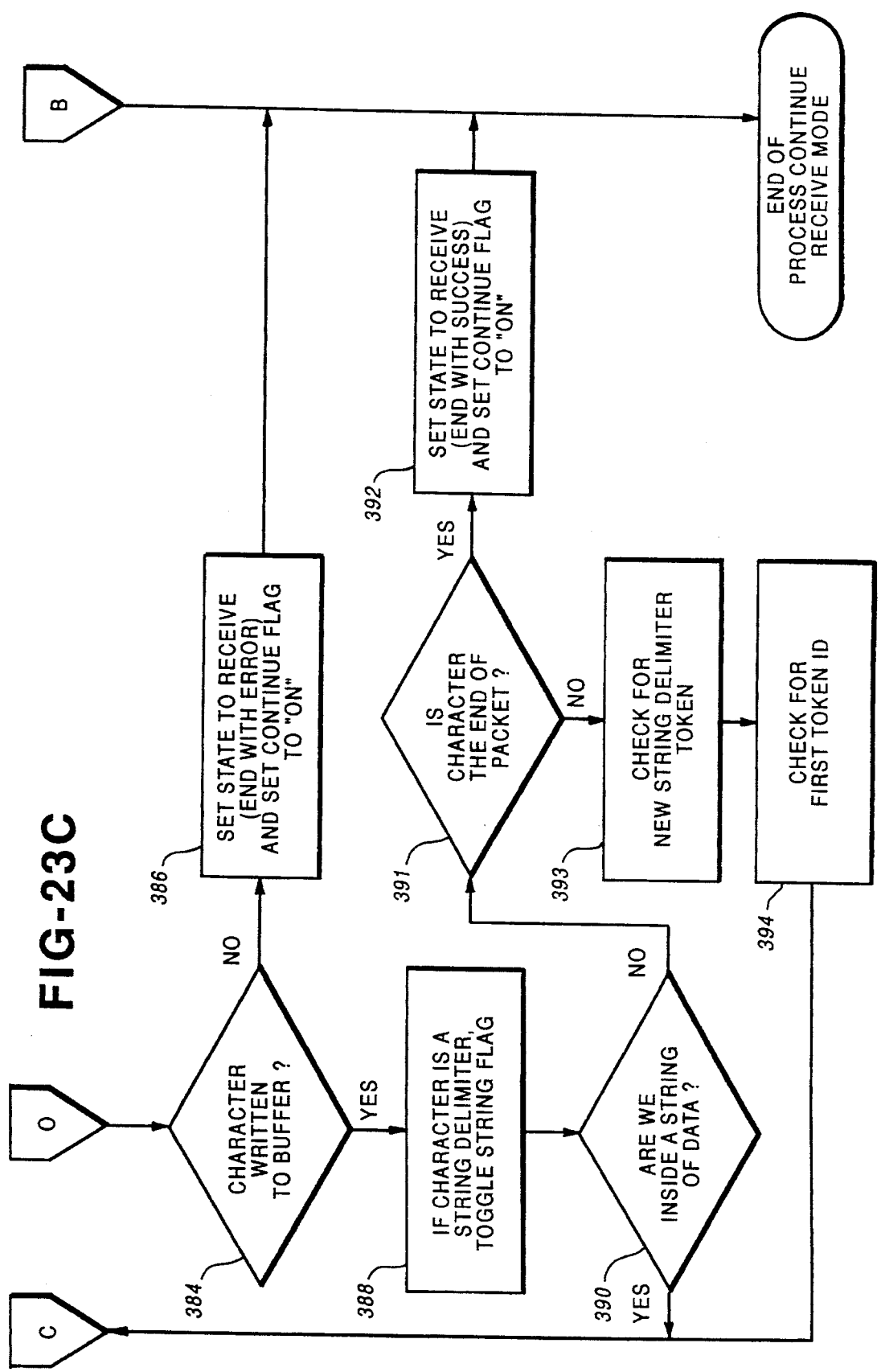
Figure 25A:
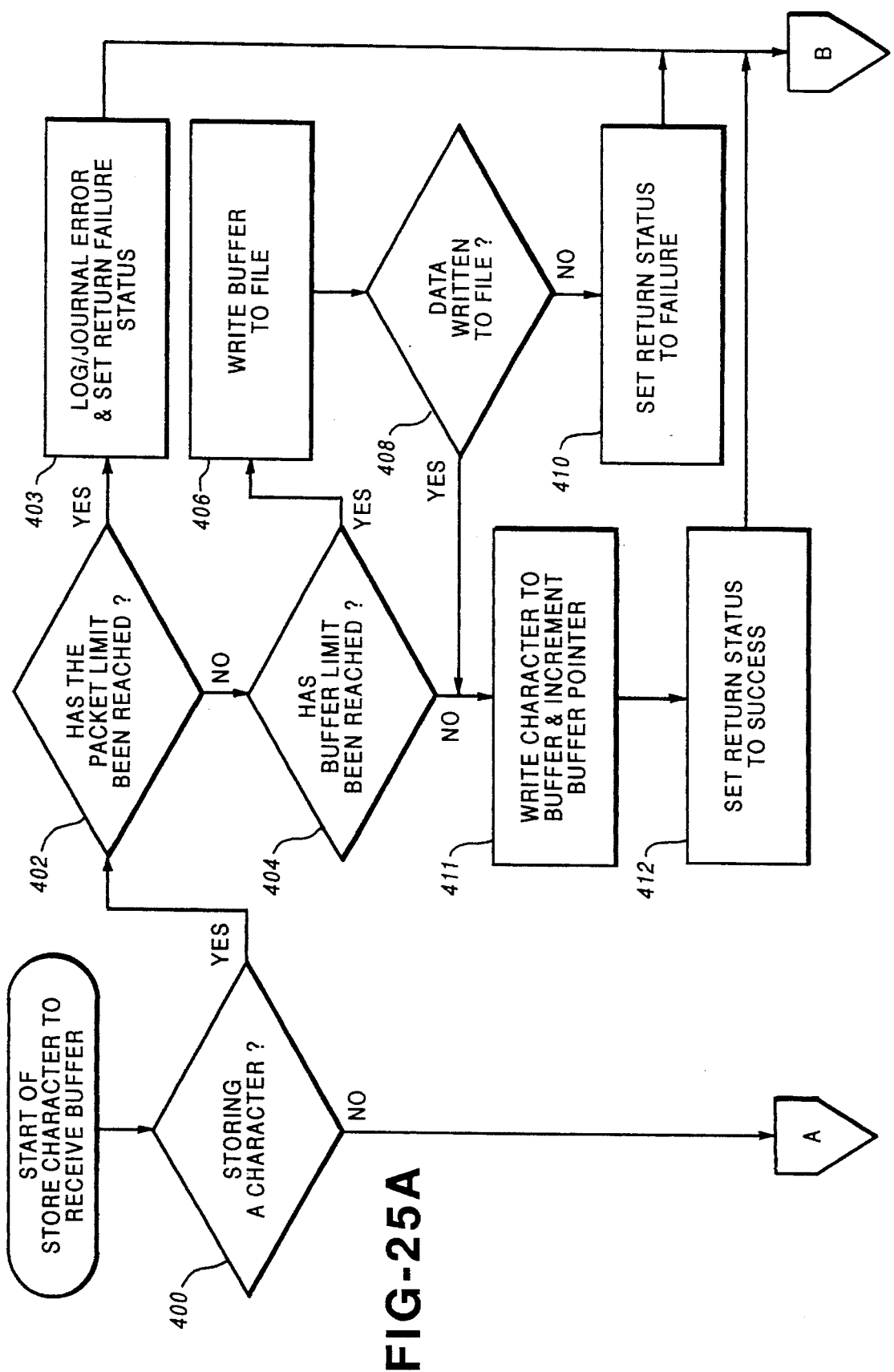
FIGS. 25A–B form a flow chart illustrating a Store Character to Receive Buffer software routine.
Figure 25B:
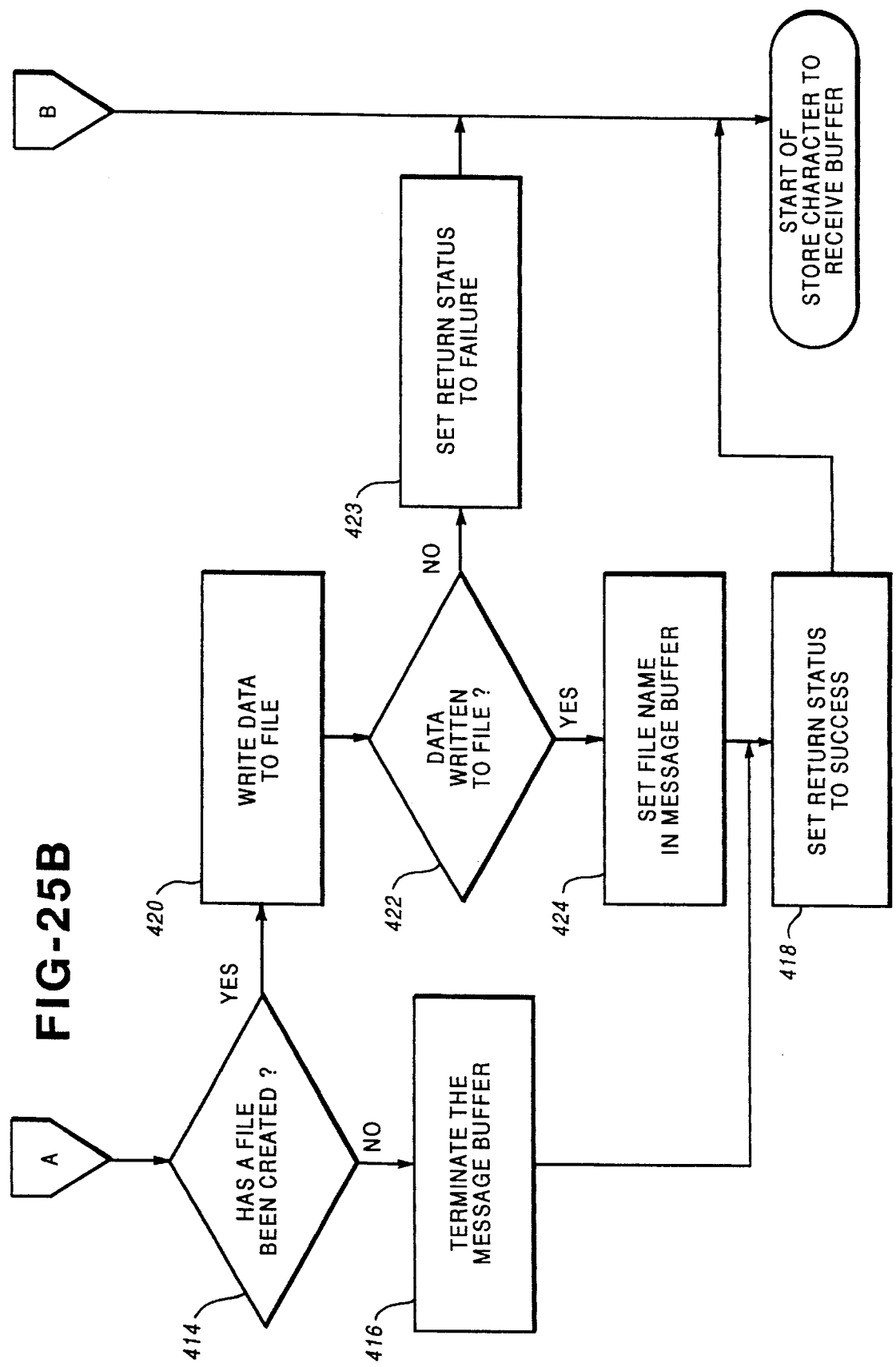

The microprocessor processes a new receive state in accordance with the flow chart depicted in FIG. 22 wherein the microprocessor 14 at a block 346 initializes variables for receiving a new packet from a host processing system. Thereafter, the microprocessor at a block 348 sets the state of the active session to the continue receive state. Upon entering the process continue receive state routine depicted in FIGS. 23A–C, the microprocessor 14 at a block 350 determines whether the local system 10 is starting to receive a brand new packet and if so, the microprocessor proceeds to block 354 to get a character from the communication port associated with the active session in accordance with the routine depicted in FIG. 24. Thereafter, the microprocessor at a block 356 determines whether a character was read from the session's communication port. If not, the microprocessor proceeds to block 358 to set the state of the active session back to the idle state and to set the continue flag to off. If, however, a character was read from the session's communication port, the microprocessor proceeds from block 356 to block 360 to determine whether the character indicates the start of the packet. If not, the microprocessor proceeds to block 354. If the character does indicate the start of the packet, the microprocessor proceeds to block 362 to set a flag indicating that the packet has been started. Thereafter, at a block 364, the microprocessor stores the character to the receive buffer as depicted in FIGS. 25A–B. At a block 366, the microprocessor 14 then determines whether the character has been written to the receive buffer and if not, the microprocessor at block 368 sets the state to receive, end with error and sets the continue flag to on. If, however, the character was written to the buffer, the microprocessor proceeds to block 367 to set a flag indicating that data has been received. The microprocessor 14 then proceeds to block 352 to get a character from the communication port associated with the active session. Thereafter, the microprocessor at block 369 determines whether the character was read from the port and if not, the microprocessor determines at a block 370 whether any data was read during the cycle. If so, the microprocessor at a block 372 resets the time of the last received character and at a block 374 sets the continue flag to off. If the microprocessor determines that no data was read during this cycle at the block 370, the microprocessor proceeds to block 376 to determine whether the time to receive a character has been timed out. If so, the microprocessor proceeds to block 377 to set the state to the receive-end with time out and sets the continue flag to on. If the microprocessor at block 376 has determined that there has been no time out, the microprocessor proceeds to block 378 to set the continue flag to off. If the microprocessor 14 determines at block 369 that a character has been read from the session's communication port, the microprocessor proceeds to block 380 to set a flag indicating that data has been received and thereafter proceeds to block 382 to store the character to the receive buffer. At a block 384 the microprocessor 14 determines whether the character was written to the buffer and if not, the microprocessor at block 386 sets the state to receive-end with error and sets the continue flag to on. If the microprocessor 14 determines that the character was written to the buffer at a block 384, the microprocessor 14 at a block 388 toggles the string flag if the character is a string delimiter. At a block 390, the microprocessor 14 determines whether it is in the midst of receiving a string of data and if so, proceeds back to block 352. If it is not, however, the microprocessor 14 proceeds from block 390 to block 391 to determine whether the character is the end of the packet and if so, the microprocessor proceeds to block 392 to set the state to receive-end with success and to set the continue flag to on. If the character is not the end of packet character, the microprocessor proceeds to block 393 from block 391 and at block 393 the microprocessor checks for a new string delimiter token. Thereafter, the microprocessor at a block 394 checks for the first token ID and proceeds thereafter to block 352. In the receive mode, the microprocessor 14 gets a character from a communication port in accordance with the flow chart depicted in FIG. 24. More particularly, at a block 396 the microprocessor 14 reads a character from the communication port associated with the active session and at block 398 the microprocessor 14 translates any characters as configured.

In the receive mode, the microprocessor 14 stores a character to the receive buffer in accordance with the flow charts depicted in FIGS. 25A and B. More particularly, the microprocessor 14 at a block 400 determines whether a character is to be stored and if so, proceeds to block 402. At block 402 the microprocessor 14 determines whether the packet has exceeded the maximum character limit and if so, proceeds to block 403 to log or journal an error message and to set the return status to failure. If the packet limit for characters has not been reached, the microprocessor proceeds from block 402 to block 404 to determine whether the limit of the receive buffer has been reached. If so, the microprocessor proceeds to block 406 to write the buffer to a file. At block 408, the microprocessor then determines if the data has been written to the file and if not, the microprocessor 14 at a block 410 sets the return status to a failure. If the receive buffer limit has not been reached or if it has been but the data has been written to a file, the microprocessor proceeds from respective blocks 404 or 408 to block 411 to write the character to the receive buffer and to increment the buffer pointer. Thereafter, at a block 412 the microprocessor sets the return status to success. If the microprocessor determined at block 400 that the character is not to be stored, the microprocessor determines at a block 414 whether a file has been created and if so, proceeds to block 420. At block 420, the microprocessor 14 writes the data to the file that has been created and checks at block 422 to determine whether the data was written to the file. If not, at a block 423, the microprocessor 14 sets the return status to failure. If, however, the data was written to the file, the microprocessor proceeds to block 424 to set the file name in the message buffer and proceeds thereafter to block 418 to set the return status to success. If the microprocessor determines at block 414 that a file has not been created, the microprocessor proceeds from block 414 to block 416 to terminate the message buffer. Thereafter, the microprocessor sets the return status to success at block 418.

Figure 26A:
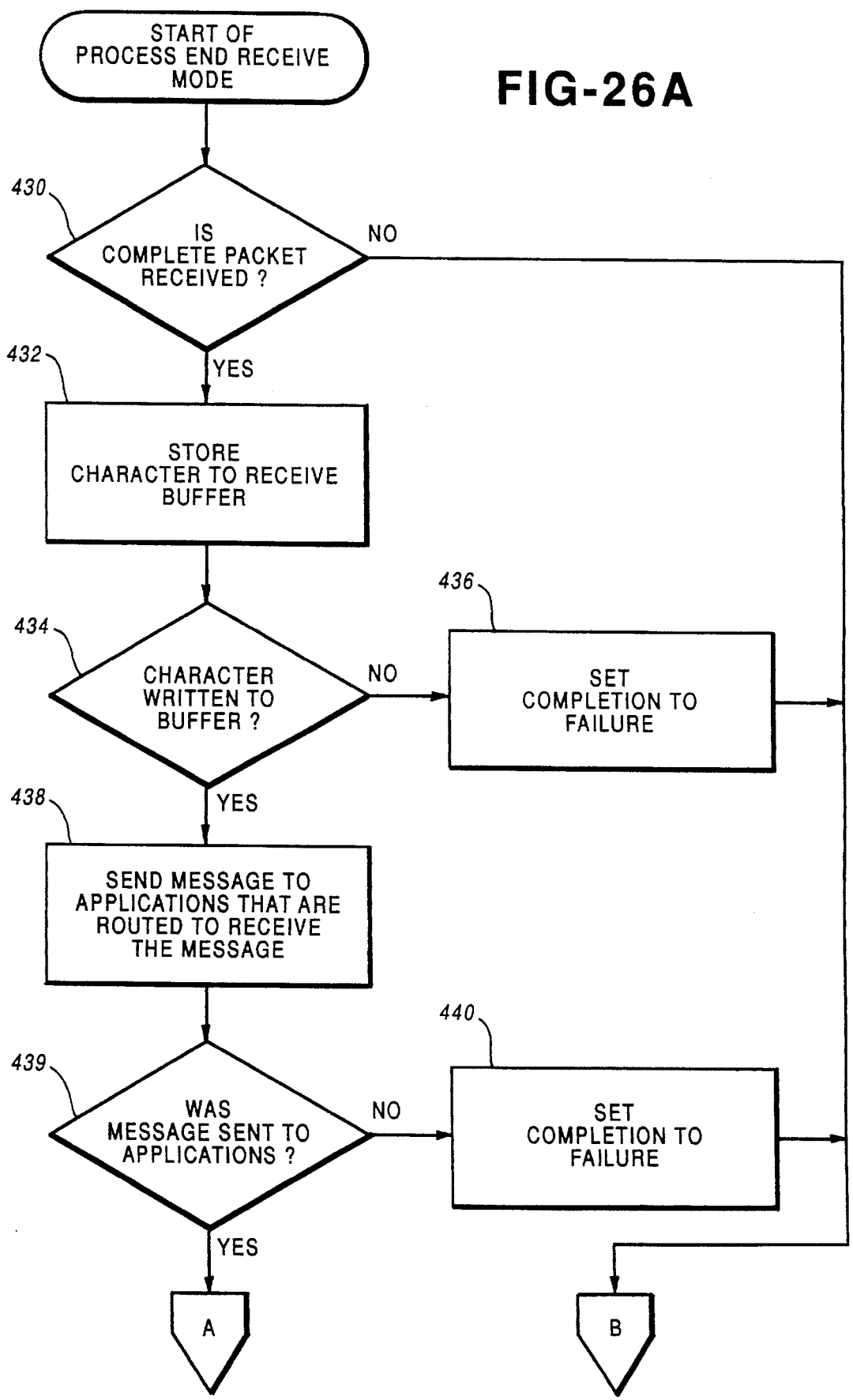
FIGS. 26A–B form a flow chart illustrating a Process and Receive Mode software routine.
Figure 26B:
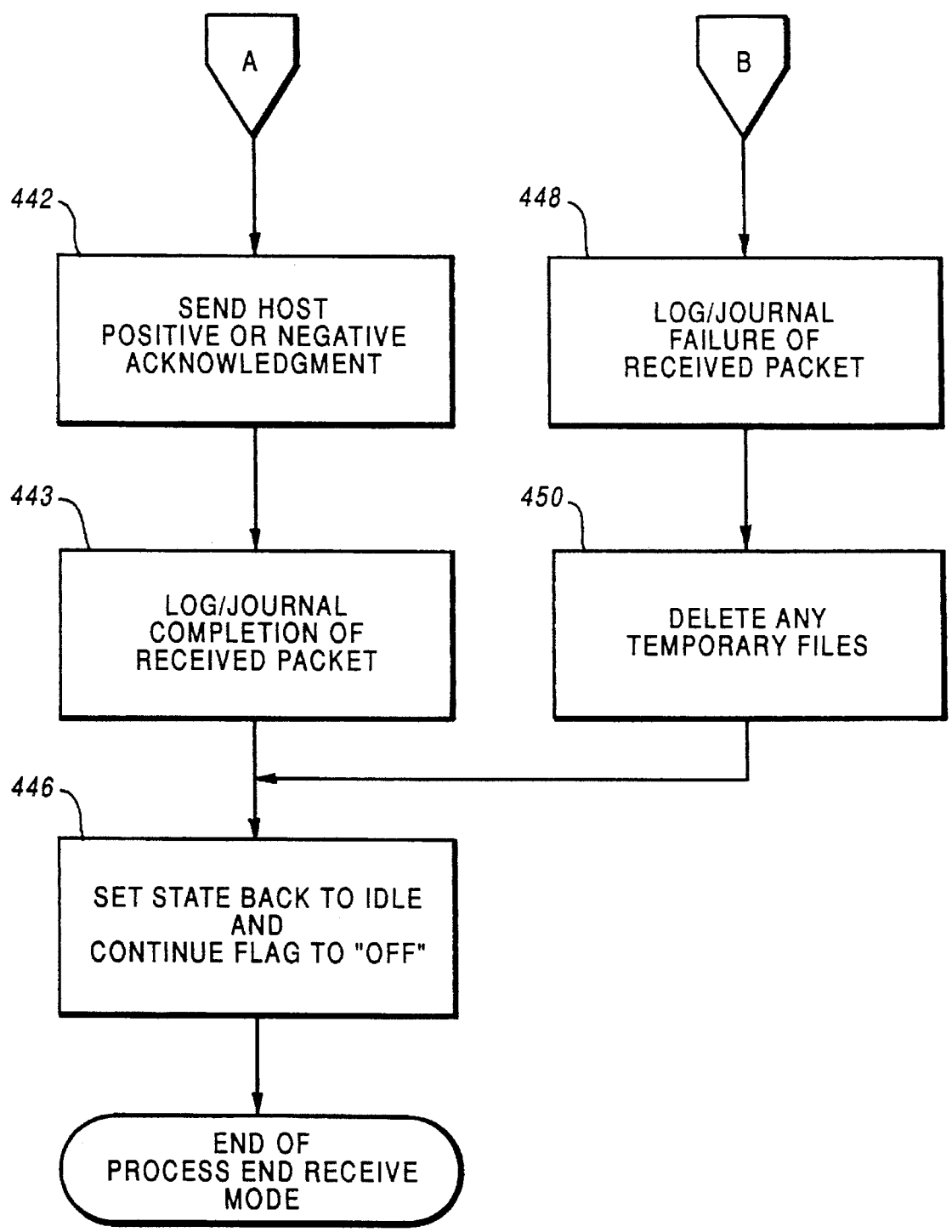

The microprocessor 14 processes the end receive mode in accordance with the flow charts depicted in FIGS. 26A and B. At a block 430 the microprocessor determines whether a complete packet has been received and if not, the microprocessor proceeds to block 448 to log or journal a message indicating the failure of a received packet. Thereafter, the microprocessor at a block 450 deletes any temporary files and at a block 446 sets the state back to idle and the continue flag to off. If, however, the microprocessor at block 430 determines that a complete packet has been received, the microprocessor proceeds to block 432 to store a character to the receive buffer as discussed above with respect to FIGS. 25A and B. Thereafter, the microprocessor determines at block 434 whether the character was written to the buffer and if not, at a block 436 the microprocessor 14 sets the completion status to failure and proceeds to block 448. If the character was written to the buffer as determined at block 434, the microprocessor proceeds to block 438 to send the message to the packet handlers that are routed to receive the message. At a block 439 the microprocessor 14 then determines whether the message was sent and if not, the microprocessor at a block 440 sets the completion status to failure. If the message has been sent, the microprocessor proceeds from block 439 to block 442 to send to the host processing system a positive or negative acknowledgement and at block 444 the microprocessor 14 logs or journals a message indicating the completion of a received packet. Thereafter, the microprocessor at block 446 sets the state of the active session back to idle and sets the continue flag to off.

Figure 27:
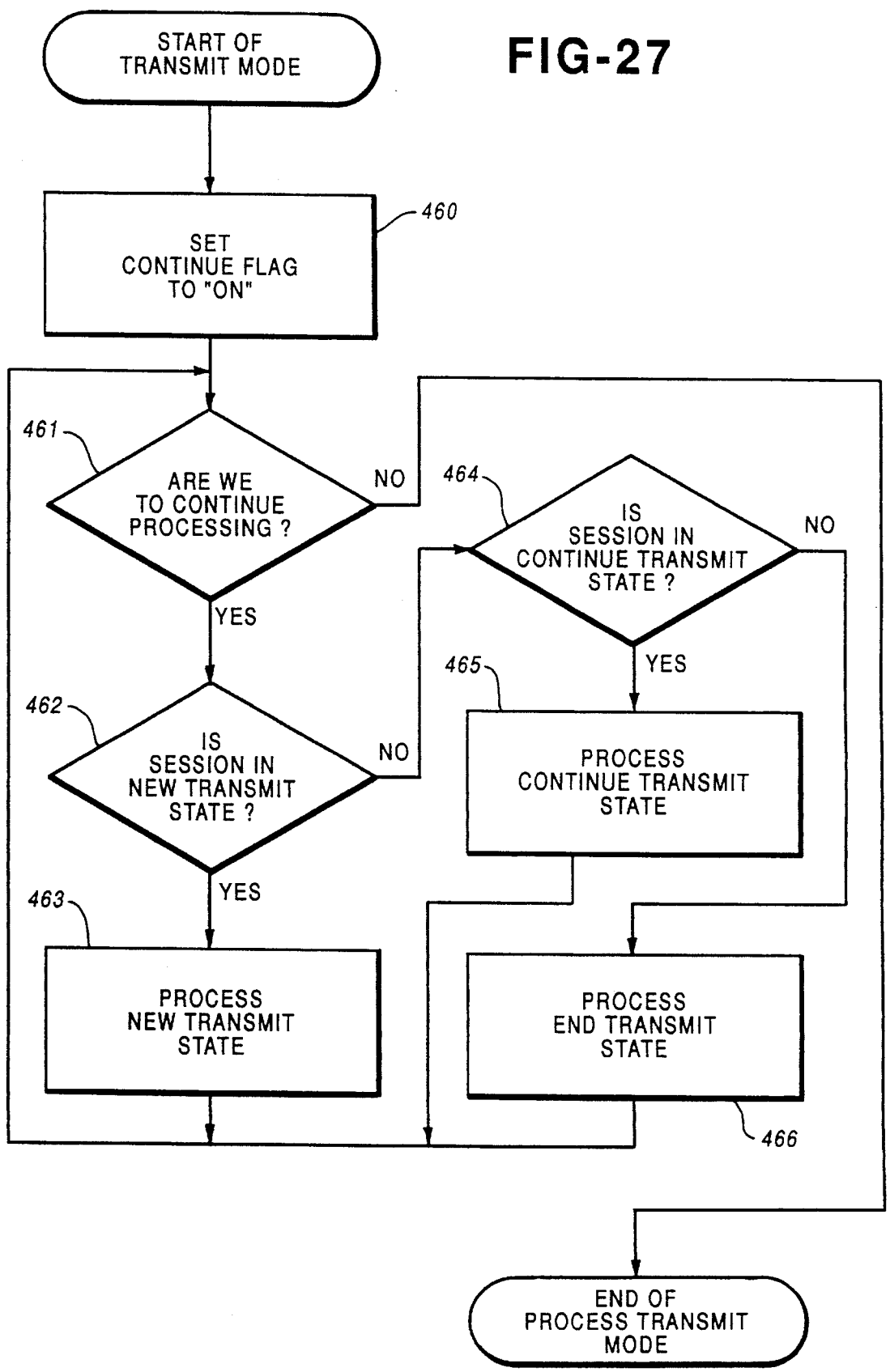
FIG. 27 is a flow chart illustrating a Process Transmit Mode software routine.
Figure 28:
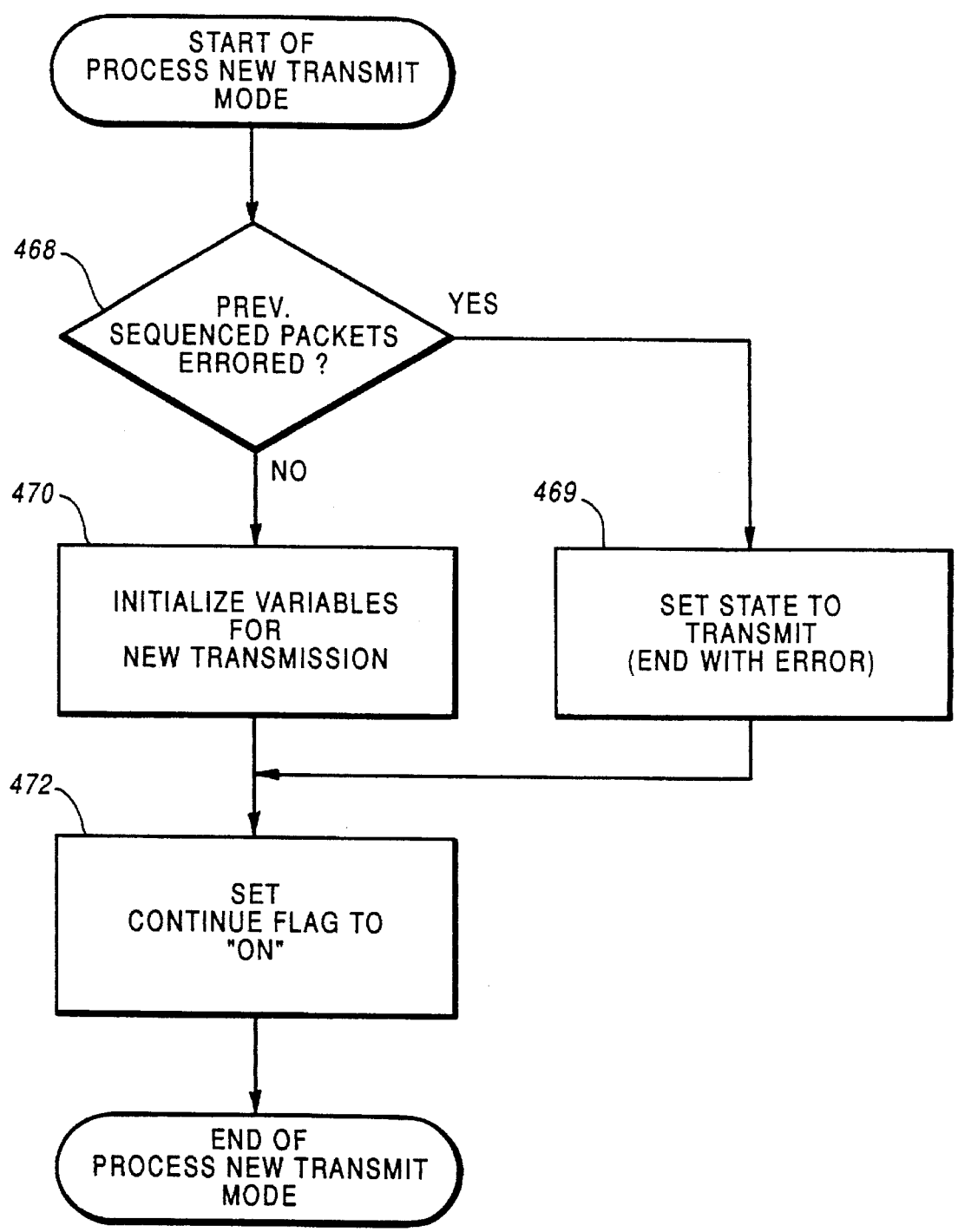
FIG. 28 is a flow chart illustrating a Process New Transmit Mode software routine.
Figure 29:
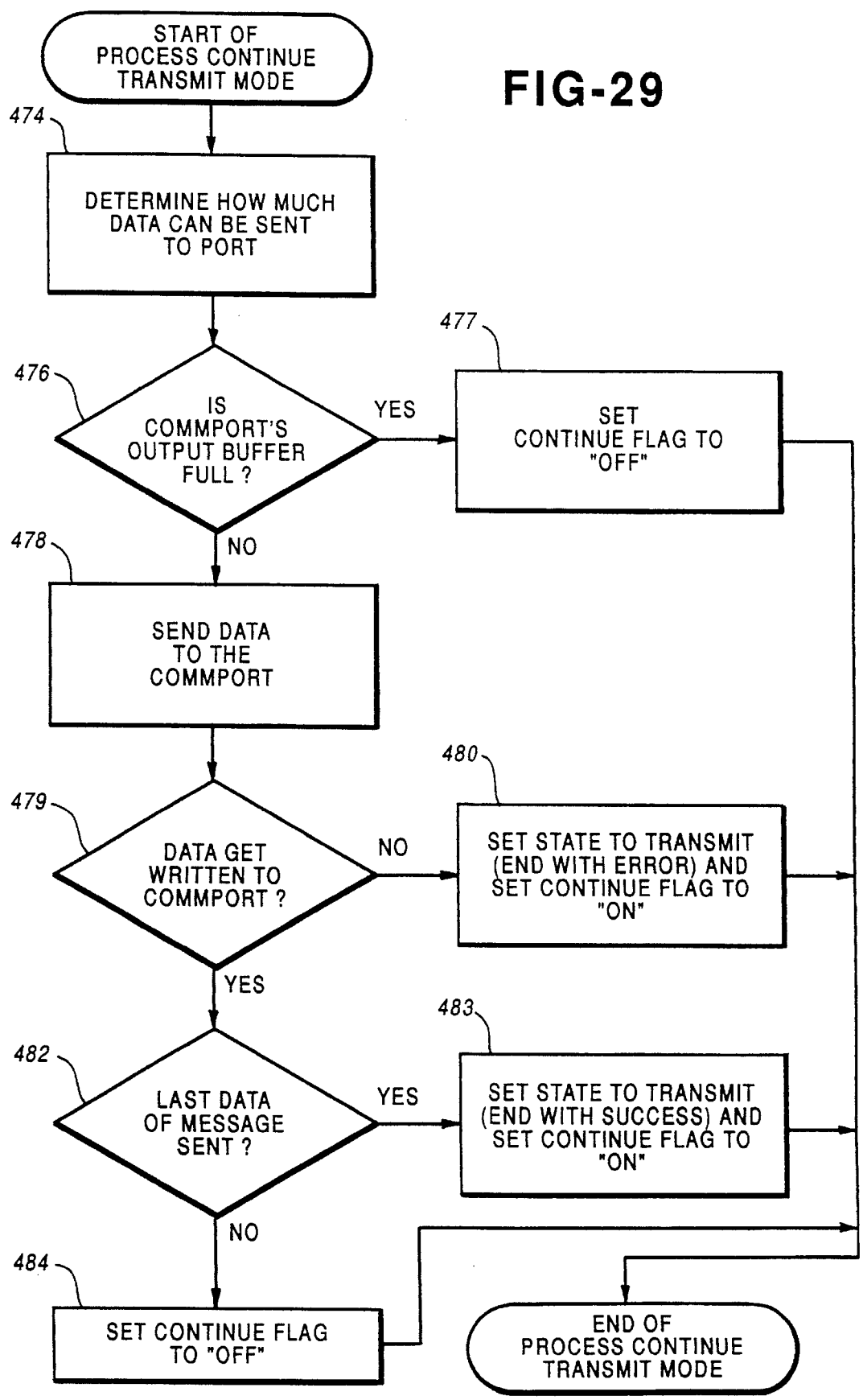
FIG. 29 is a flow chart illustrating a Process Continue Transmit Mode software routine.

When an active session is in the transmit mode, the microprocessor operates in accordance with the flow chart in FIG. 27. More particularly, at a block 460, the microprocessor 14 sets the continue flag to on and at a block 461 determines whether it is to continue processing or not. If processing is to continue, the microprocessor at a block 462 determines whether the session is in a new transmit state and if so, it proceeds to block 463 to process the new transmit state. If the microprocessor determines at a block 464 that the session is in a continue transmit state, the microprocessor proceeds to block 465 to process the continue transmit state. Otherwise, the microprocessor proceeds from block 464 to block 466 to process the end transmit state.

Figure 21:
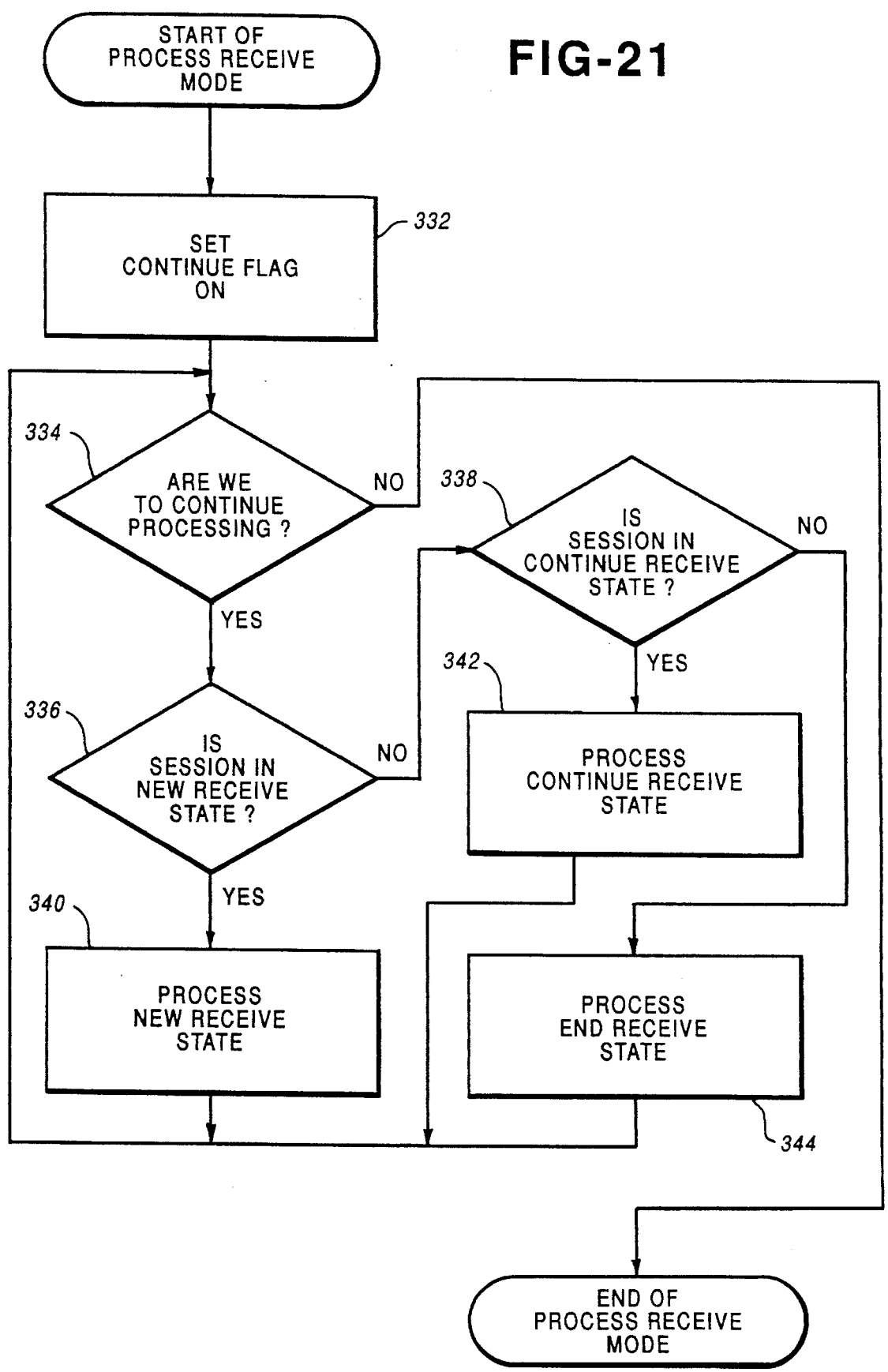
FIG. 21 is a flow chart illustrating a Process Receive Mode software routine.
Figure 30B:
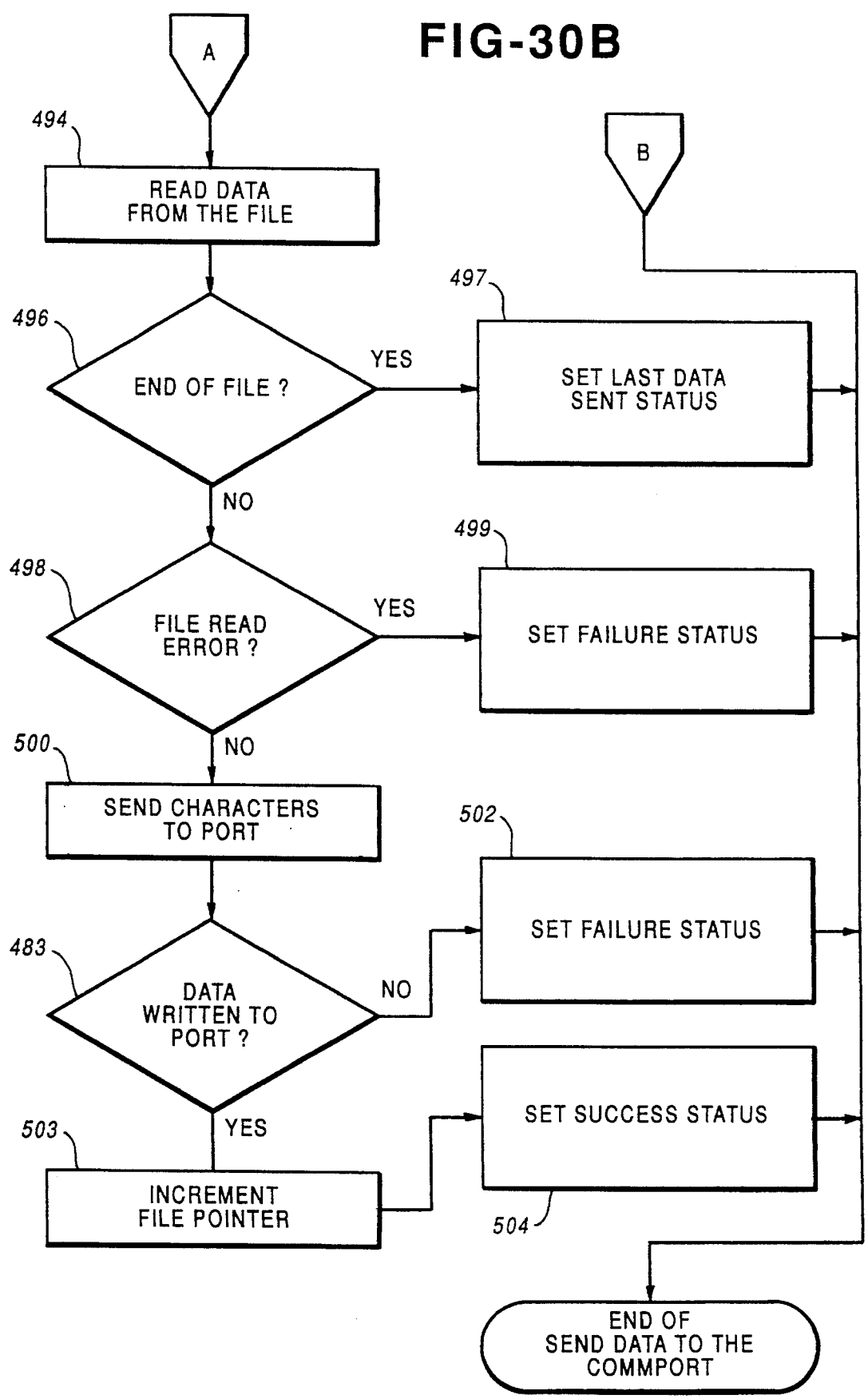
Figure 31:
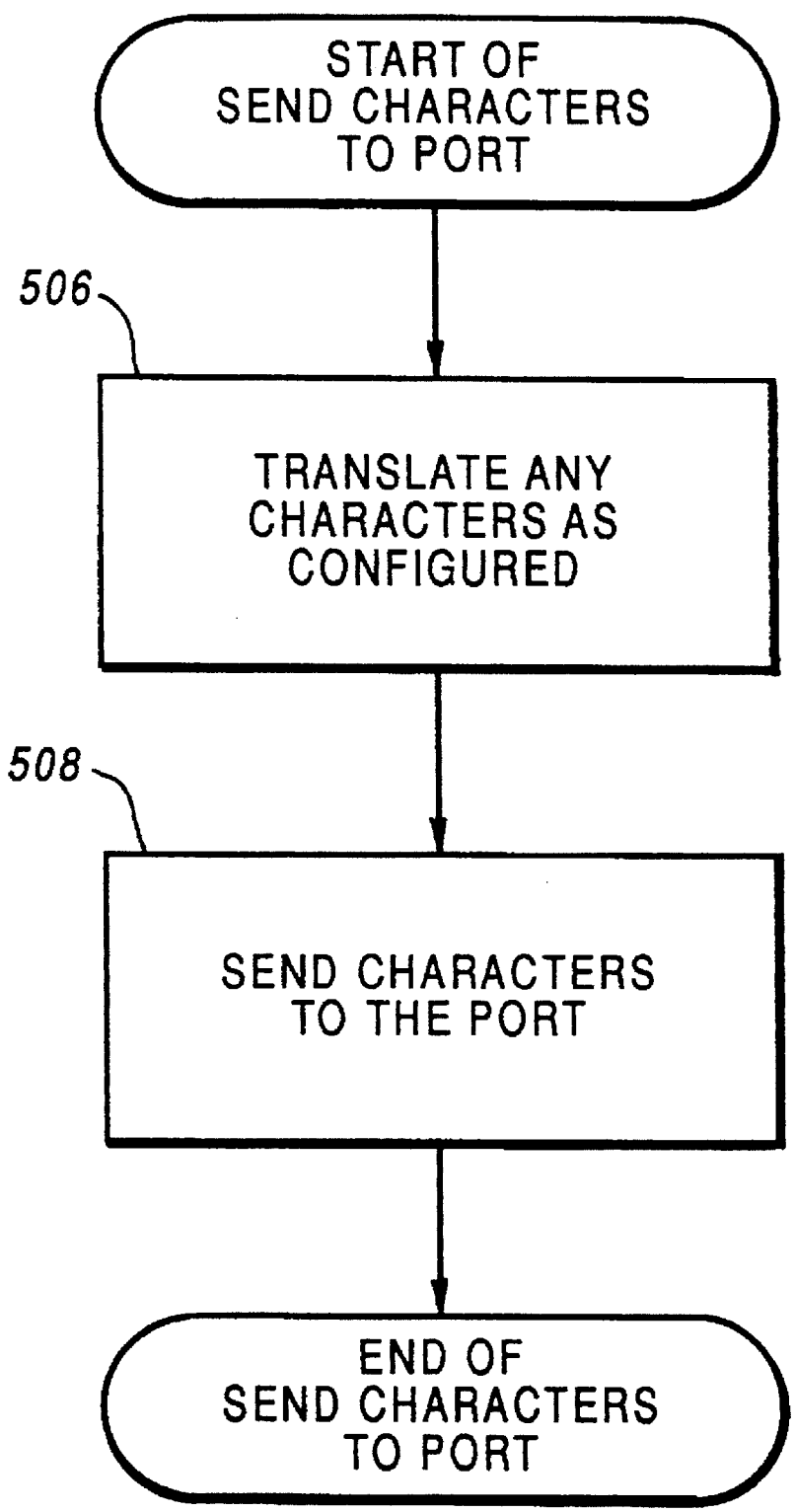
FIG. 31 is a flow chart illustrating a Send Characters to Port software routine.

As shown in FIG. 21, the microprocessor 14 processes the new transmit state by first determining at a block 468 whether the previously sequenced packets have erred and if so, the microprocessor proceeds to block 469 to set the state of the active session to transmit-end with an error. If the previously sequenced packets have not erred, however, the microprocessor proceeds to block 470 from block 468 to initialize variables for the new transmission. Thereafter, the microprocessor at a block 472 sets the continue flag to on. In order to process the continue transmit state the microprocessor operates in accordance with the flow chart depicted in FIG. 29. At a block 474 the microprocessor first determines how much data can be sent to the communication port associated with the active session. Thereafter, at a block 476 the microprocessor 14 determines whether the communication port's output buffer is full. If so, the microprocessor proceeds to block 477 to set the continue flag to off. Otherwise, the microprocessor proceeds to block 478 to send the data to the communication port associated with the active session as depicted in FIGS. 30A-B. After sending the data to the communication port, the microprocessor determines at a block 479 whether the data did get written to the communication port. If not, the microprocessor proceeds to block 480 to set the state of the active session to transmit-end with error and further sets the continue flag to on. If the data did get written to the communication port, the microprocessor proceeds from block 479 to block 482 to determine whether the last data of the message was sent and if so, the microprocessor proceeds to block 483 to set the state of the active session to transmit-end with success and to set the continue flag to on. If the last data of the message was not sent, the microprocessor at block 484 sets the continue flag to off.

The microprocessor 14 in accordance with the flow charts depicted in FIGS. 30A and B sends data to the communication port associated with an active session that is being processed. More particularly, at a block 485 the microprocessor 14 determines whether the packet is a memory packet and if so, the microprocessor proceeds to block 486 to calculate the number of bytes left to send in the message. Thereafter, the microprocessor at a block 487 determines whether there are any bytes of data left to be sent. If not, the microprocessor proceeds to block 488 to set the last data sent status. If there are more bytes left in the memory packet to be sent to the communication port, the microprocessor proceeds from block 487 to block 489 to implement the flow chart depicted in FIG. 31 at a block 489 to send the characters to the communication port. Thereafter, the microprocessor at block 490 determines whether the data was written to the communication port and if not, the microprocessor 14 at a block 491 sets the status to failure. Otherwise, the microprocessor proceeds from block 490 to block 492 to increment the message buffer pointer and at block 493 the microprocessor 14 sets the status to success. If the microprocessor 14 determines at block 485 that the packet is not a memory packet, the microprocessor proceeds to block 494 to read data from the data file. Thereafter, at a block 496 the microprocessor determines whether the end of the file has been reached and if so, proceeds to block 497 to set the last data sent status. If the end of file has not been reached, the microprocessor at a block 498 determines whether there has been a file read error and if so, sets the status to failure at block 499. If there has not been a file read error the microprocessor at block 500 implements the flow chart depicted in FIG. 31 to send the characters to the communication port associated with the active session. Thereafter, at a block 501, the microprocessor 14 determines whether the data was written to the communication port and if not, at a block 502 the microprocessor 14 sets the status to failure. If the data has been written to the communication port, the microprocessor proceeds to block 503 to increment the file pointer and to set the status to success at a block 504. The microprocessor 14 sends the characters to the communication port associated with an active session in accordance with the flow chart depicted in FIG. 31. More particularly, the microprocessor at block 506 translates any characters as configured for transmission and at block 508 sends the characters to the communication port.

Figure 32:
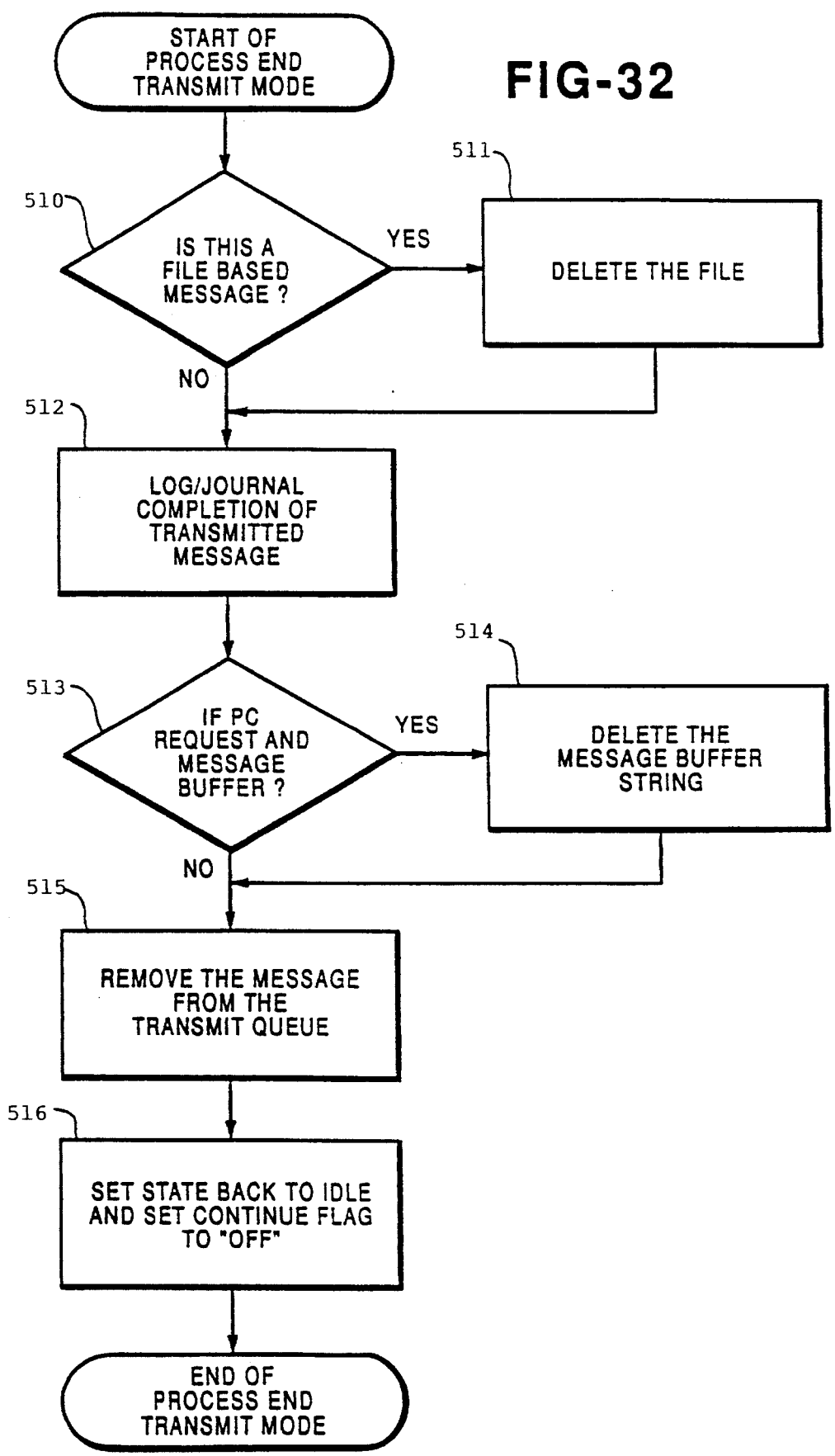
FIG. 32 is a Process Continue End Mode software routine.

The microprocessor 14 processes the continue end mode for an active session in accordance with the flow chart depicted in FIG. 32. More particularly, at a block 510 the microprocessor 14 determines whether the message is a file based message and if so, the microprocessor at block 511 deletes the file. If not, the microprocessor processor proceeds to block 512 to log or journal a message indicating the completion of a transmitted message to a host processing system 22, 24. Thereafter, the microprocessor at a block 513 determines whether the message was a P.C. request and if so, proceeds to block 514 to delete the message buffer string. Otherwise, the microprocessor proceeds to block 515 to remove the message from the transmit queue associated with the host interface module 16 and at a block 516 the microprocessor 14 sets the state of the active session back to idle and sets the continue flag to off.

Figure 45:
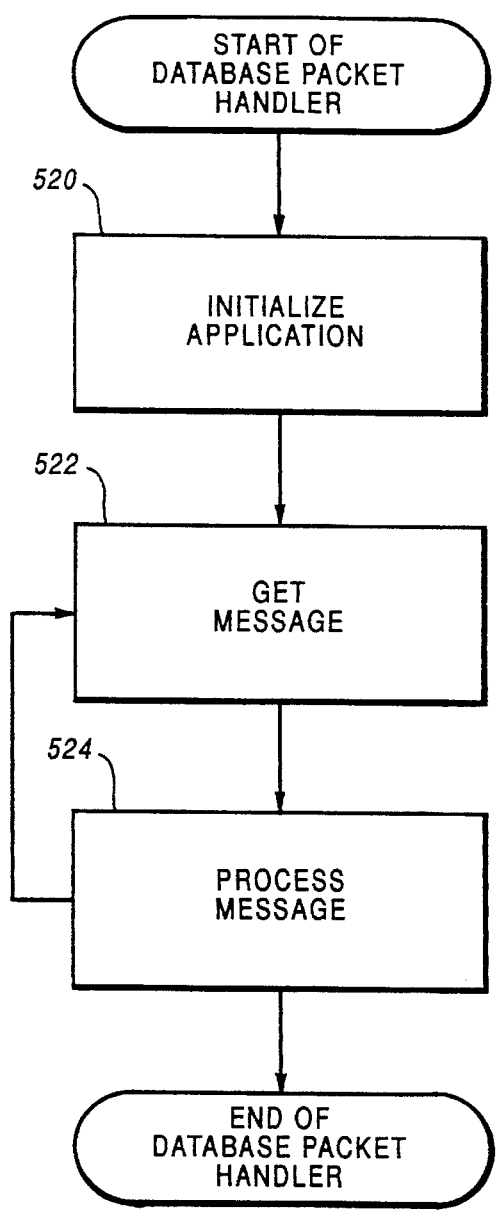
FIG. 45 is a flow chart illustrating a Database Packet Handler.
Figure 46:
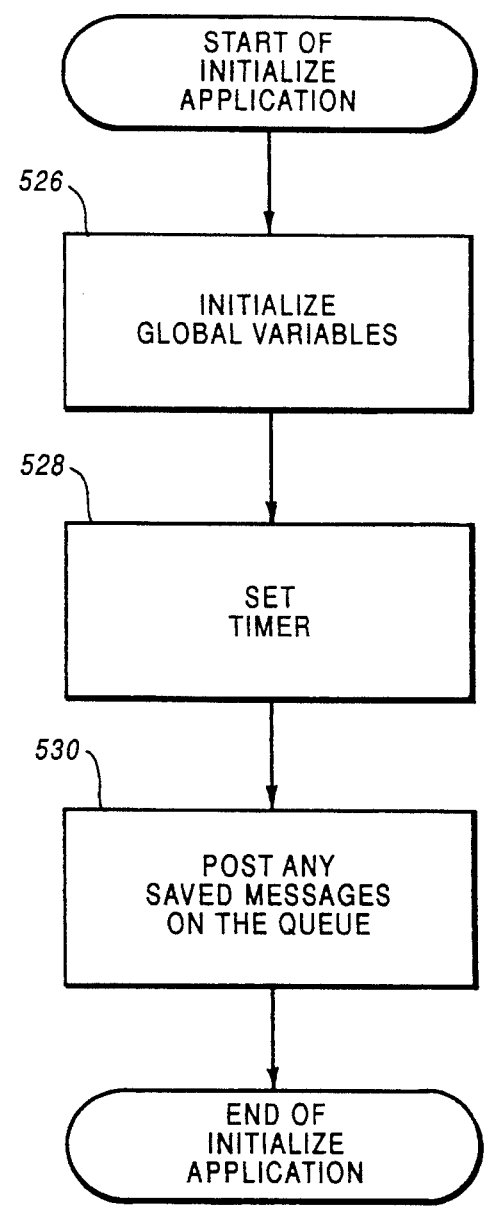
FIG. 46 is a flow chart illustrating an Initialize Application software routine for the Database Packet Handler.
Figure 47:
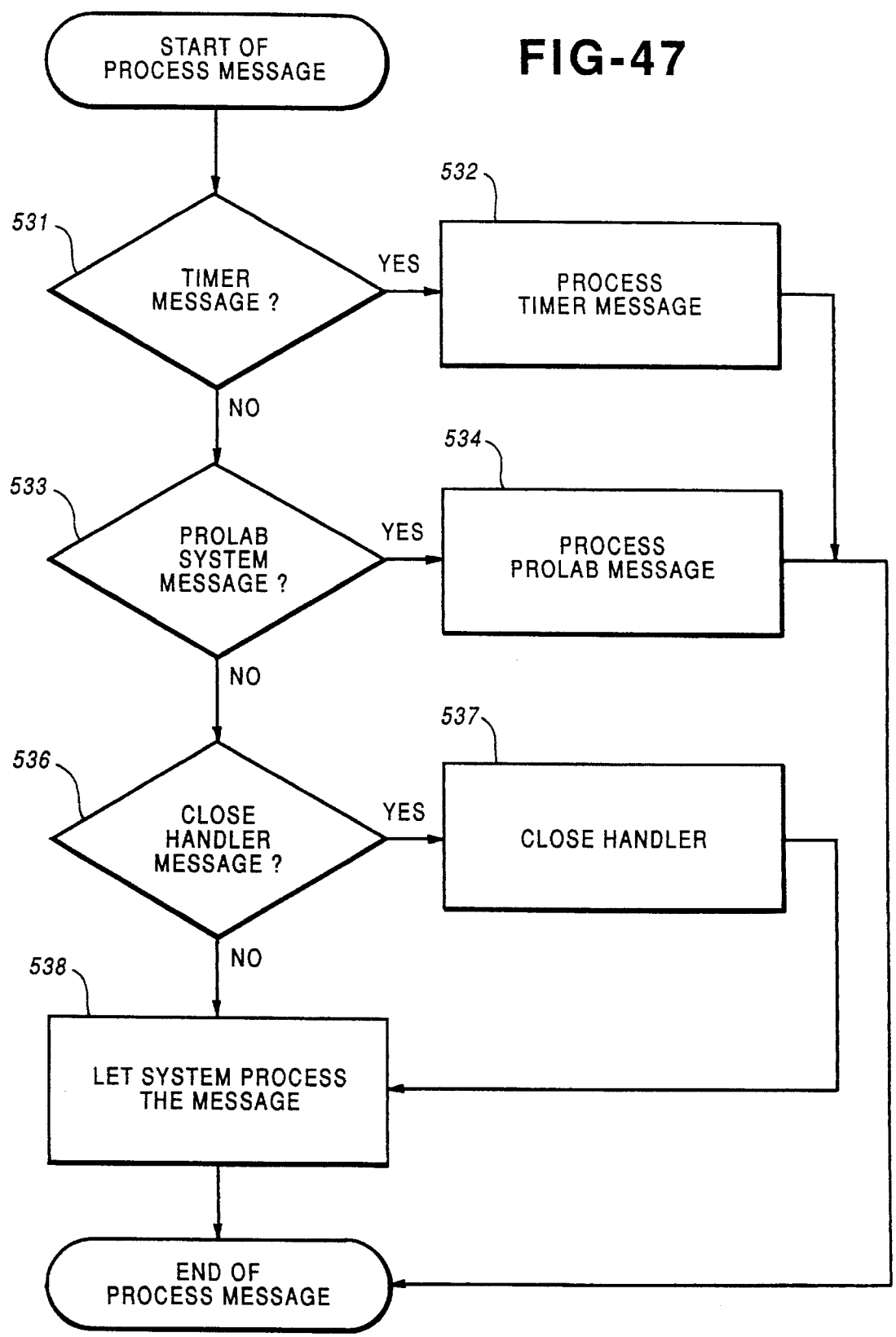
FIG. 47 is a flow chart illustrating a Process Messages software for the Database Packet Handler.

The database packet handler 18 will now be discussed in detail with respect to FIGS. 45–58. As shown in FIG. 45, when the database packet handler is started by the host interface module 16, the microprocessor 14 first initializes the database packet handler at block 520. Thereafter, at a block 522 the microprocessor gets the database message. At block 524 the microprocessor then processes the message. In order to initialize the database packet handler, the microprocessor at a block 526, depicted in FIG. 46 initializes the global variables and at a block 528 sets a timer. Thereafter, the microprocessor at a block 530 posts any saved messages on the database packet handler queue. In order to process a database message, the microprocessor operates in accordance with the flow chart depicted in FIG. 47. More particularly, the microprocessor determines at a block 531 whether the message is a timer message and if so, proceeds to block 532 to process the timer message. If the message is not a timer message but a system message as determined by the microprocessor 14 at a block 533, the microprocessor proceeds to block 534 to process the system message. If the microprocessor determines at block 536 that the message is a close database handler message, the microprocessor proceeds to block 537 to close the database handler. Otherwise, the microprocessor at block 538 lets the system process the message.

Figure 48:
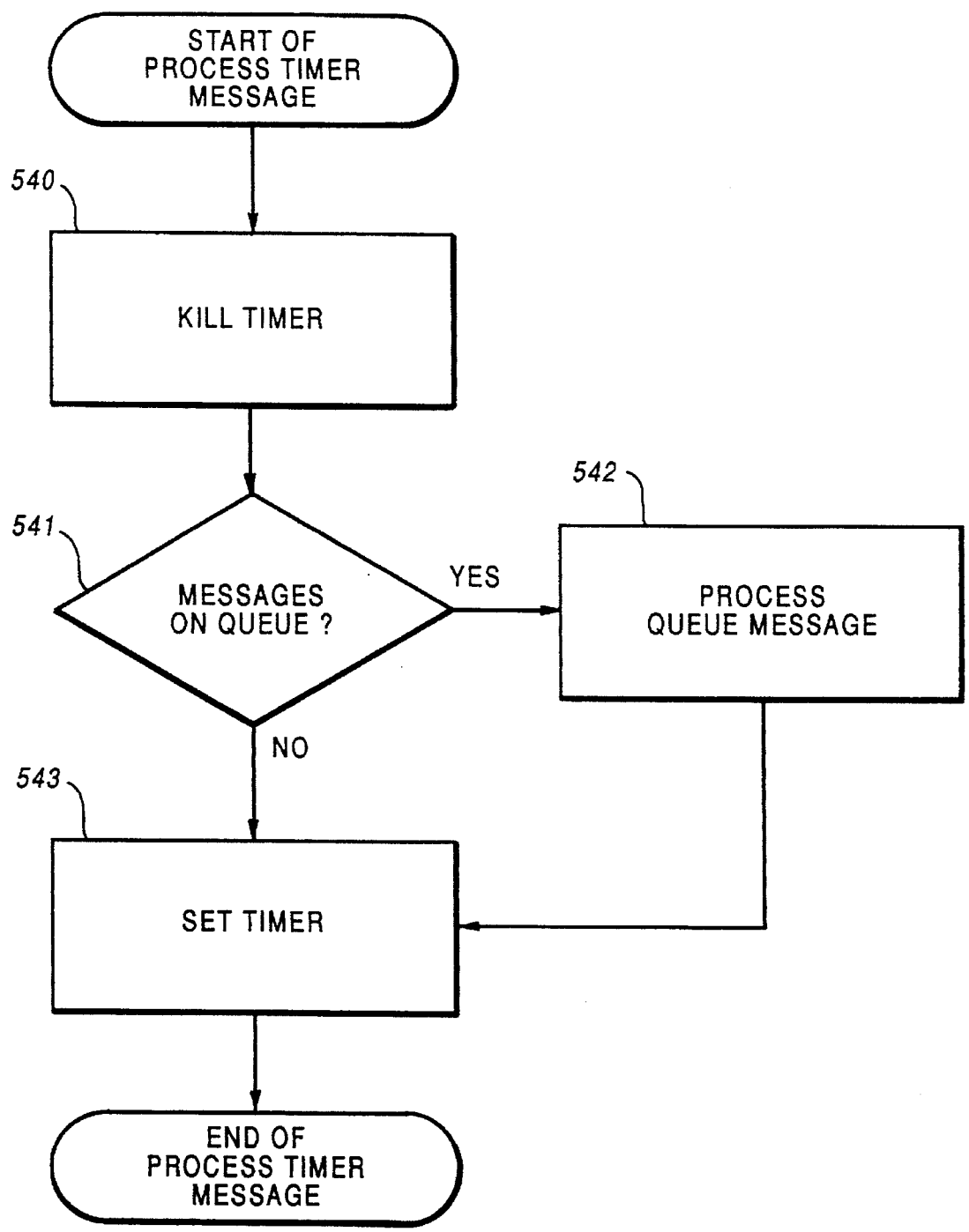
FIG. 48 is a flow chart illustrating a Process Timer Message for the Database Packet Handler.
Figure 49:
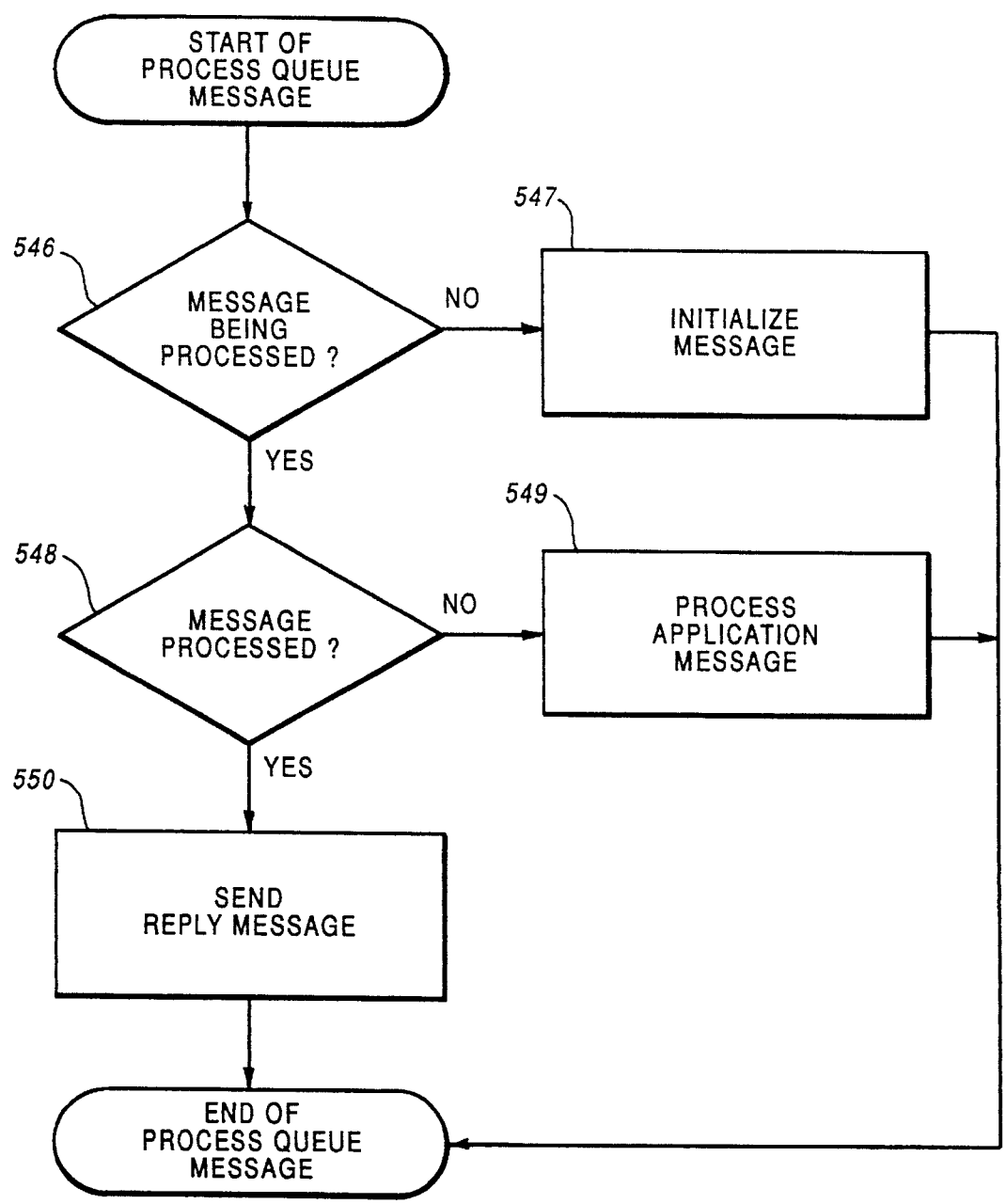
FIG. 49 is a flow chart illustrating a Process Queue Message for the Database Packet Handler.
Figure 50:
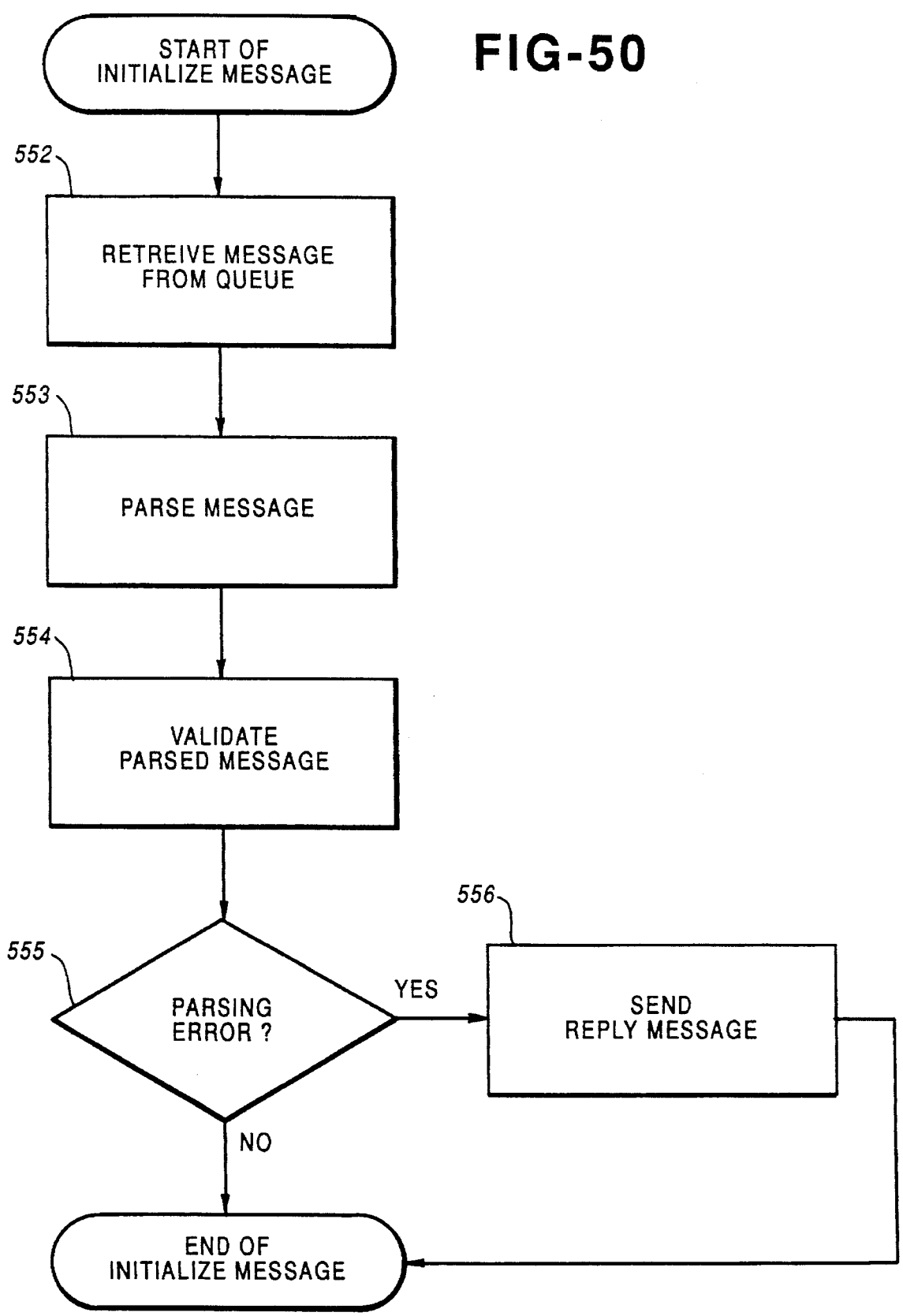
FIG. 50 is a flow chart illustrating an Initialize Message software routine for the Database Packet Handler.

As shown in FIG. 48, the microprocessor processes a timer message by first killing the timer at block 540. Thereafter, the microprocessor determines at a block 541 whether there are any messages on the queue associated with the database packet handler. If so, the microprocessor proceeds to block 542 to process the queue message and thereafter proceeds to block 554 to set the timer. If no messages are on the queue associated with the packet handler, the microprocessor proceeds from block 541 to block 543 to set the timer. The microprocessor 14 processes a queue message in accordance with the flow chart depicted in FIG. 49. More particularly, at a block 546 the microprocessor 14 determines whether there is a message being processed and if not, the microprocessor initializes the message for processing at a block 547. If a message is being processed, the microprocessor 14 proceeds from block 546 to block 548 to determine whether the message has been processed and if not, the microprocessor proceeds to block 549 to process the database packet handler message. If the message has been processed, however, the microprocessor proceeds to block 550 to send a reply message. A database packet handler message is initialized for processing in accordance with the flow chart depicted in FIG. 50. More particularly, the microprocessor 14 at a block 552 retrieves the message from the database packet handler queue and at a block 553 parses the messages. Thereafter, the microprocessor at block 554 validates the parsed message. If the microprocessor determines at a block 555 that a parsing error has occurred, the microprocessor proceeds to block 556 to send a reply message. Otherwise, the initialization of a database packet handler message is completed.

Figure 52:
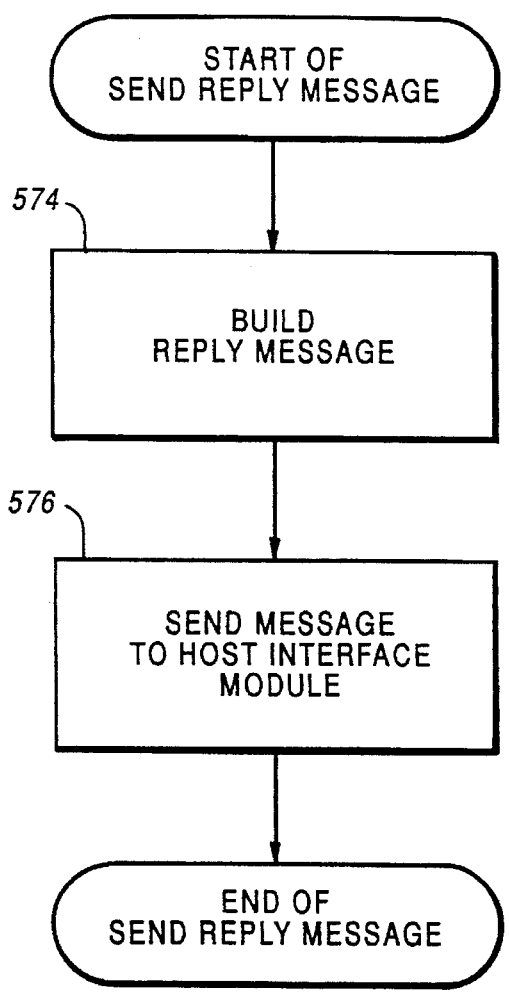
FIG. 52 is a flow chart illustrating a Send Reply Message for the Database Packet Handler.
Figure 53:
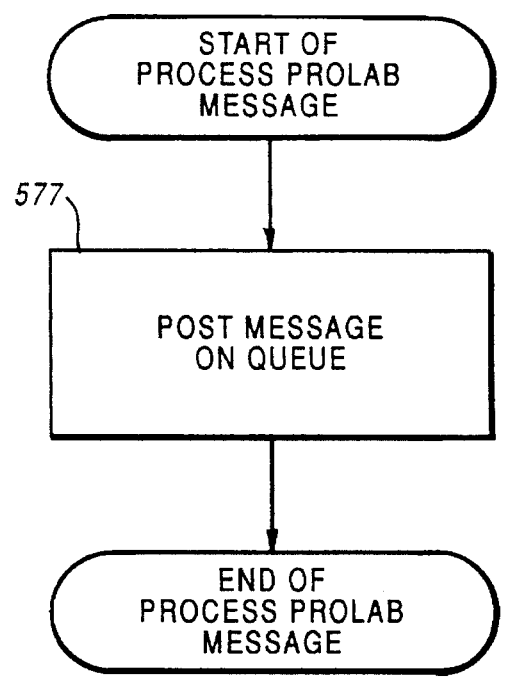
FIG. 53 is a flow chart illustrating a Process System Message software routine for the Database Packet Handler.

The microprocessor 14 processes the send reply message in accordance with the flow chart depicted in FIG. 52 by first building at a block 574 the reply message and at a block 576 the microprocessor 14 sends the reply message to the host interface module 16. As shown in FIG. 53, the microprocessor processes a system message by posting the message on a queue as determined at block 577.

Figure 51:
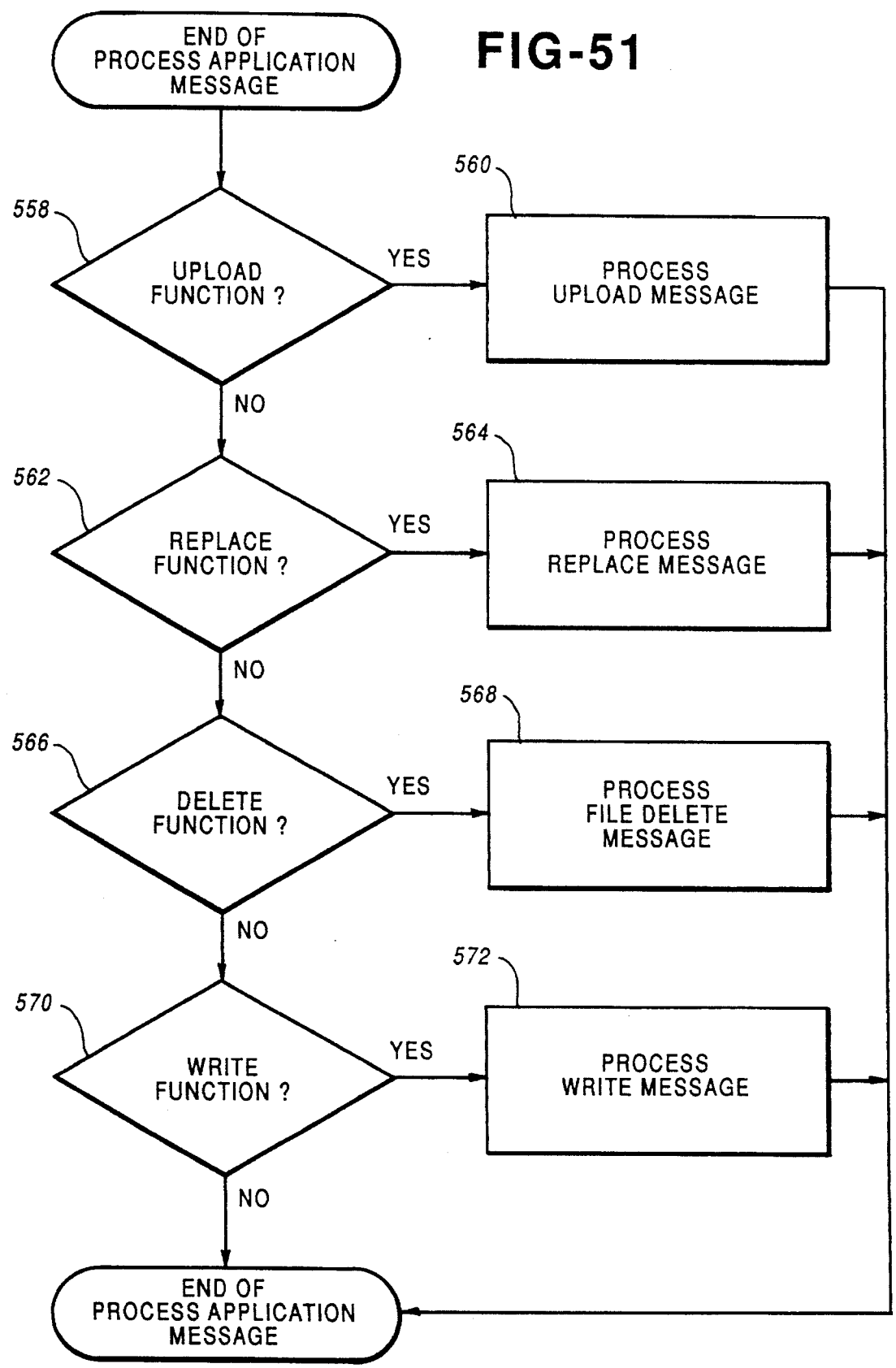
FIG. 51 is a flow chart illustrating a Process Application Message software routine for the Database Packet Handler.

In order to process a database packet handler message, the microprocessor operates in accordance with the flow chart depicted in FIG. 51. More particularly, the microprocessor at a block 558 first determines whether the upload function is specified in the database packet handler message. If so, the microprocessor proceeds to block 560 to process the upload message in accordance with the flow chart depicted in FIG. 55. If the microprocessor determines that the replace function is specified in the database packet handler message, the microprocessor proceeds from a block 562 to a block 564 to process the replace message in accordance with the flow chart depicted in FIG. 56. If the microprocessor determines at a block 566 that the delete function is specified in the database packet handler message, the microprocessor proceeds to block 568 to process the delete message in accordance with the flow chart depicted in FIG. 57 and if the microprocessor determines that a write function is specified in the database packet handler message, the microprocessor proceeds to block 572 to process the write message in accordance with the flow chart depicted in FIG. 58.

Figure 55A:
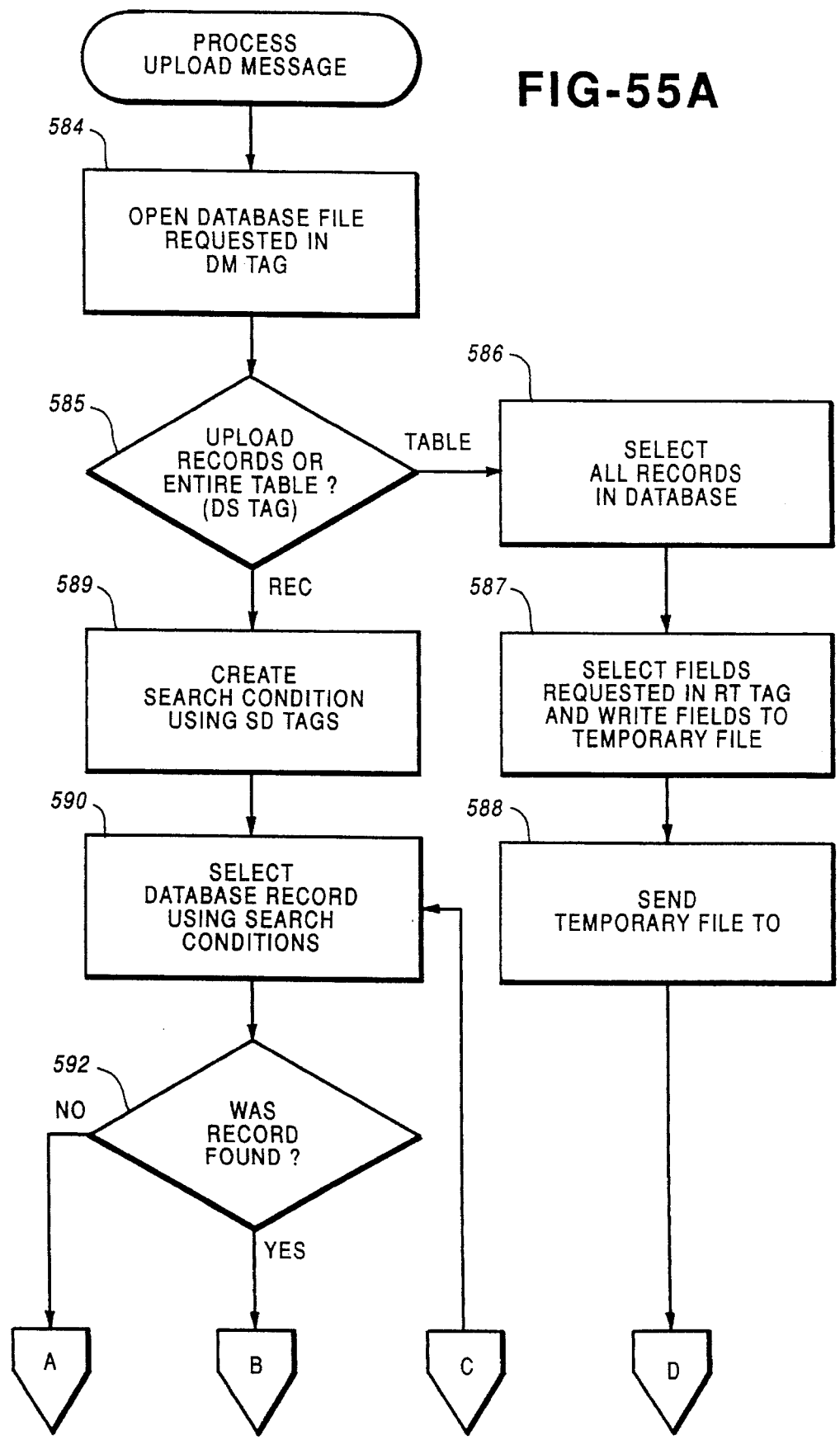
FIG. 55A–B is a flow chart illustrating a Process Upload Message software routine for the Database Packet Handler.
Figure 55B:
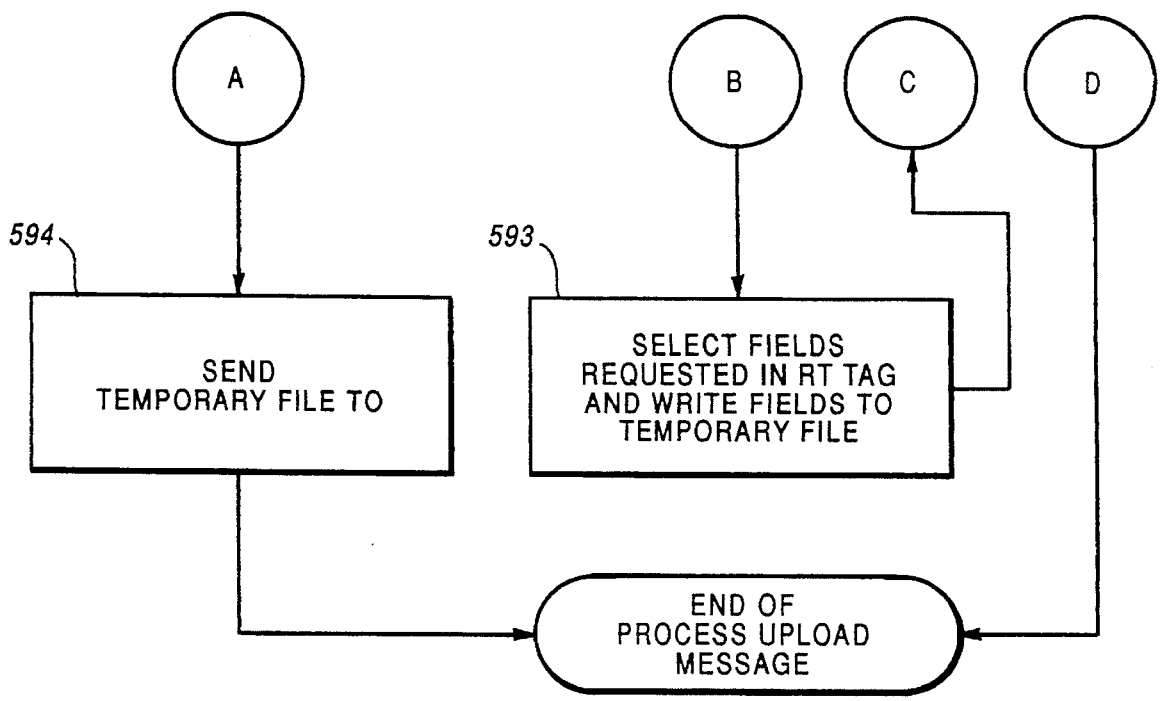

As shown in FIG. 55, the microprocessor processes a database packet handler message specifying the upload message as follows. The microprocessor 14 at a block 584 first opens the database file requested in the DM tag and at a block 585, the microprocessor determines from the DS tag whether the entire database table is to be uploaded or just particular records within the table. If the entire database table is to be uploaded, the microprocessor proceeds to block 586 to select all of the records in the designated database table. Thereafter, at a block 587 the microprocessor 14 selects those fields as requested in the RT tag and writes the fields to a temporary file. Thereafter, the microprocessor at a block 588 sends the temporary file to the host interface module 16 at a block 588. If the microprocessor determines at block 585 that the database message designates records to be uploaded, the microprocessor proceeds to block 589 to create a search condition using the SD tag specified in the database message. Thereafter, the microprocessor proceeds to block 590 to select the database records to be uploaded using the search conditions created at block 589. Thereafter, the microprocessor proceeds to block 592 to determine whether the record was found and if so, the microprocessor proceeds to block 593 to select the fields requested in the RT tag and to write those fields to the temporary file. If a record was not found as determined at block 592, the microprocessor proceeds to block 594 to send the temporary file to the host interface module 16.

Figure 56:
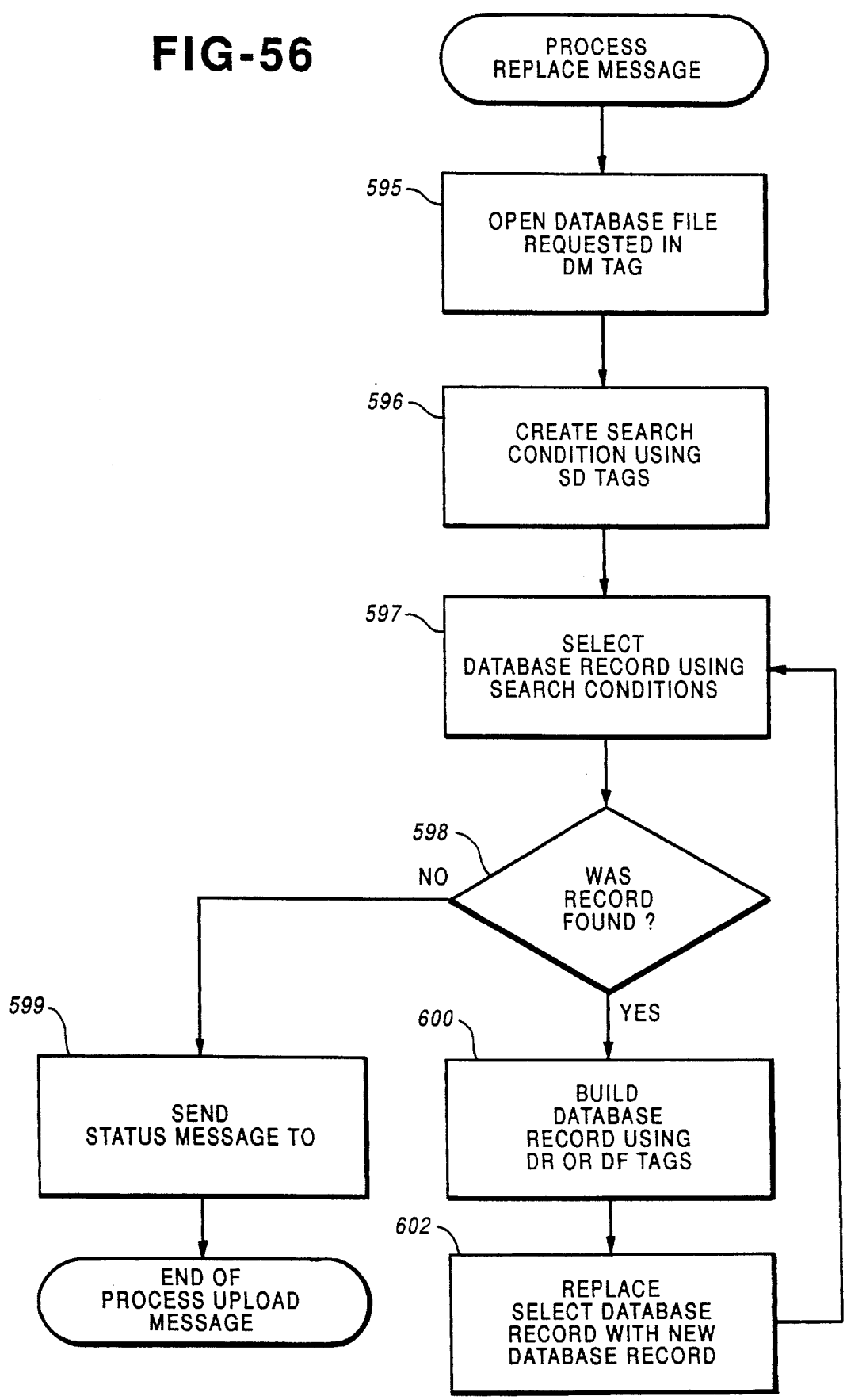
FIG. 56 is a flow chart illustrating a Process Replace Message software routine for the Database Packet Handler.

The microprocessor 14 processes a replace message in accordance with the flow chart depicted in FIG. 56. More particularly, the microprocessor 14 at a block 595 first opens the database file requested in the DM tag and at a block 596 the microprocessor 14 creates search conditions using the SD tags. Thereafter, at a block 597 the microprocessor selects a database record using the search conditions created at block 596. At a block 598 the microprocessor determines whether a record was found and if so, the microprocessor at a block 600 builds the database record using the DR and DF tags. At a block 602, the microprocessor 14 replaced the selected database record with the new database record specified in the message and proceeds back to block 597 to select the next database record. When the microprocessor determines at block 598 that no more records were found, the microprocessor proceeds to block 599 to send a status message to the host interface module 16.

Figure 57:
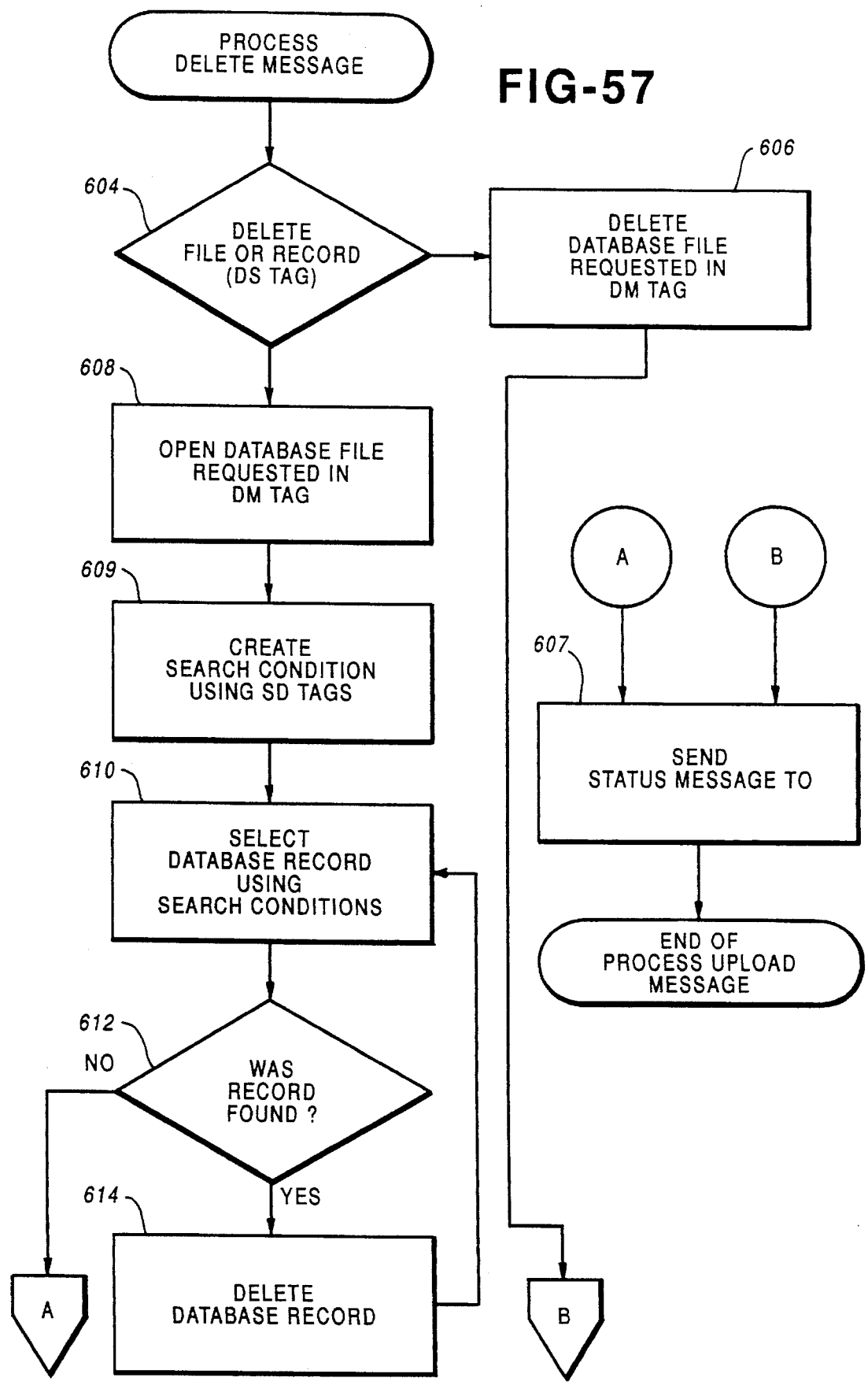
FIG. 57 is a flow chart illustrating a Process Delete Message software routine for the Database Packet Handler.
Figure 58:
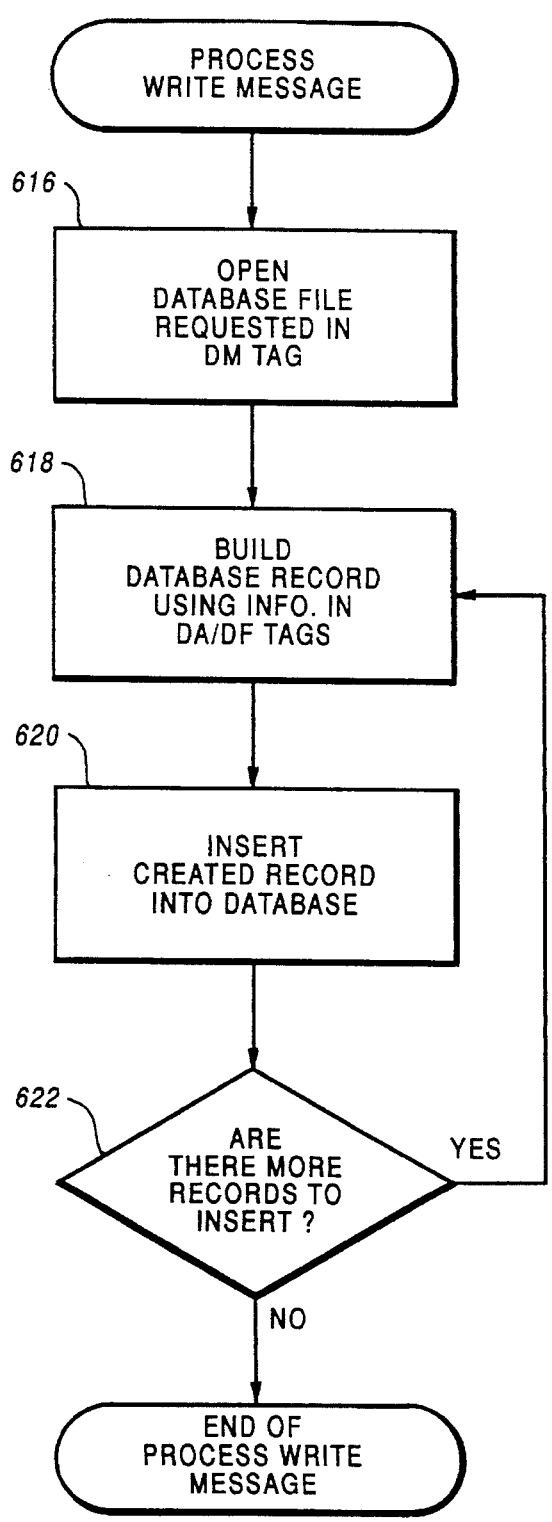
FIG. 58 is a flow chart illustrating a Process Write Message software routine for the Database Packet Handles.

The microprocessor operates in accordance with the flow chart depicted in FIG. 57 to process a database message designating the delete function as follows. At a block 604, the microprocessor determines whether a file or a record is to be deleted in accordance with the DS tag. If a file is to be deleted, the microprocessor at a block 606 deletes the database file requested in the DM tag and proceeds to block 607 to send a status message to the host interface module 16. If the microprocessor determines at block 604 that a record is to be deleted, the microprocessor proceeds to block 608 to open the database file designated in the DM tag of the message. Thereafter, at a block 609, the microprocessor 14 creates the search conditions for the requested record using the SD tags and at a block 610 selects a database record using the search conditions created at block 609. If the microprocessor finds a record matching the search conditions as determined at block 612, the microprocessor proceeds to block 614 to delete the found record. If no record was found that matches the search condition, the microprocessor proceeds from block 612 to block to block 607 to send a status or return message back to the host interface module 16. The microprocessor 14 operates in accordance with the flow chart depicted in FIG. 58 to process a database message designating the write function as follows. At a block 616 the microprocessor 143 opens the database file requested in the DM tag and at a block 618 the microprocessor 14 builds a database record using the information in the DR/DF tags of the database message. Thereafter, at a block 620, the microprocessor 14 inserts the record created at block 618 into the designated database file. At a block 622 the microprocessor determines whether there are more records to be inserted into the designated database file and if so, the microprocessor 14 proceeds back to block 618.

Figure 54:
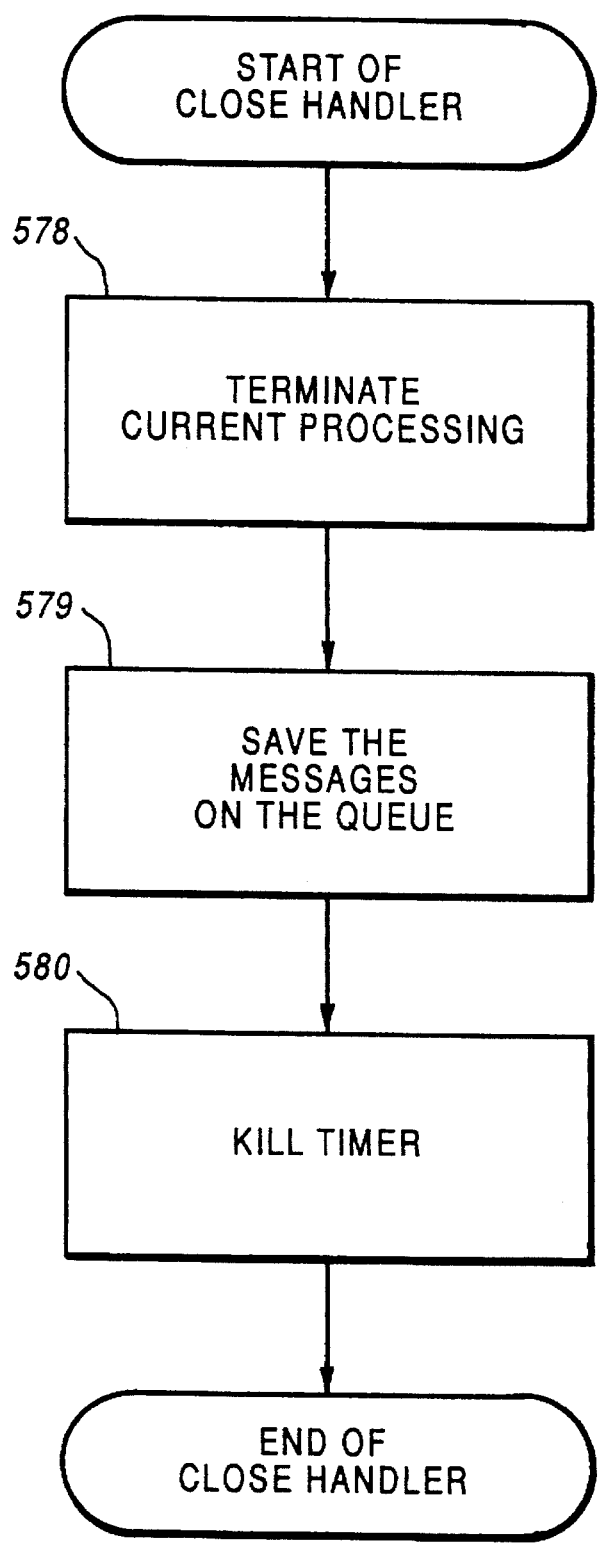
FIG. 54 is a flow chart illustrating a Start of Close Handler for the Database Packet Handler.

In order to close the database packet handler, the microprocessor 14 operates in accordance with the flow chart depicted in FIG. 54. More particularly, the microprocessor at a block 578 terminates the current processing at a block 579, the microprocessor 14 saves the messages on the database packet handler queue. Thereafter, the microprocessor 14 kills the timer at a block 580.

Figure 59:
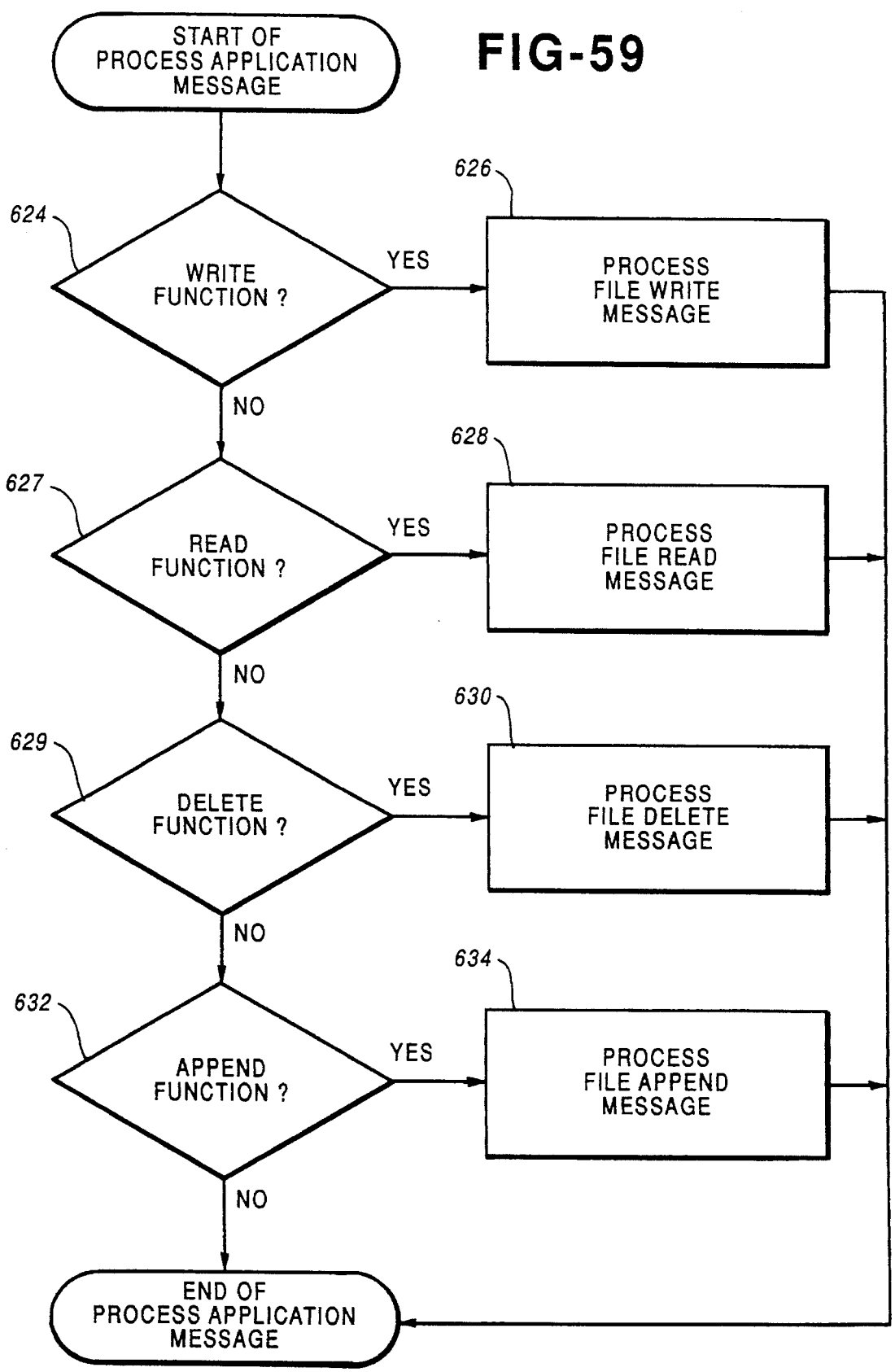
FIG. 59 is a flow chart illustrating a Process Application Message for a File Transfer Database Packet Handler.

The file transfer packet handler 19 operates in a manner similar to a manner depicted in FIGS. 51–54 and therefore will not be discussed in detail. FIG. 59 illustrates the processing of the various functions of the file transfer packet handler, however, as follows. At a block 624, the microprocessor 14 determines whether the write function is designated in the file transfer packet handler message and if so, the microprocessor proceeds to block 626 to process the file write message by writing the packet data to the designated file. If the microprocessor determines at a block 627 that the read function is designated in the file transfer packet handler, the microprocessor proceeds to block 628 to process the file read message by sending the designated file to the P.C. 40. If the microprocessor determines at a block 629 that the delete function is specified, the microprocessor proceeds to block 630 to process the file delete message by deleting from the memory 26 the designated file(s) and if the microprocessor determines at a block 632 that the append function is specified in the file transfer packet handler message, the microprocessor proceeds to block 634 to process the file append message by appending to the end of the designated file the packet data.

Figure 33:
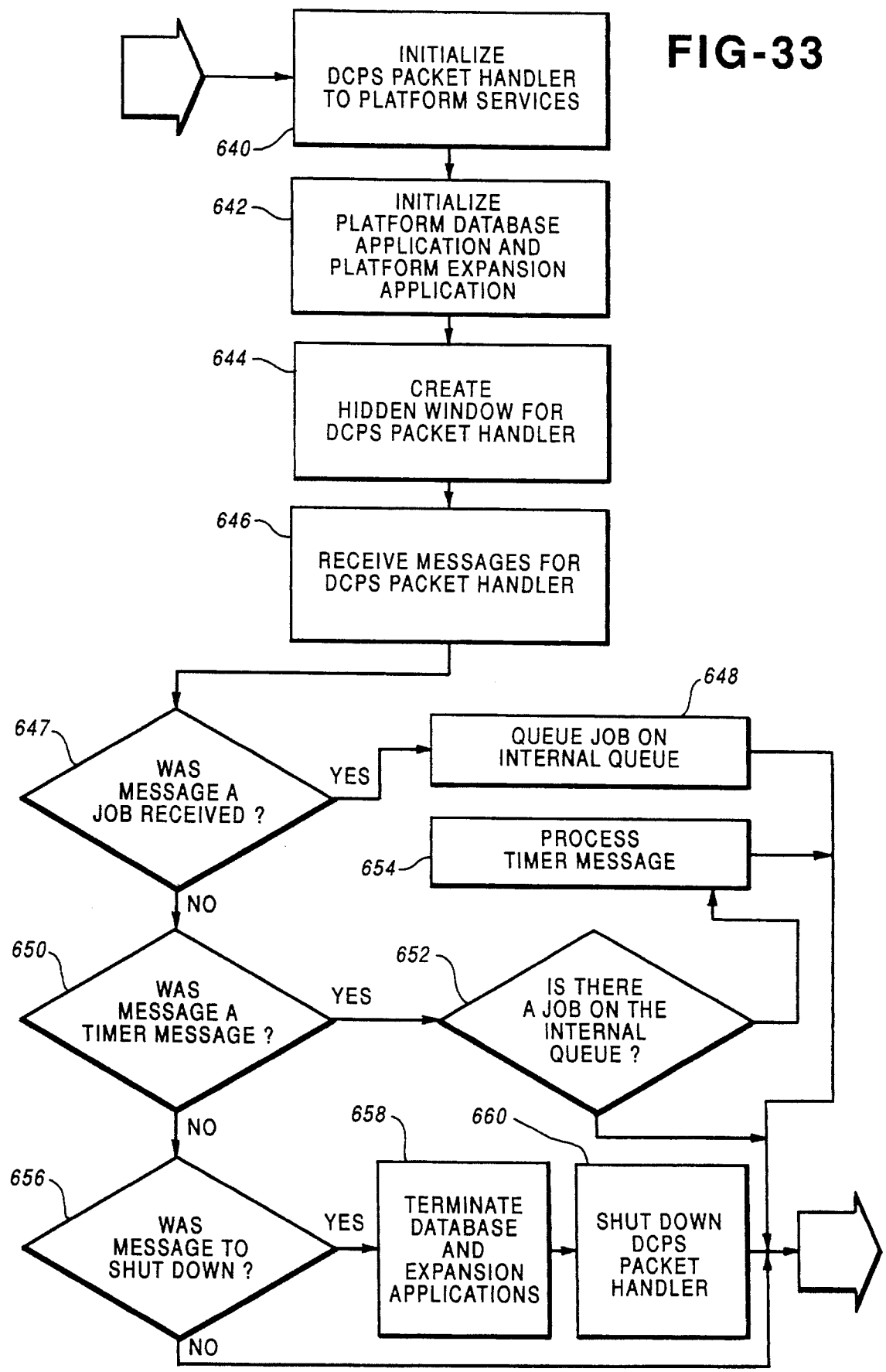
FIG. 33 is a flow chart illustrating a DCPS Packet Handler Main Processing software routine.

The microprocessor 14 operates in accordance with the flow charts depicted in FIGS. 33–44 to implement the distribution center packet handler as follows. AS shown in FIG. 33, the microprocessor at a block 640 initializes the distribution center packet handler and thereafter, at a block 642, the microprocessor 14 initializes a routine that handles database interactions. At a block 644, the microprocessor creates a hidden window for the distribution center packet handler to accept messages and at block 646, the microprocessor 14 receives messages for the distribution center packet handler. At a block 647 the microprocessor 14 determines whether a DCPS job message has been received and if so, the microprocessor at a block 648 queues the job message on an internal queue associated with the distribution center packet handler. If a job message has not been received, the microprocessor proceeds to block 650 to determine whether the message is a timer message and if so, the microprocessor proceeds to block 652 to determine whether there is a job on the internal queue of the distribution center packet handler. If so, the microprocessor proceeds to block 654 to process the timer message in accordance with the flow chart depicted in FIG. 34. If the microprocessor 14 determines that the message indicates that the database packet handler is to shut down, the microprocessor proceeds to block 658. At block 658, the microprocessor 14 terminates the database expansion applications and at block 660 it shuts down the distribution center packet handler.

The microprocessor in accordance with the distribution center packet handler processes a timer message in accordance with the flow chart depicted in FIG. 34. More particularly, the microprocessor at a block 662 determines what the current timer state is. If the current timer state is the initialize state, the microprocessor proceeds to block 63 to get a DCPS job off of the internal queue of the distribution center packet handler and at block 664 verifies the packet type and parses the packet into an internal packet structure. At block 666 the microprocessor validates the job packet and at block 668 it sets the timer state to processing. When the current timer state is processing, the microprocessor proceeds from 662 to block 670 to determine whether the function specified in the distribution center packet message is a write function. If so, the microprocessor proceeds to block 672 to implement the write function. If the microprocessor determines at a block 682 that the print function or a store and print function is specified in the distribution center packet handler message, the microprocessor proceeds to block 676 to implement the print function. At block 674 the microprocessor determines whether the function specified in the message designated the store and print function and if not, the microprocessor proceeds to block 678. If, however, the store and print function is designated in the message, the microprocessor proceeds from block 674 to block 672 to implement the write function, thereafter proceeding to block 678 to set the timer state to initialize and at block 680 to build and return a status message if one is required. If the microprocessor determines at a block 684 that the message designates the replace function, the microprocessor implements the replace function at a block 686. If the microprocessor determines that the upload function is specified in the distribution center packet handler message, the microprocessor proceeds to block 688 to implement the upload function. If the microprocessor determines at a block 689 that the delete function is specified in the message, the microprocessor proceeds to block 690 to implement the delete function. If the microprocessor determines that the reprint function is specified in the distribution center packet handler message, the microprocessor proceeds to block 693 to process the reprint function. If none of the valid functions were specified in the packet handler message, the microprocessor proceeds to block 694 to indicate an invalid disposition request and thereafter proceeds to block 680 to build and return a status message.

Figure 35:
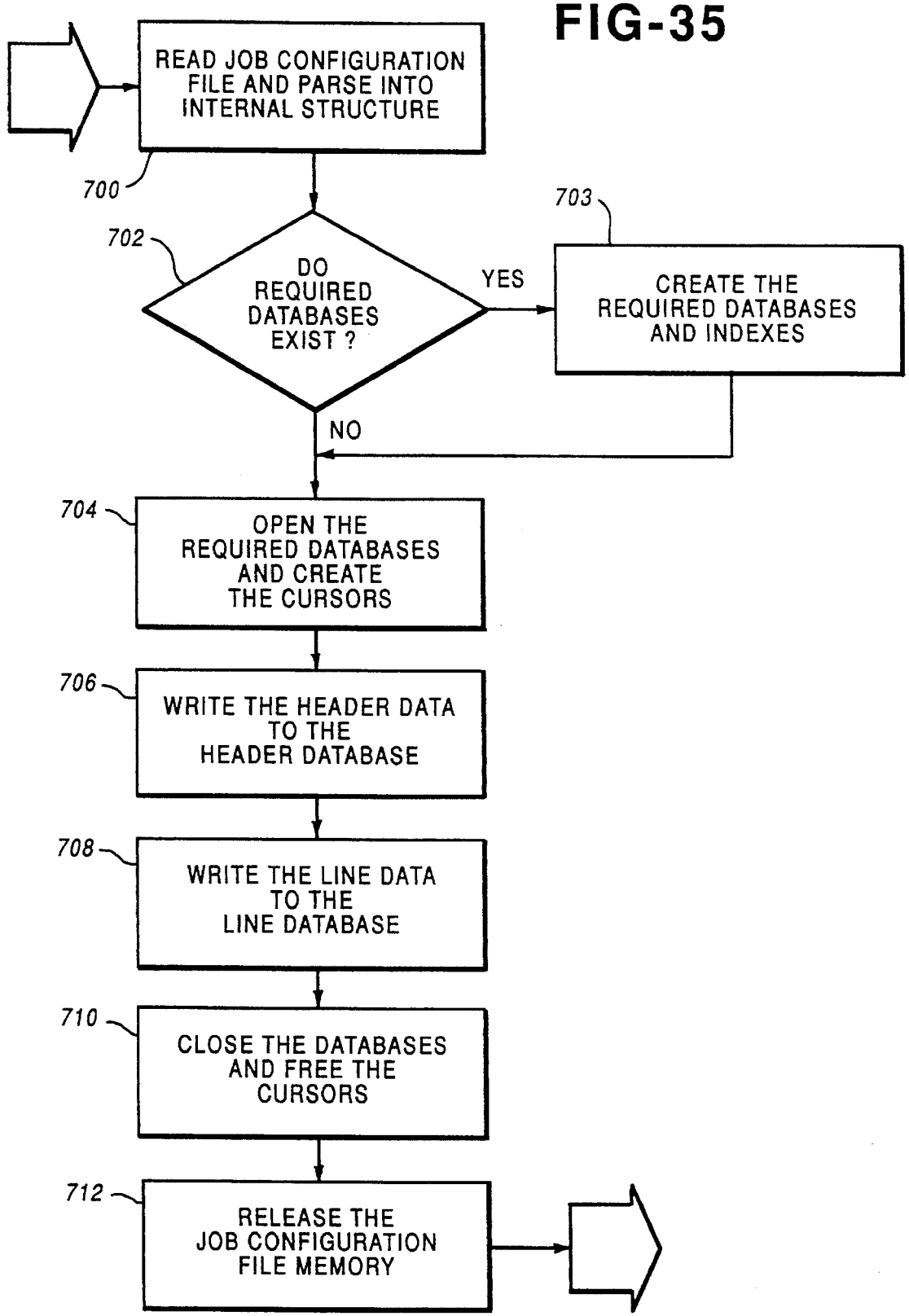
FIG. 35 is a flow chart illustrating a Process Write software routine for the DCPS Packet Handler.

The microprocessor 14 operates in accordance with the flow chart depicted in FIG. 35 to implement the write function for a distribution center packet handler message as follows. At a block 700, the microprocessor 14 reads the job configuration file associated with the DCPS job identified in the message and parses it into an internal structure. Thereafter, at a block 702, the microprocessor 14 determines whether the required databases exist and if not, the microprocessor 14 at a block 703 creates the required databases and indexes. At a block 704, the microprocessor opens the required databases and creates cursors. At a block 706, the microprocessor 14 writes the header data specified in the message to the header database and at a block 708 the microprocessor writes the line data specified in the message to the line database. Thereafter, the microprocessor proceeds to block 710 to close the databases and to free the cursors. At a block 712, the microprocessor 14 releases the job configuration file.

Figure 36:
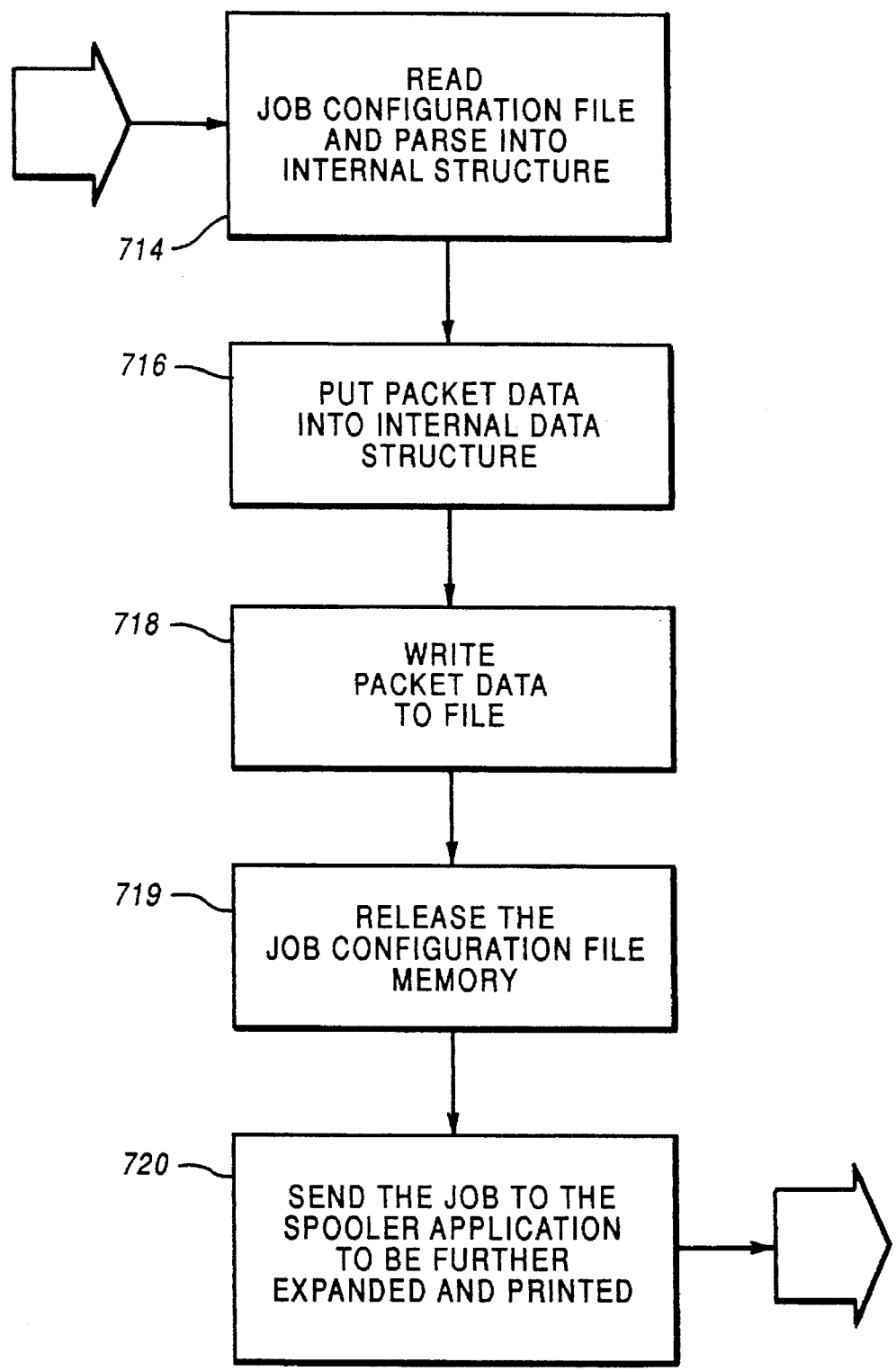
FIG. 36 is a flow chart illustrating a Process Print software routine for the DCPS Packet Handler.

The microprocessor 14 operates in accordance with the flow chart depicted in FIG. 36 to implement the print function for the distribution center packet handler as follows. At a block 714, the microprocessor 14 reads the job configuration file associated with the job identified in the DCPS message and parses it into an internal structure. At a block 716 the microprocessor puts the packet data into an internal structure. The microprocessor at a block 718 writes the packet data to a file to be sent to the spooler for further processing and printing. At a block 719, the microprocessor releases the job configuration file memory and at block 720 the microprocessor sends the job to the expansion application 48 and DCPS expansion from the spooler to pre-expand the job with respect to FIG. 42 and to further expand the print job for printing.

Figure 37:
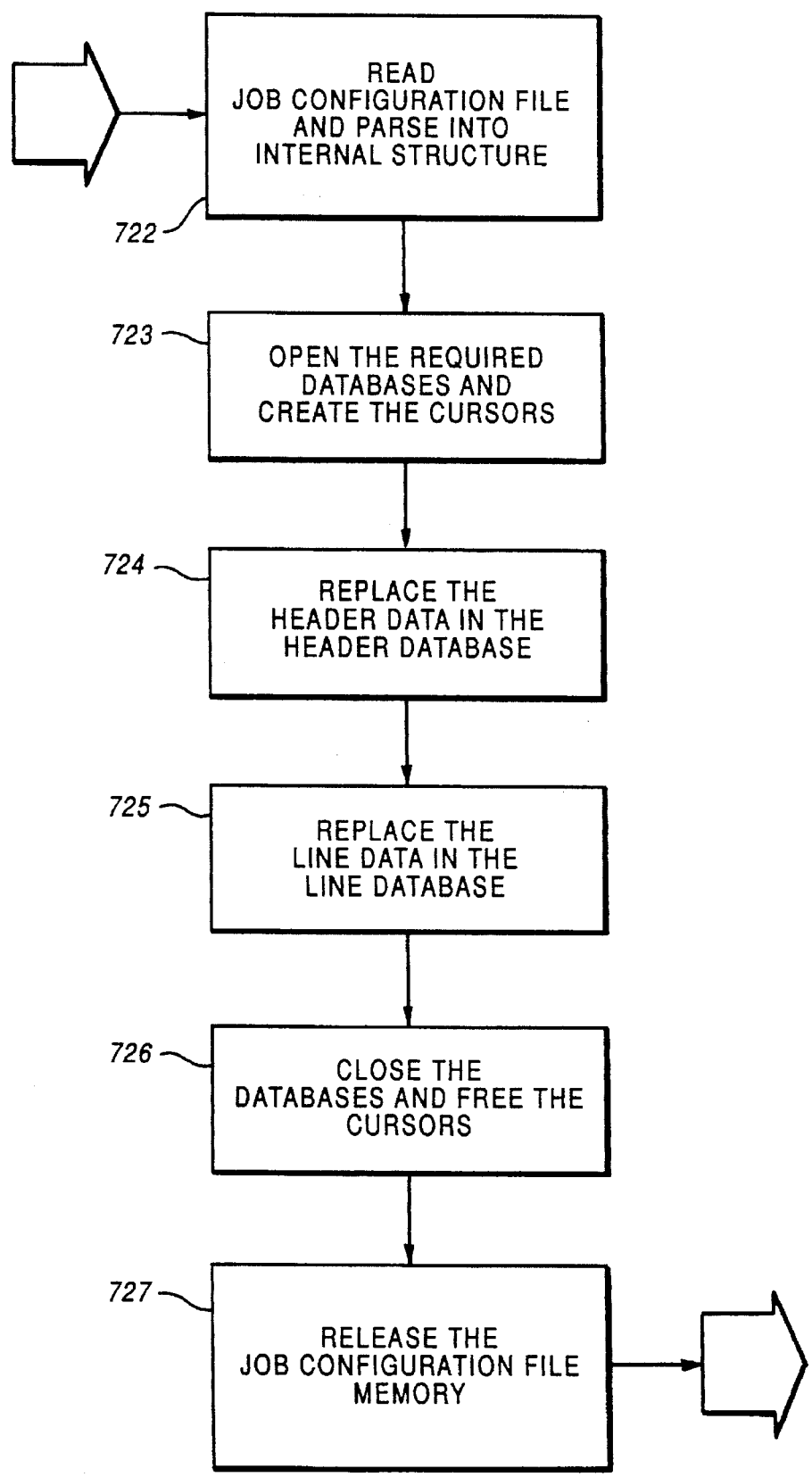
FIG. 37 is a flow chart illustrating a Process Replace software routine for the DCPS Packet Handler.

The microprocessor 14 operates in accordance with the flow chart depicted in FIG. 37 to implement the replace function for a DCPS job. More particularly, at block 722, the microprocessor 14 reads the job configuration file associated with the job designated in the message and parses the file into an internal structure. At a block 723, the microprocessor opens the required databases and creates cursors. At block 724 the microprocessor replaces the header data in the header database as designated in the DCPS message and at block 725, the microprocessor 14 replaces the line data in the line database as designated in the message. At block 726 the microprocessor 14 closes the databases and frees the cursors and at block 727 it releases the job configuration file.

Figure 38:
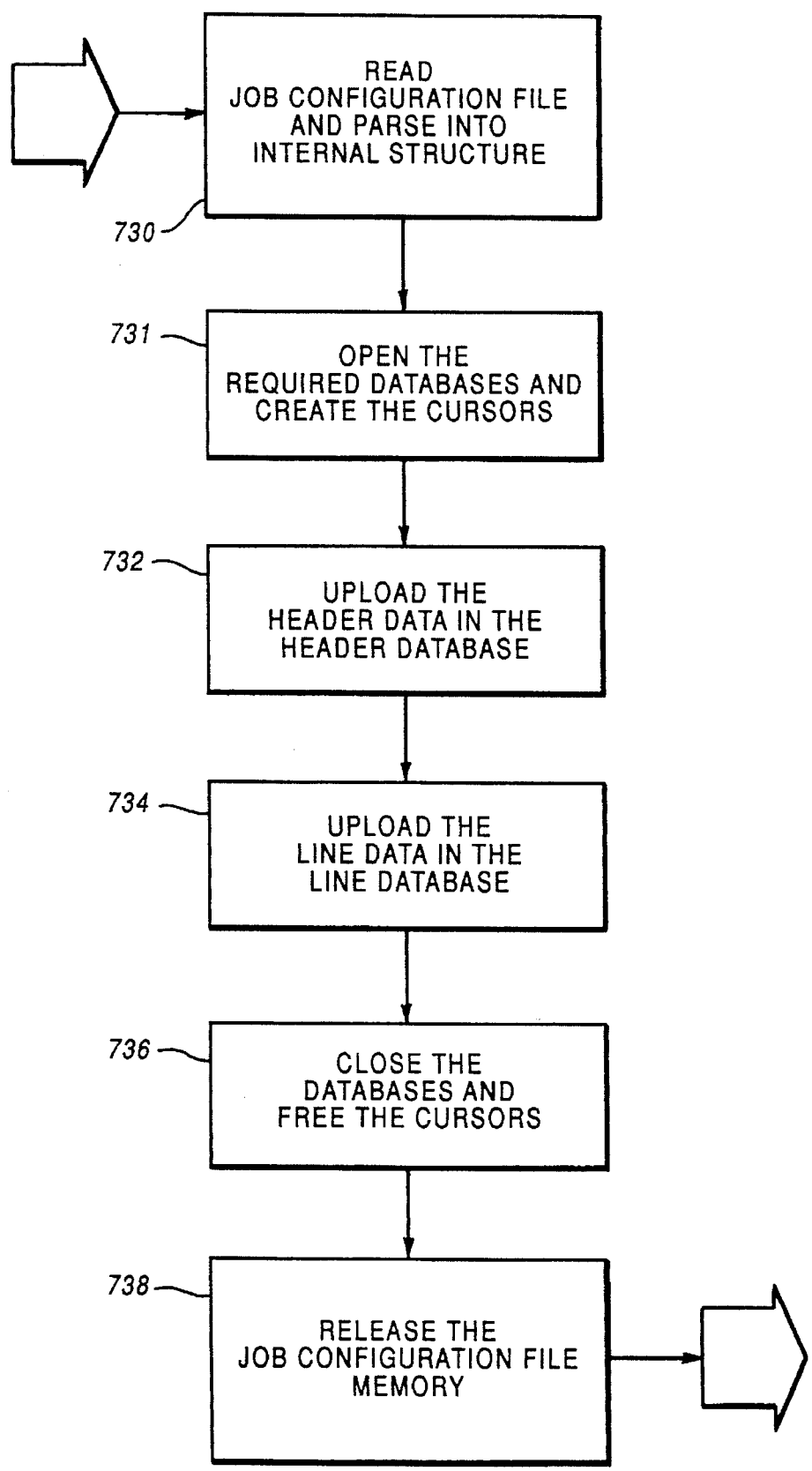
FIG. 38 is a flow chart illustrating a Process Upload software routine for the DCPS Packet Handler.

The microprocessor 14 operates in accordance with the flow chart depicted in FIG. 38 to implement the upload function for a DCPS packet. More particularly, at block 730 the microprocessor 14 reads the job configuration file associated with the job identified in the DCPS message and parses the file into an internal structure. At block 731 the microprocessor 14 opens the required databases and creates the cursors. At a block 732, the microprocessor uploads the header data in the header database as designated in the message and at block 734, the microprocessor uploads the specified line data in the line database. At block 736 the microprocessor 14 closes the databases and frees the cursors and at block 738 it releases the job configuration file.

Figure 39:
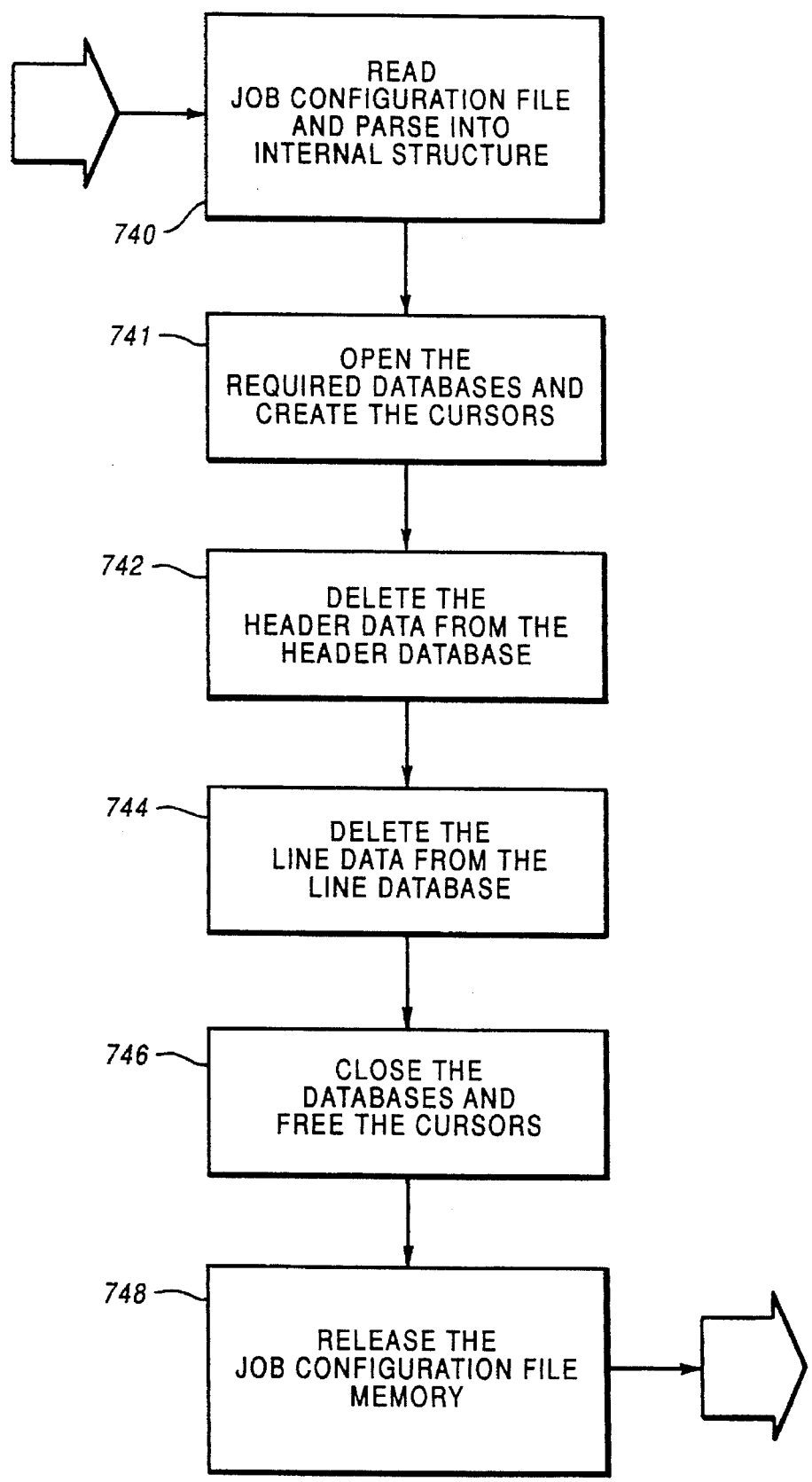
FIG. 39 is a flow chart illustrating a Process Delete software routine for the DCPS Packet Handler.

The microprocessor 14 operates in accordance with the flow chart depicted in FIG. 39 to implement the delete function for a DCPS packet. More particularly at box 740, the microprocessor 14 reads the job configuration file associated with the job designated in the DCPS message and processes the file into an internal structure. At block 741, the microprocessor opens the required databases and creates the cursors that are necessary. At box 742, the microprocessor 14 deletes the designated header data from the header database and at block 744, the microprocessor deletes the line data from the line database in accordance with the DCPS message. At block 746, the microprocessor 14 closes the database and frees the cursors and at block 748 the microprocessor releases the job configuration file.

Figure 40:
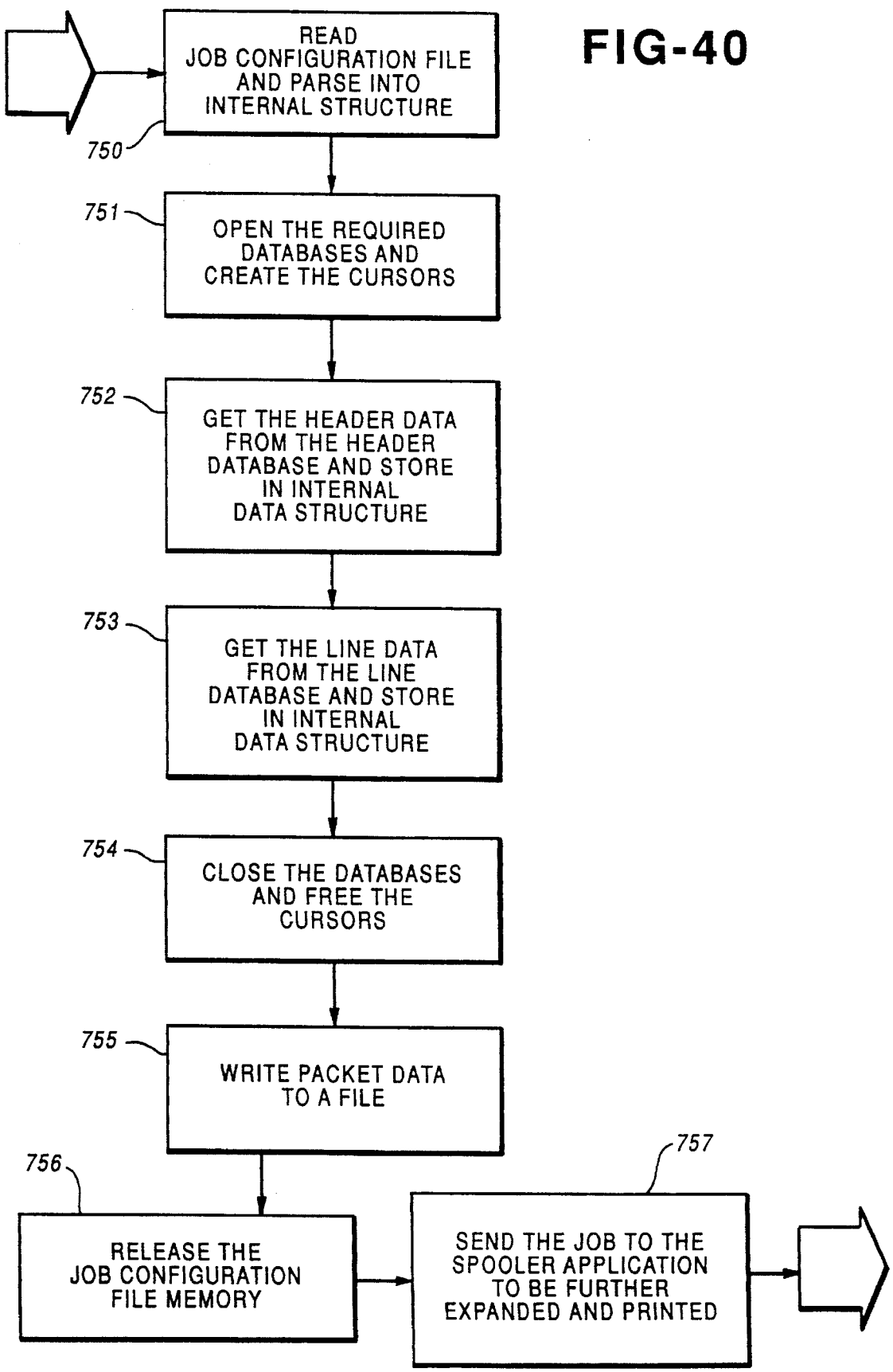
FIG. 40 is a flow chart illustrating a Process Reprint software routine for the DCPS Packet Handler.

The microprocessor 14 implements the reprint function for a DCPS packet in accordance with the flow chart depicted in FIG. 40. More particularly, at block 750, the microprocessor reads the job configuration file associated with the job designated in the DCPS message and processes the file into an internal structure. At block 751, the microprocessor 14 opens the required databases and creates the necessary cursors. At block 752, the microprocessor gets the header data from the header database and stores the header data in an internal data structure. Thereafter, the microprocessor 14 and a block 753 gets the line data from the line database and stores the line data in an internal data structure. At block 754, the microprocessor closes the databases and frees the cursors. The microprocessor writes the data into a file. At block 756, the microprocessor releases the job configuration file. At a block 757, the microprocessor sends the print job to the DCPS pre-expansion application and to the expansion application to be respectively pre-expanded according to FIG. 41 and expanded for printing.

Figure 41:
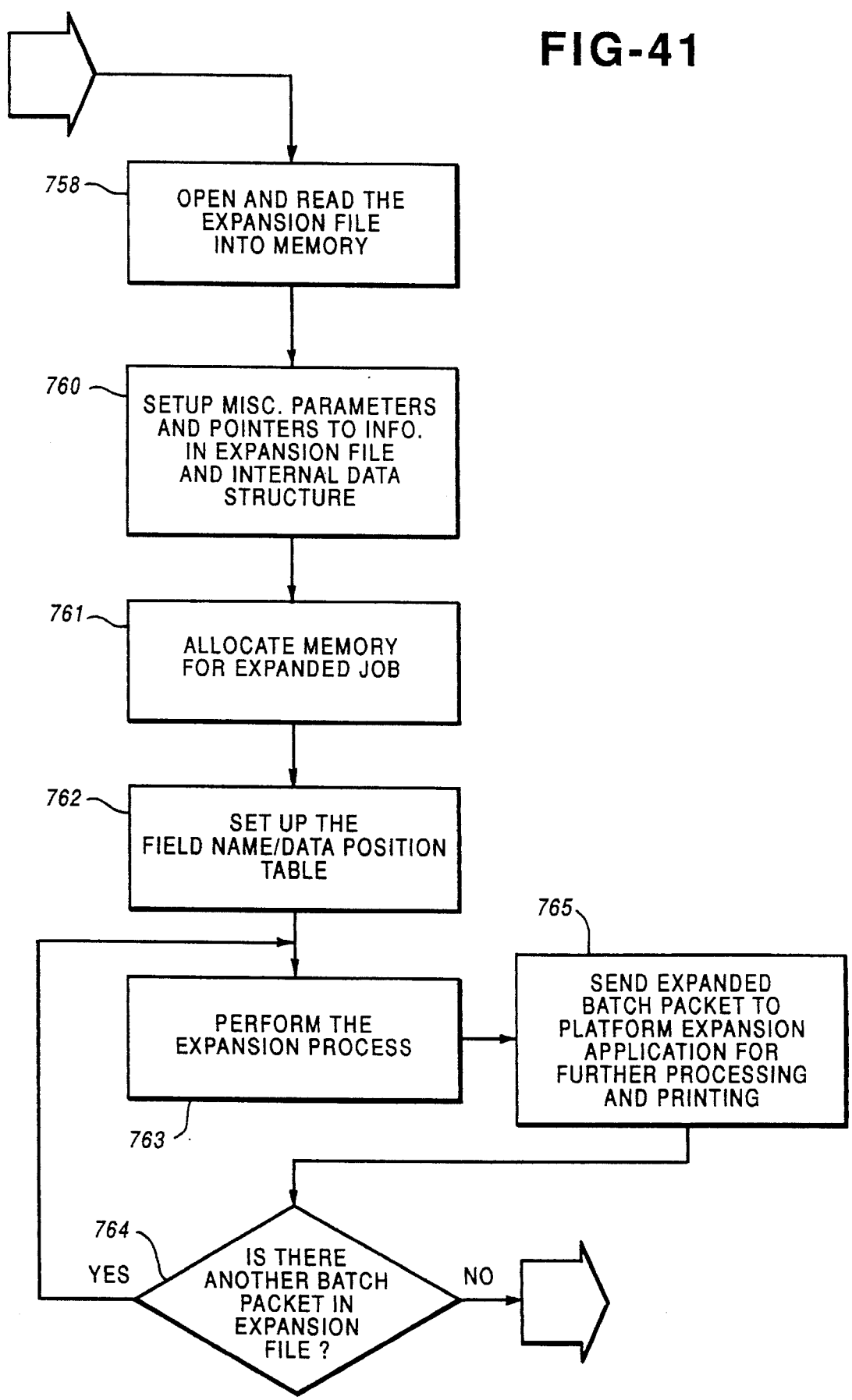
FIG. 41 is a flow chart illustrating a Expand the Data Into a Print Job software routine for the DCPS Packet Handler.
Figure 42:
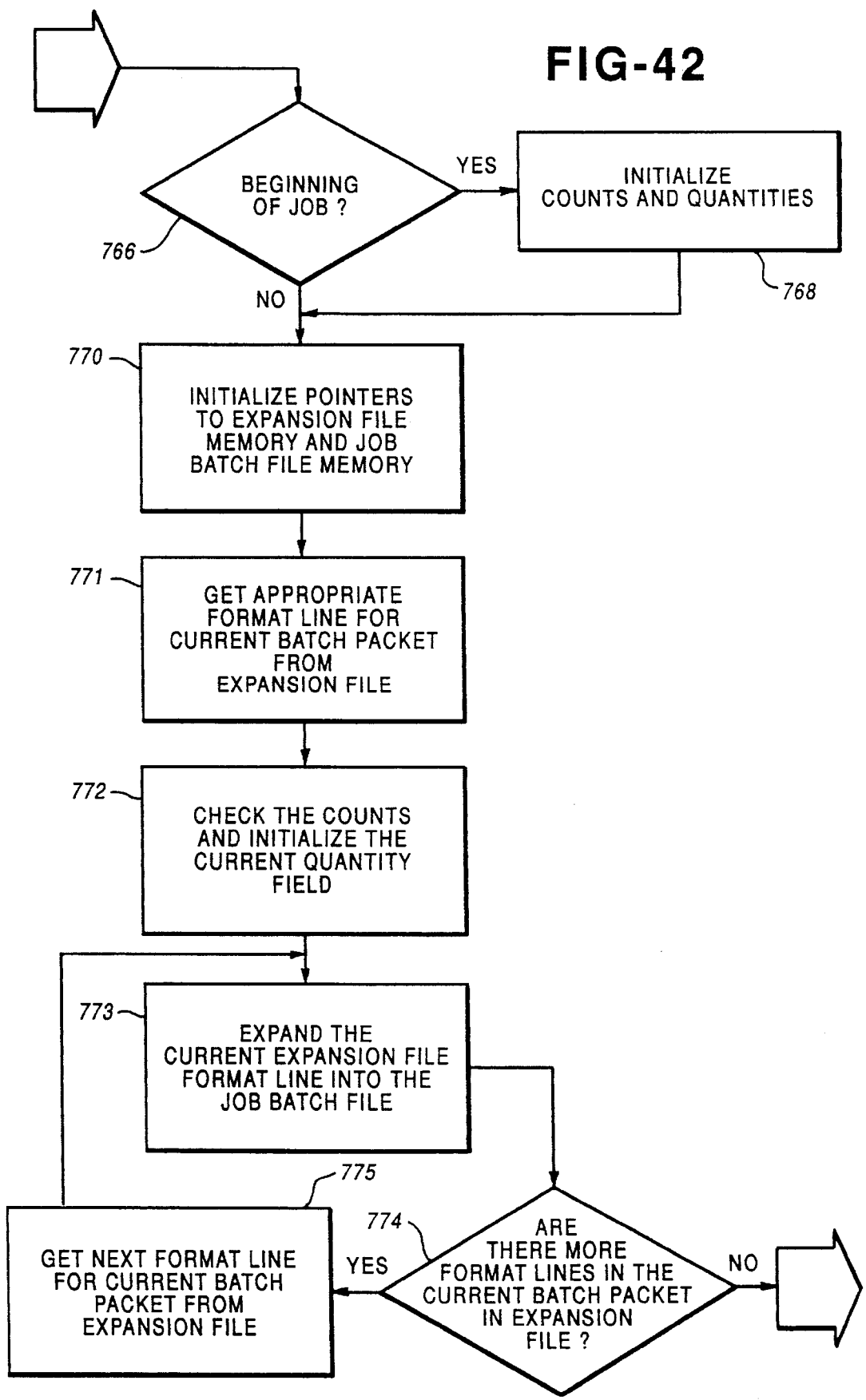
FIG. 42 is a flow chart illustrating a Perform the Expansion Process for the DCPS Packet Handler.

The microprocessor operates in accordance with the flow chart depicted in FIG. 41 to pre-expand the data for a job to be printed. More particularly, at a block 758, the microprocessor 14 opens and reads the expansion file associated with the job designated in the DCPS message. Thereafter, the microprocessor at a block 760 sets up miscellaneous parameters and pointers to information in the expansion file and internal data structure. Thereafter, at a block 761, the microprocessor 14 allocates memory for the expanded job. At block 762, the microprocessor 14 sets up a field name and data position table. Thereafter, the microprocessor implements the pre-expansion process at block 763 in accordance with the flow chart depicted in FIG. 42. At block 765, the microprocessor sends the expanded batch packet to the expansion application 48 for further processing and printing. At block 764, the microprocessor determines whether there is another batch depicted in the expansion file and, if so, the microprocessor returns to block 763. As shown in FIG. 42, the microprocessor performs the pre-expansion process by determining at block 766 whether this is the beginning of a job. If so, the microprocessor at block 768 initializes various counts and quantities. At block 770, the microprocessor initializes pointers to the expansion file memory and job batch file memory. Thereafter, at a block 771, the microprocessor gets the appropriate format line for the current batch packet from the expansion file. The microprocessor 14 at a block 772 checks the counts and initializes the current quantity field and at block 773, expands the current expansion file format line into the job batch file in accordance with the flow chart depicted in FIG. 43. At block 774, the microprocessor determines whether there are more format lines in the current batch packet in the expansion file and, if so, the microprocessor at block 775 gets the next format line for the current batch packet from the expansion file, returning to block 773.

Figure 44B:
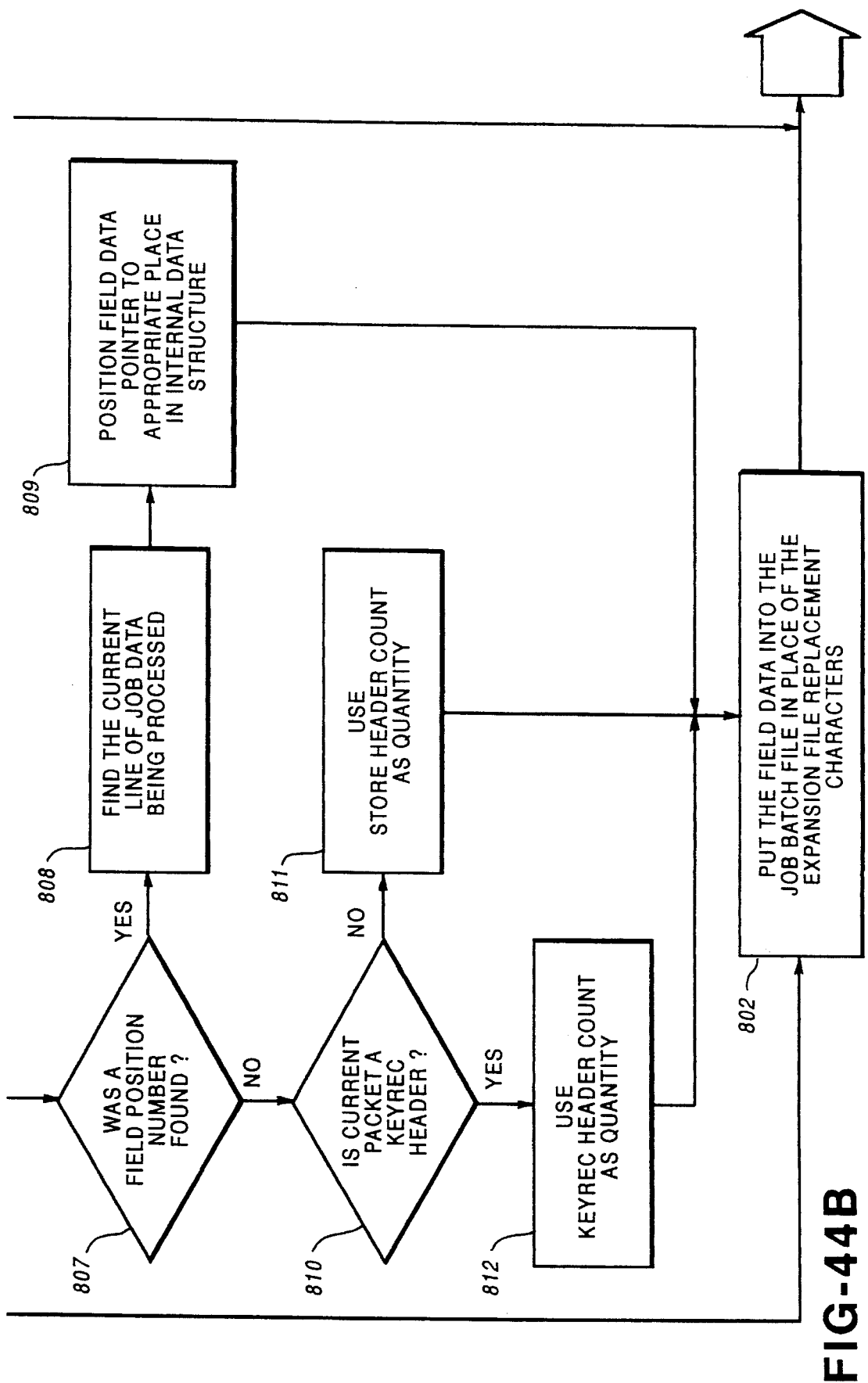

The microprocessor 14 operates in accordance with the flow chart depicted in FIG. 43 to expand the current expansion file format line into the job batch file as follows. At a block 780, the microprocessor 14 initializes the job batch file to the beginning of a new line, and at block 781, determines whether the end of the current format line in the expansion file has been reached. If so, the microprocessor at block 782 puts a record separator at the end of the job batch file line and adds a carriage feed/line return. If the end of the current format line in the expansion file has not been reached, the microprocessor proceeds from block 781 to block 783. At block 783, the microprocessor 14 determines whether the current position in the expansion file is pointing to a replacement character and, if so, the microprocessor proceeds to block 784 to put the data for the replacement characters into the job batch file as depicted in FIG. 44. Thereafter, the microprocessor proceeds to block 788 to go the next position in the expansion file, returning to block 781. If the current position in the expansion file is not a replacement character as determined at block 783, the microprocessor proceeds to block 786 to copy a character to the job batch file and thereafter proceeds to block 788.

The microprocessor operates in accordance with the flow chart depicted in FIG. 44 to put data for replacement characters into the job batch file as follows. At a block 790, the microprocessor positions the parameter point to the current replacement field parameter. Thereafter, the microprocessor determines at a block 792 whether the parameters contained grouped fields. If so, the microprocessor proceeds to block 794 to determine whether the parameter is in abbreviated group field and, if so, proceeds to block 798. Otherwise, the microprocessor proceeds from block 794 to block 796 to get the current grouped field name and thereafter proceeds to block 798. At block 798, the microprocessor determines whether the parameter is a subfield designator and, if so, the microprocessor proceeds to block 800 to process the subfield. Thereafter, at a block 802, the microprocessor 14 puts the field data into the job batch file in place of the expansion file replacement characters. If the microprocessor determines at block 798 that the parameter is not a subfield designator, the microprocessor proceeds to block 804 to determine whether the parameter is a straight substitution. If so, the microprocessor proceeds to block 805 to put the parameter in place of the replacement characters into the job batch data. If the parameter is not a straight substitution, the microprocessor proceeds to block 806 from block 804 to get the field position number that corresponds to the parameter field name. Thereafter, at a block 807, the microprocessor 14 determines whether the field position number was found. If so, the microprocessor at a block 808 finds the current line of the job data being processed and thereafter proceeds to block 809 to position the field data pointer to the appropriate place in the internal data structure, thereafter proceeding to block 802. If the field position number was not found as determined at block 807, the microprocessor 14 proceeds to block 810 to determine whether the current packet is a KEYREC header. If not, the microprocessor at block 811 uses the store header count as the quantity and proceeds to block 802. If the current packet is a KEYREC header, the microprocessor proceeds to block 812 from block 810 to use the KEYREC header count as the quantity, thereafter continuing to block 802 to put the field data into the job batch file in place of the expansion file replacement characters.

Figure 60:
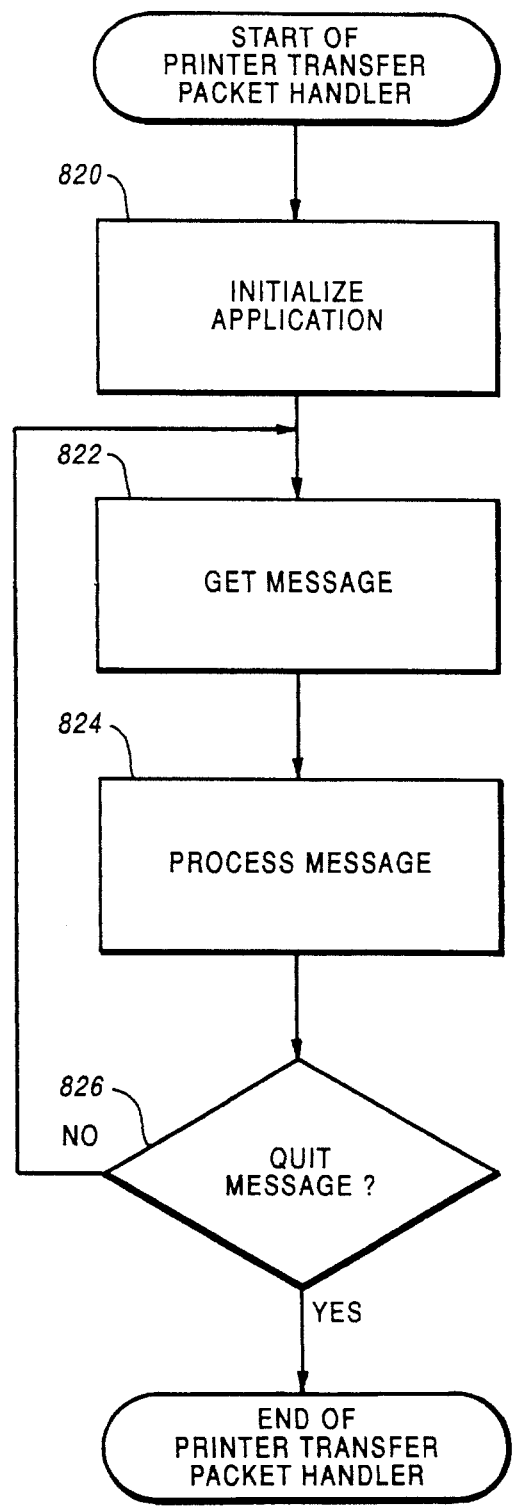
FIG. 60 is a flow chart illustrating a Labeler Transfer Packet Handler.
Figure 61:
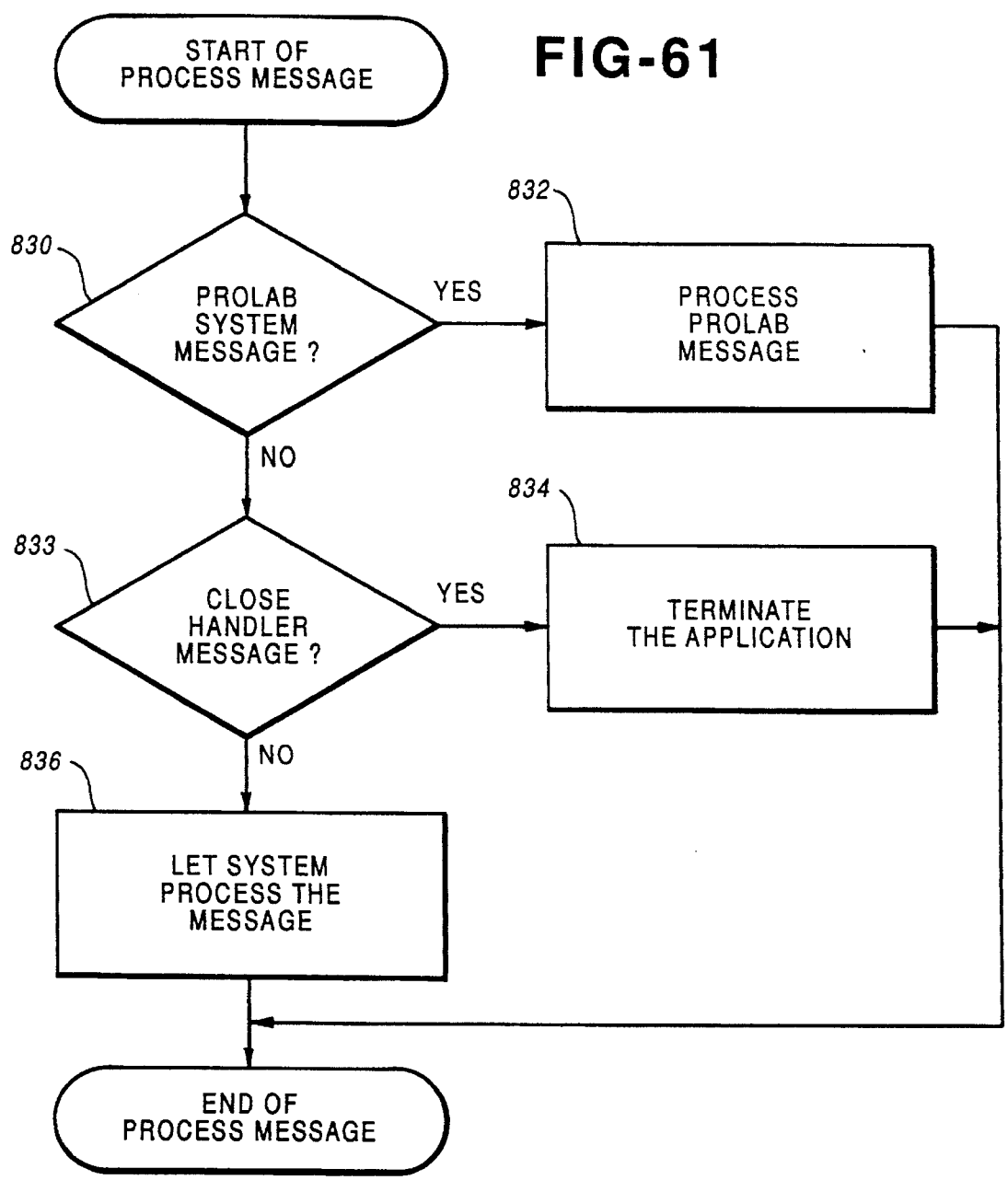
FIG. 61 is a flow chart illustrating a Start Process Message for the Labeler Transfer Packet Handler.

The labeler transfer packet handler 21 is depicted in FIG. 60–66. As shown in FIG. 60, the microprocessor 14 at a block 820 initializes the labeler transfer packet handler by initializing various logo variables. Thereafter, at a block 822, the microprocessor 14 gets a message from the packet handler and at block 824 processes the message in accordance with the flow chart depicted in FIG. 61. Thereafter, the microprocessor at a block 826 determines whether the message was a quit message and, if not, returns to block 822. As shown in FIG. 61, at the start of the process labeler transfer packet handler message, the microprocessor determines at block 830 whether the message is a system message and for the packet handler and, if so, proceeds to block 832 to process the message in accordance with the flow chart depicted in FIG. 62. Otherwise, the microprocessor proceeds to block 833 to determine whether the message is a close handler message. If so, the microprocessor proceeds to block 834 to terminate the labeler transfer packet handler. Otherwise, the microprocessor proceeds to block 836 to let the system process the message.

Figure 62:
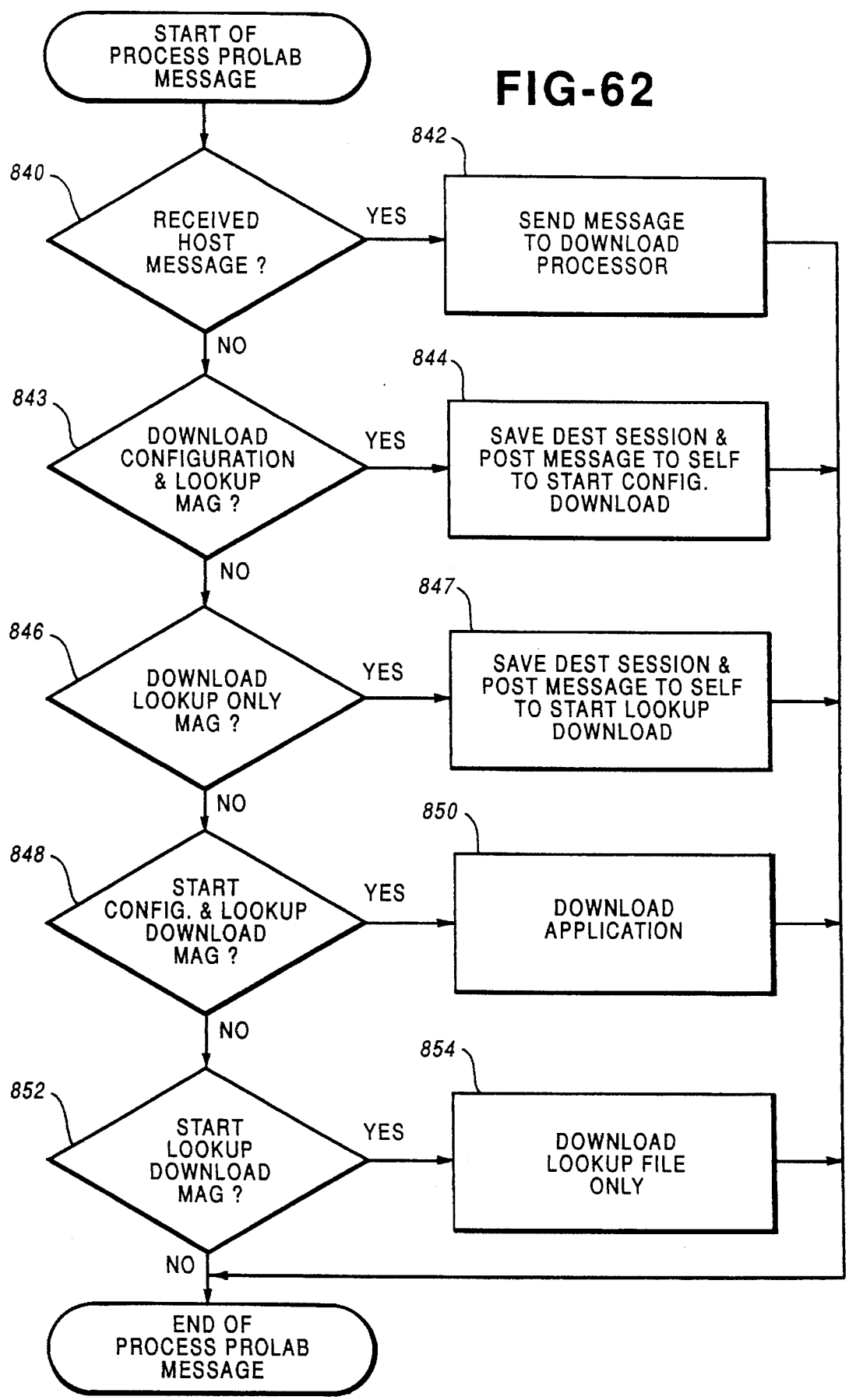
FIG. 62 is a flow chart illustrating a Process System Message for the Labeler Transfer Packet Handler.

As shown in FIG. 62, the microprocessor processes a message for the labeler transfer packet handler by first determining whether the message is a host reply message and, if so, the microprocessor proceeds to block 842 to save the message for processing later. At block 843, if the microprocessor determines that the message represents a download configuration file and lookup table message, the microprocessor proceeds to block 844 to save the destination session and to post a message to itself to start the configuration download. If the microprocessor determines at block 846 that the message is a download lookup message only, the microprocessor proceeds to block 847 to save the destination session and to post a message to itself to start the lookup table download process. If the microprocessor determines at block 848 that the message is a start configuration file and lookup table download message, the microprocessor proceeds to block 850 to download the configuration file and lookup table as discussed in detail with respect to FIGS. 63A"B. If the microprocessor 14 determines at block 852 that the message is a start the lookup table download message, the microprocessor proceeds to block 854 to download the lookup table file only in accordance with the flow charts depicted in FIGS. 64A–B.

Figure 63A:
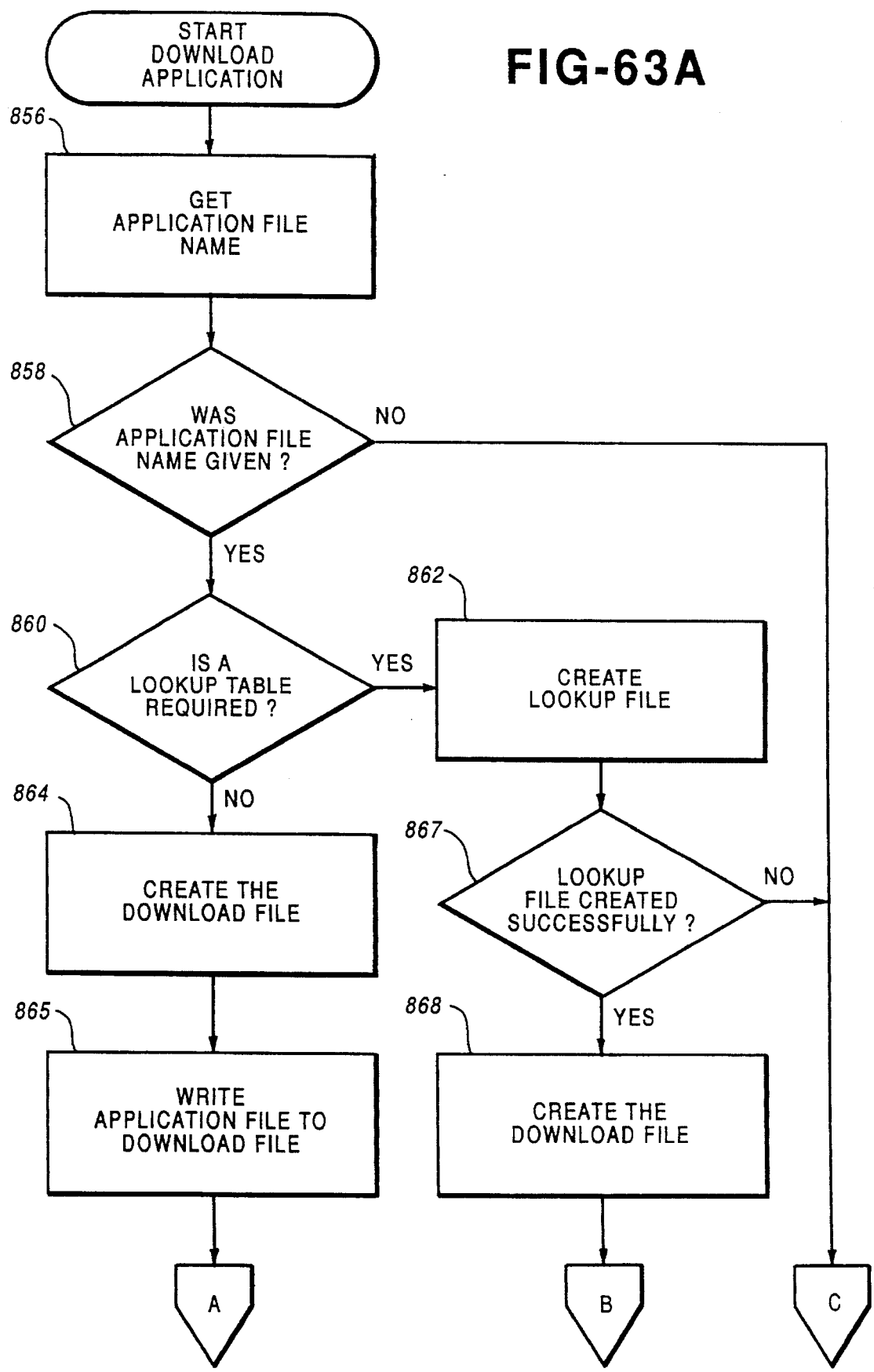
FIGS. 63A–B form a flow chart illustrating a Download Application software routine for the Labeler Data Transfer Packet Handler.
Figure 63B:
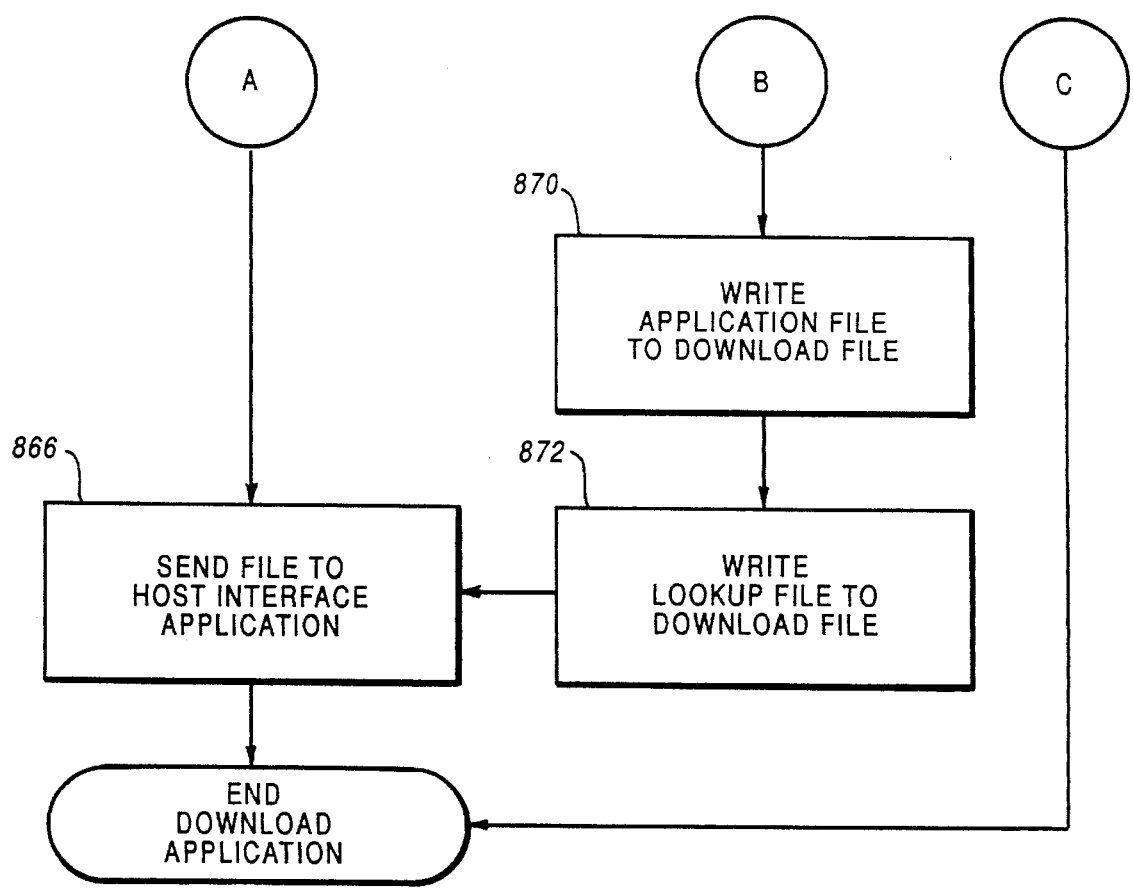

As shown in FIG. 63A, the microprocessor 14 at a block 856 gets the name of the application file to be downloaded to the labeler 32. Thereafter, the microprocessor at block 858 determines whether the application file name was given and, if so, the microprocessor proceeds to block 860 to determine whether a lookup table is required or not. If a lookup table is required, the microprocessor proceeds to block 862 to create the necessary lookup table file in accordance with the flow charts depicted in FIGS. 65A and B and thereafter determines at block 867 whether the lookup file was created successfully. If so, the microprocessor at block 868 creates a download file and at block 870 writes the application to the download file. Thereafter, at a block 872, the microprocessor 14 writes the lookup table file created at block 862 to the downmode file and at block 866 sends the file to the host interface application in accordance with the flow chart depicted in FIG. 66. If the microprocessor determines at block 860 that a lookup table is not required, the microprocessor proceeds to block 864 to create the download file and at block 865 writes the application to the download file. Thereafter, proceeding to block 866 to send the file to the host interface application.

Figure 64A:
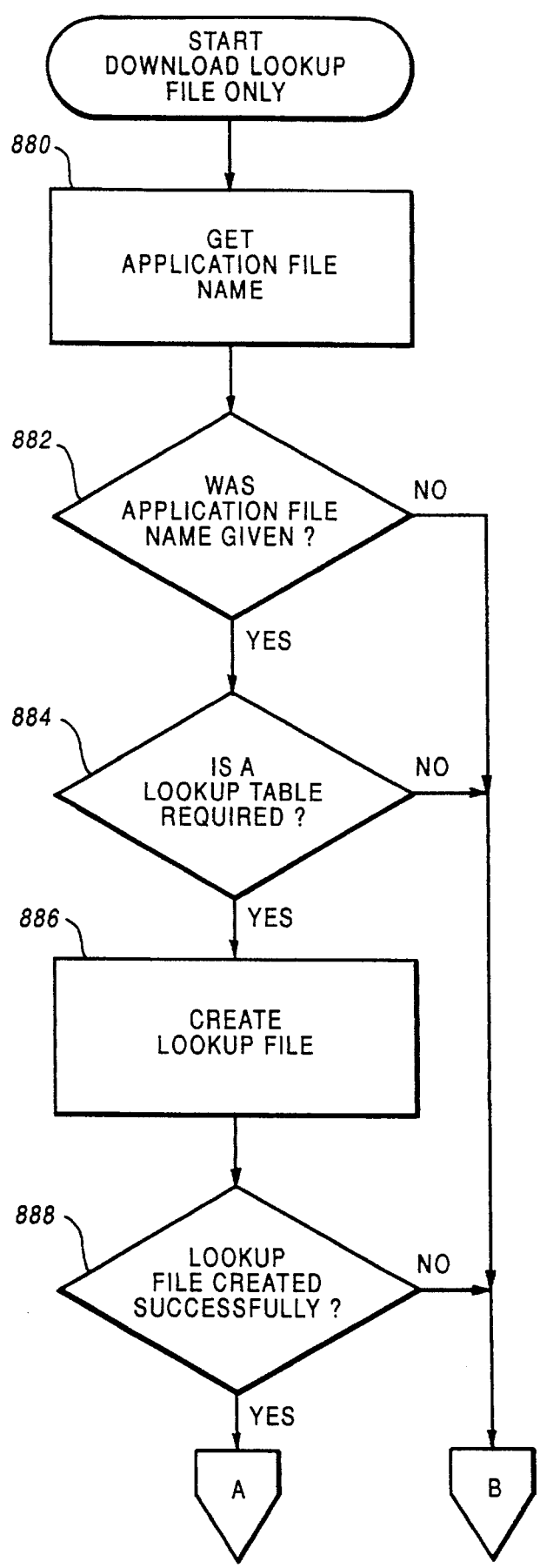
FIGS. 64A–B illustrate a Download Look Up File Only software routine for the Labeler Data Transfer routine.
Figure 64B:
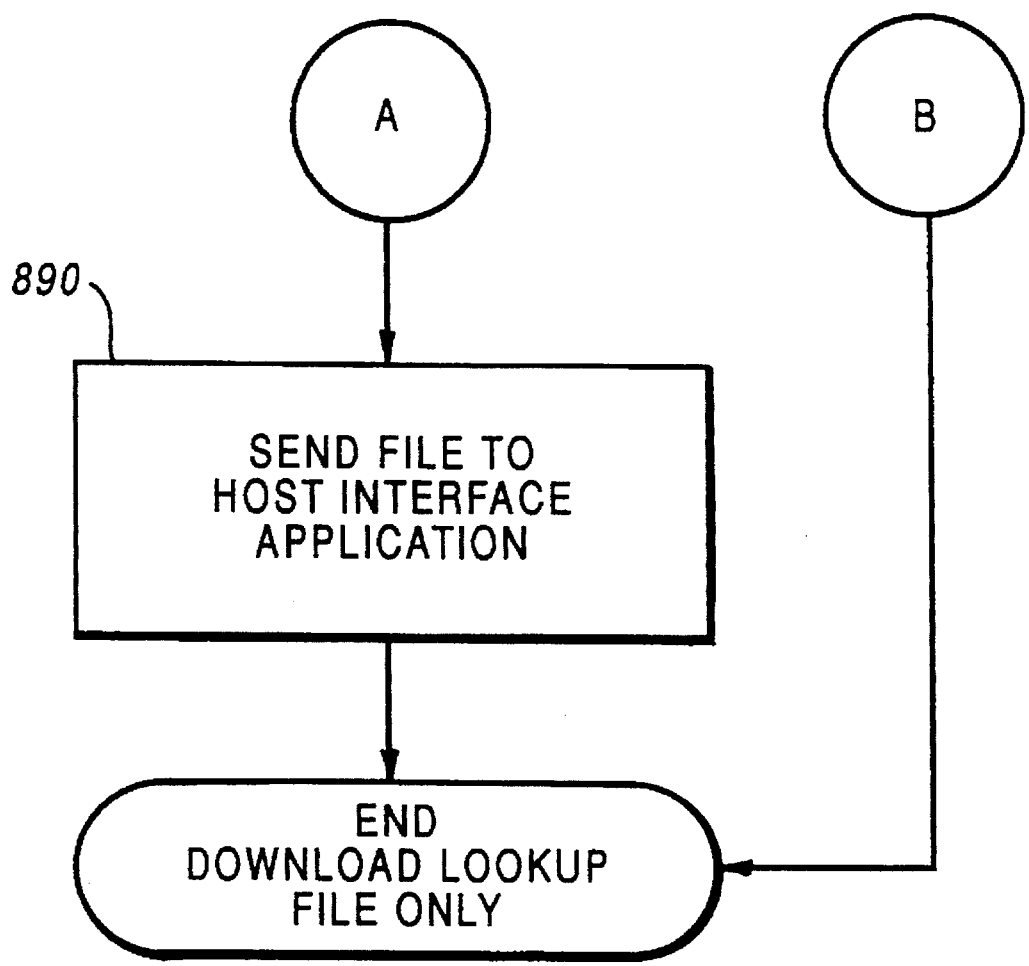
Figure 65A:
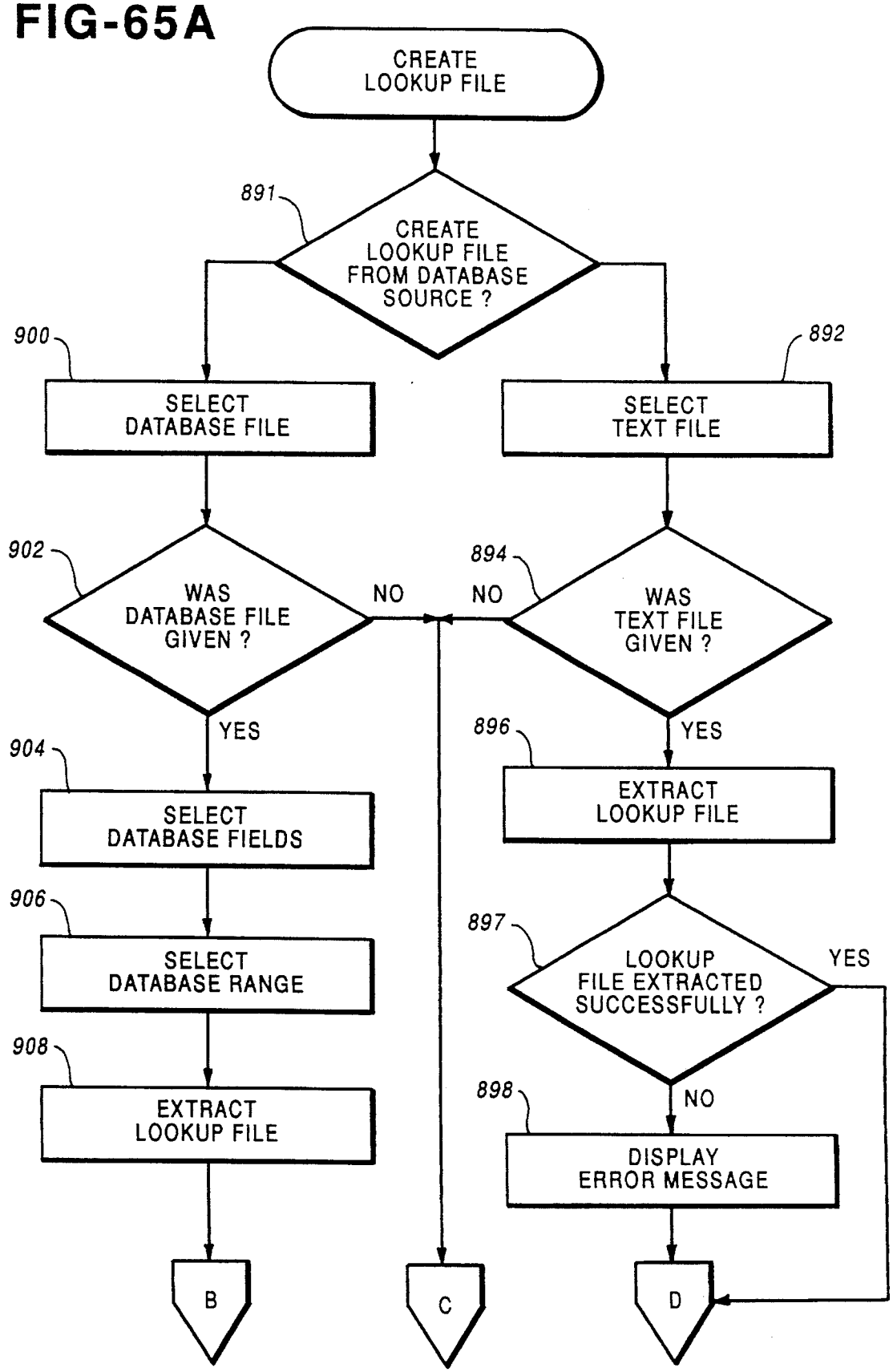
FIGS. 65A–B form a flow chart illustrating a Create Look Up File software routine for the Labeler Data Transfer Packet Handler.
Figure 65B:
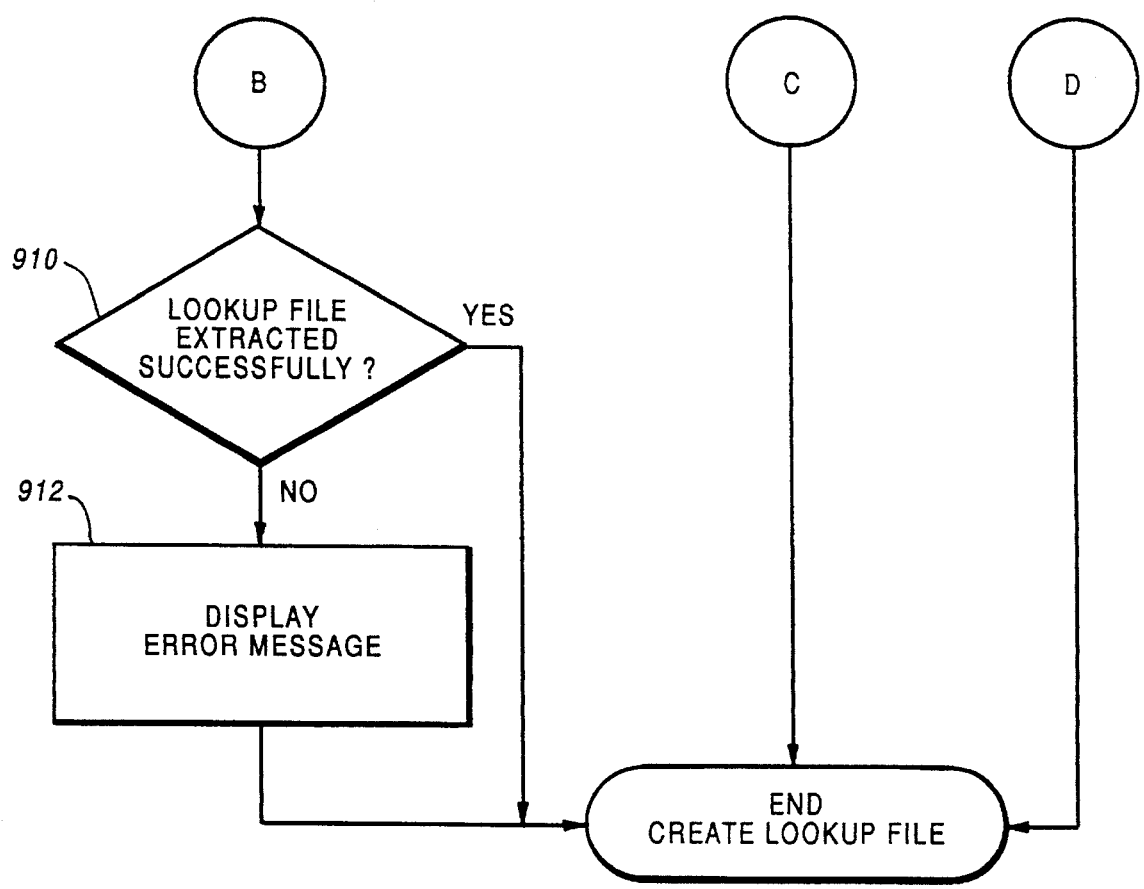

The microprocessor operates in accordance with the flow chart depicted in FIGS. 64A and B to download a lookup table file only. More particularly, at a block 880, the microprocessor gets the application file name specified in the packet handler message and at block 882 determines whether the application file name was given or not. If so, the microprocessor proceeds to block 884 to determine whether a lookup table is required and, if so, the microprocessor at block 886 creates the necessary lookup table as discussed below. At block 888, the microprocessor determines whether the lookup table was created successfully and, if so, the microprocessor proceeds to block 890 to send the lookup table file to the host interface application. A lookup table file is created by the microprocessor 14 in accordance with the flow chart depicted in FIGS. 65A–B as follows. At a block 891, the microprocessor 14 determines whether the lookup table file is to be created from a database source and if not the microprocessor proceeds to block 892 to select a text file. At block 894, the microprocessor determines whether a text file is given and, if so, the microprocessor proceeds to block 896 to extract the lookup table from the text file. At block 897, the microprocessor 14 determines whether the lookup file was successfully extracted and, if not, the microprocessor 14 displays an error message at a block 898. If the microprocessor determines at block 891 that the lookup table is to be created from a database source, the microprocessor proceeds to block 900 to select the database file. At block 902, the microprocessor 14 determines whether a database file was given and, if so, proceeds to block 904 to select the database fields for the lookup table. Thereafter, at a block 906, the microprocessor 14 selects the database range and at a block 908 extracts the lookup table. At a block 910, the microprocessor 14 determines whether the lookup table was extracted successfully and, if not, the microprocessor displays an error message at a block 912.

Figure 66B:
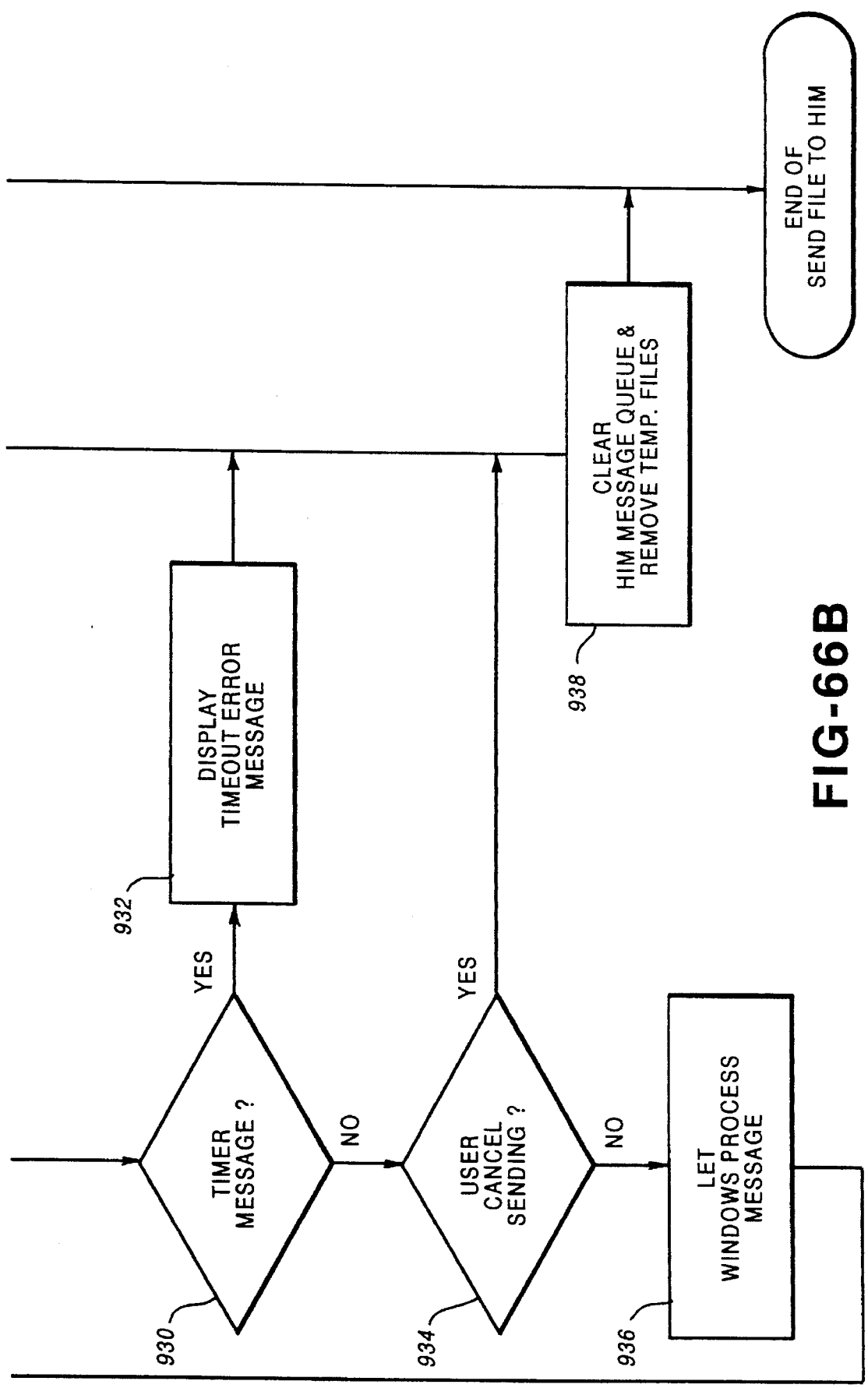

The microprocessor 14 operates in accordance with the flow chart depicted in FIG. 66 to get a message to be sent to the host interface application at a block 914. Thereafter, at block 916, the microprocessor determines whether the message is an initialization message and, if so, proceeds to block 918. At block 918, the microprocessor is extracting a packet of data for the host interface application 16 and sending the extracted packet to the host interface module. At block 920, the microprocessor determines whether there are any more packets and, if so, the microprocessor proceeds back to block 914 to get the next packet. If the microprocessor determines that the message is not an initialization message at block 916, it proceeds to block 924 to determine whether the message is a reply message. If so, the microprocessor proceeds to block 926 to determine whether the message was a successful reply message and, if so, the microprocessor sends the next packet of data to the host interface module at block 918. If the message was not a successful reply message, the microprocessor proceeds to block 928 to display an error message on the display 42. Thereafter, the microprocessor clears the host interface message queue and removes the temporary files. If the microprocessor determines at block 924 that the message was not a reply message, the microprocessor proceeds to block 930 to determine whether the message is a timer message. If so, the microprocessor proceeds to block 932 to display a time out error message, thereafter proceedings to block 938. If the microprocessor determines at a block 934 that the user wants to cancel sending the file, the microprocessor again proceeds to block 938. If not, however, the microprocessor proceeds from block 934 to block 936 to let the operating system process the message.

Figure 67:
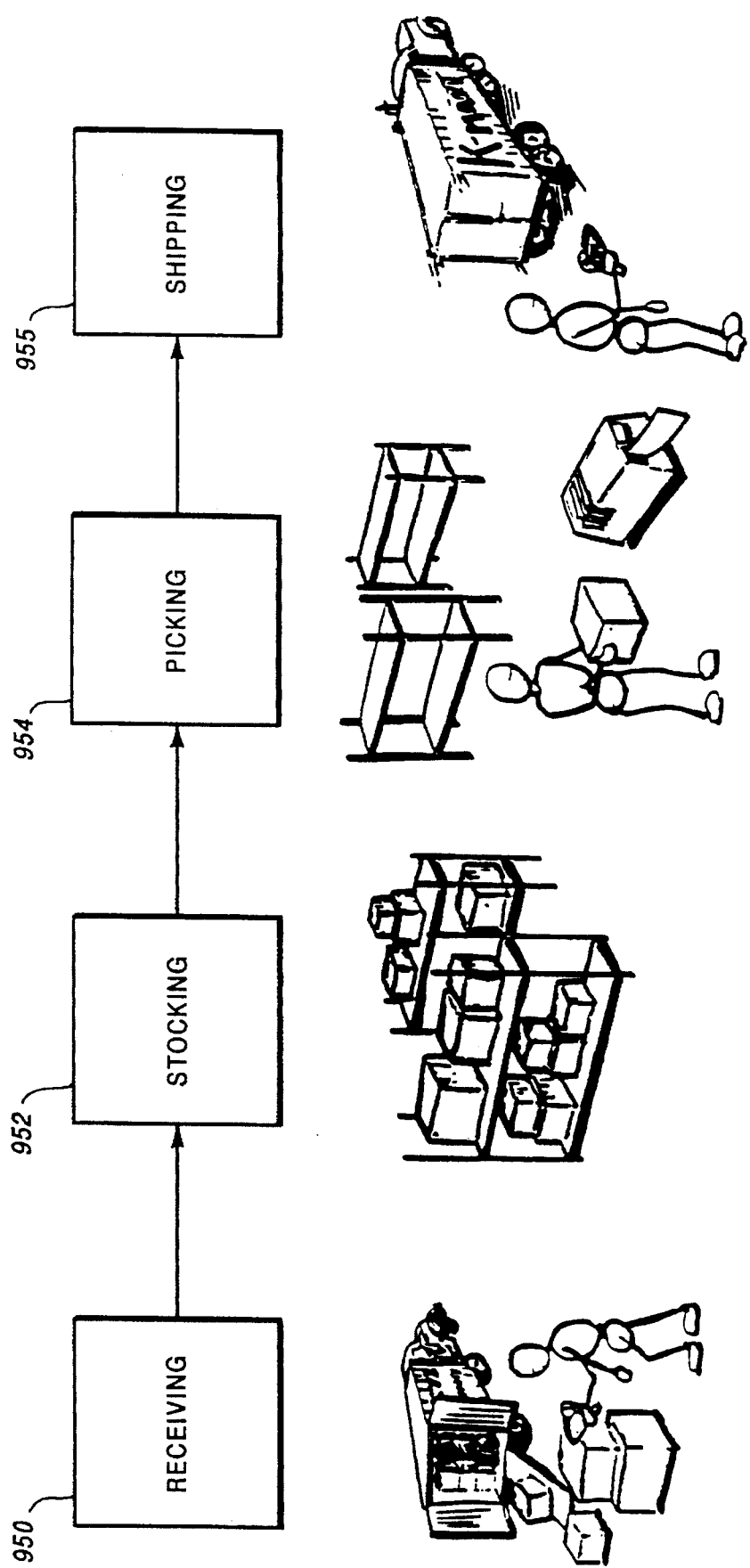
FIG. 67 is a pictorial illustration of a use of the integrated system of the present invention.

The flexibility of the system illustrated in FIG. 1 will now be described for an example depicted in FIG. 67. At a receiving station, the labeler 32 is used for data collection and identification. More particularly, the local processing system downloads an application and lookup file to the labeler 32 at the receiving station wherein the application is used to control the labeler to process an order that has been received and to collect data regarding the received items in a data collect file for uploading to the local processing system. At the receiving station, a user enters header information for the data collect file of the labeler 32 via the labeler's keyboard, this information including, for example, the user's operator number, the date, a purchase order number, and a crate number, for example. Thereafter, the user enters the part number for a box by scanning a label on the box. The labeler 32 then gets the quantity value stored in the lookup table for the entered part number and stores this information in the data collect file of the labeler. The user can then generate a label with the desired information for inventory purposes and/or to generate a label to be applied to a receiving document identifying the items received. After the order is processed, the labeler 32 automatically or in response to a user input uploads the header and line item data collected in the data collect file of the labeler to the local processing system 10. The local processing system 10 uses the information to update inventory records with the header and line item data from the labeler's data collect file. This information is used for stocking purposes. When a purchase order is to be filled, as received from a host processing system 22, such as at the main frame computer 30 of the distribution center, the host computer 30 downloads the purchase order information as a DCPS job message to the local processing system. The local processing system processes the DCPS job by, for example, printing a label on the bar code printer 28 so that the label can be attached to a carton or pallet, this label typically being a larger label than is capable of being generated by the labeler 32. At shipping 955, the user can then use the labeler 32 to scan the label generated by the bar code printer 28 on the carton to be shipped so as to collect this information in a data collect file for uploading to the local system 10 so as to update the database inventory records. This is just one example illustrating the use of the system of the present invention for collecting data, printing labels and/or tags, updating data stored at the local processing system, etc.

Modifications and variations of the present invention are possible in light of the above teachings. Thus, it is to be understood that, within the scope of the appended claims, the invention may be practiced otherwise than as described herein above.

We claim:

1. A host communication message manager for use in a local bar code data processing system having a memory for storing data, said local processing system being coupled to at least one bar code printer and being in communication with, via said manager, a labeler having data collection capabilities and a host processing system, comprising:

means for receiving data collected by said labeler, said receiving means storing said data in said memory to update said memory;

means for receiving a message from said host processing system, said message including information identifying data; and one or more allowable operations to be performed with respect to said data, said allowable operations including a data print initiation operation to initiate the printing of data by said bar code printer; and means for implementing the allowable operations identified in a received message including said data print initiation operation.

2. A host communication message manager as recited in claim 1, further including means for downloading a data collection and label printing program application to said labeler to allow said labeler to collect data and to print labels.

3. A host communication message manager as recited in claim 1, further including means for downloading a data base table to said labeler, said table associating bar code data with other data.

4. A host communication message manager as recited in claim 1, further including means for uploading data collected by said labeler and stored in said memory to said host processing system.

5. A host communication message manager as recited in claim 1, wherein said allowable operations include at least one data modification operation to modify data stored in said memory.

6. A host communication message manager as recited in claim 5, wherein said memory stores a data table having a plurality of data records, each record having a plurality of associated data fields and said implementing means includes means for implementing an operation for inserting a new data record into said table.

7. A host communication message manager as recited in claim 5, wherein said memory stores a data table having a plurality of data records, each record having a plurality of associated data fields and said implementing means includes means for implementing an operation for selecting data records from said table to be uploaded to said host processing system.

8. A host communication message manager as recited in claim 5, wherein said memory stores a plurality of data tables, each table having a plurality of data records, each record having a plurality of associated data fields and said implementing means includes means for implementing an operation for selecting a data table to be uploaded to said host processing system.

9. A host communication message manager as recited in claim 5, wherein said memory stores a data table having a plurality of data records, each record having a plurality of associated data fields and said implementing means includes means for implementing an operation for updating one or more records in said data table.

10. A host communication message manager as recited in claim 5, wherein said memory stores a data table having a plurality of data records, each record having a plurality of associated data fields and said implementing means includes means for implementing an operation for searching for records in said table based upon search criteria included in a received message and for updating records found in said search to satisfy said search criteria.

11. A host communication message manager as recited in claim 5, wherein said memory stores a data table having a plurality of data records, each record having a plurality of associated data fields and said implementing means includes means for implementing an operation for deleting a data table in said memory.

12. A host communication message manager as recited in claim 5, wherein said memory stores a data table having a plurality of data records, each record having a plurality of associated data fields and said implementing means includes means for implementing an operation for deleting a data record from said table.

13. A host communication message manager as recited in claim 5, wherein said memory stores data for a job including header data and line item data and said implementing means includes means for implementing an operation for adding data for a job to said local processing system.

14. A host communication message manager as recited in claim 5, wherein said memory stores data for a job including header data and line item data and said implementing means includes means for implementing an operation for replacing data for a job stored in said memory with new data for said job.

15. A host communication message manager as recited in claim 5, wherein said memory stores data for a job including header data and line item data and said implementing means includes means for implementing an operation for deleting data for a job from said memory.

16. A host communication message manager as recited in claim 5, wherein said memory stores data for a job including header data and line item data and said implementing means includes means for implementing an operation for deleting selected data from a job.

17. A host communication message manager as recited in claim 5, wherein said memory stores data for a job including header data and line item data and said implementing means includes means for implementing an operation for reprinting a job stored in said memory.

18. A host communication message manager as recited in claim 5 wherein said memory stores alphanumeric string data in files and said implementing means includes means for implementing an operation for writing data to said file.

19. A host communication message manager as recited in claim 5 wherein said memory stores alphanumeric string data in files and said implementing means includes means for implementing an operation for uploading a file to said host processing system.

20. A host communication message manager as recited in claim 5 wherein said memory stores alphanumeric string data in files and said implementing means includes means for implementing an operation for deleting a file from said memory.

21. A host communication message manager as recited in claim 1 wherein said labeler data collect receiving means includes a host interface software module responsive to a message received from said labeler including said collected data to route said message to a message handler for storing said collected data in said memory.

22. A host communication message manager as recited in claim 1 wherein said implementing means includes a plurality of message handlers each for handling one or more of said allowable operations host message receiving means includes a host interface software module responsive to a message received from said host processing system to route said message to one of said message handler means.

23. A host communication message manager as recited in claim 1 wherein said user selectable allowable operations wherein at least a portion of said data stored in said memory includes a plurality of fields and said fields are identified by associated names to enable a new field of data to be added to a group of data fields without requiring the identity of any field in said group to be changed.

24. A host communication message manager for use in a local bar code data processing system having a memory for storing data, said local processing system being in communication, via said manager, with a labeler having data collection capabilities and a host processing system comprising:

means for receiving data collected by said labeler, said collected data including header data and line item data and said receiving means storing said data in said memory to update said memory;

means for receiving a message from said host processing system, said message identifying data and one or more allowable operations to be performed with respect to said data, said allowable operations including an operation for transmitting selected header data and line item data received from said labeler and stored in said memory to said host processing system; and means for implementing the allowable operations identified in a received message including said data transmission operation.

25. A host communication message manager as recited in claim 24 wherein said local processing system in coupled to a bar code printer and said implementing means includes means for implementing an operation to initiate the printing of a job including stored header data and line item data.

26. A host communication message manager as recited in claim 24, further including means for downloading a data collection and label printing program application to said labeler to allow said labeler to collect data and to print labels.

27. A host communication message manager as recited in claim 24, further including means for downloading a data base table to said labeler, said table associating bar code data with other data.

28. A host communication message manager as recited in claim 24, wherein said allowable operations include at least one data modification operation to modify data stored in said memory.

29. A host communication message manager as recited in claim 24, wherein said memory stores a data table having a plurality of data records, each record having a plurality of associated data fields and said implementing means includes means for implementing an operation for inserting a new data record into said table.

30. A host communication message manager as recited in claim 24, wherein said memory stores a data table having a plurality of data records, each record having a plurality of associated data fields and said implementing means includes means for implementing an operation for updating one or more records in said data table.

31. A host communication message manager as recited in claim 24, wherein said memory stores a data table having a plurality of data records, each record having a plurality of associated data fields and said implementing means includes means for implementing an operation for searching for records in said table based upon search criteria included in a received message and for updating records found in said search to satisfy said search criteria.

32. A host communication message manager as recited in claim 24, wherein said memory stores a data table having a plurality of data records, each record having a plurality of associated data fields and said implementing means includes means for implementing an operation for deleting a data table in said memory.

33. A host communication message manager as recited in claim 24, wherein said memory stores a data table having a plurality of data records, each record having a plurality of associated data fields and said implementing means includes means for implementing an operation for deleting a data record from said table.

34. A host communication message manager as recited in claim 24 wherein said user selectable allowable operations wherein at least a portion of said data stored in said memory includes a plurality of fields and said fields are identified by associated names to enable a new field of data to be added to a group of data fields without requiring the identity of any field in said group to be changed.

35. A host communication message manager for use in a local bar code data processing system having a memory for storing data, said local processing system being coupled with a bar code printer and being in communication, via said manager, with a labeler having data collection capabilities and a host processing system, comprising:

means for receiving data collected by said labeler, said collected data being of a predetermined type and said receiving means storing said data in said memory to update said memory;

means for receiving a message from said host processing system, said message identifying data and one or more allowable operations to be performed with respect to said data;

means responsive to said host message receiving means for implementing said allowable operations, said allowable operations including an operation for transmitting selected data received from said labeler and stored in said memory to said host processing system and an operation for initiating the printing of job data stored in said memory on said bar code printer, said print job data being of said same predetermined type as said labeler collected data to allow said host processing system to initiate the printing of data collected by said labeler on said bar code printer.

36. A host communication message manager as recited in claim 35 wherein said allowable operations include an operation for manipulating data stored in said memory including data collected by said labeler.

37. A host communication message manager as recited in claim 35 wherein said allowable operations include an operation for deleting job data from said memory.

38. A host communication message manager as recited in claim 35 wherein said allowable operations include an operation for deleting selected data from said memory.

39. A host communication message manager as recited in claim 35 wherein said allowable operations include an operation for initiating the reprinting of job data stored in said memory.

40. A host communication message manager as recited in claim 35 wherein said user selectable allowable operations wherein at least a portion of said data stored in said memory includes a plurality of fields and said fields are identified by associated names to enable a new field of data to be added to a group of data fields without requiring the identity of any field in said group to be changed.

41. A host communication message manager for use in a local bar code data processing system having a memory for storing data, said local processing system being coupled to at least one bar code printer and being, via said manager, in communication with at least one host processing system at a location remote from said local processing system to allow said host processing system to control maintenance and printing of data stored in the memory of said local processing system from said remote location comprising:

message handler means responsive to a message received from said remote host processing system for performing one or more allowable operations, identified in said message, on data, identified in said message, said allowable operations including a data modification operation to modify data stored in said memory, a data transfer operation to upload data to said host processing system from said local processing system and a data print initiation operation to initiate the printing of data by said bar code printer; and means for receiving a message from said host processing system, said receiving means coupling a received message to said message handler means for processing.

42. A host communication message manager as recited in claim 41 wherein said message handler means includes a plurality of message handlers each performing one or more of said allowable operations on data of different types and said receiving means includes a message router for routing each received message to a particular message handler as indicated by information contained in said message.

43. A host communication message manager as recited in claim 41 wherein said memory stores a data table having a plurality of data records, each record having a plurality of associated data fields and said message handler means includes a data table handler.

44. A host communication message manager as recited in claim 43 wherein said data table handler includes means responsive to operation information in a message for inserting a new data record in said table.

45. A host communication message manager as recited in claim 43 wherein said data table handler includes means responsive to operation information in a message for selecting data records from said table to be uploaded to said host processing system.

46. A host communication message manager as recited in claim 43 wherein said data table handler includes means responsive to operation information in a message for selecting a data table to be uploaded to said host processing system.

47. A host communication message manager as recited in claim 43 wherein said data table handler includes means responsive to operation information in a message for updating one or more records in said data table.

48. A host communication message manager as recited in claim 43 wherein said data table handler includes means responsive to operation information in a message to search for records in said table based upon search criteria included in said message and for updating records found in said search to satisfy said search criteria.

49. A host communication message manager as recited in claim 43 wherein said data table handler includes means responsive to operation information in a message for deleting a data table from said memory.

50. A host communication message manager as recited in claim 43 wherein said data table handler includes means responsive to operation information in a message for deleting a data record from said table.

51. A host communication message manager as recited in claim 41 wherein said memory stores print job data, said data for a print job including header data and line item data and said message handler means includes a job handler.

52. A host communication message manager as recited in claim 51 wherein said job handler includes means responsive to operation information in said message and to data in said message for adding a print job to said local processing system.

53. A host communication message manager as recited in claim 51 wherein said job handler includes means responsive to operation information in said message and to data in said message for a new print job for replacing an old print job with a new print job.

54. A host communication message manager as recited in claim 51 wherein said job handler includes means responsive to operation information in said message for initiating the printing of a print job.

55. A host communication message manager as recited in claim 51 wherein said job handler includes means responsive to operation information in said message and to data for a print job in said message for storing a print job in the memory of said local processing system and means responsive to operation information in said message for initiating the printing of a stored print job.

56. A host communication message manager as recited in claim 51 wherein said job handler includes means responsive to operation information in said message for deleting a print job from said memory.

57. A host communication message manager as recited in claim 51 wherein said job handler includes means responsive to operation information in said message for deleting selected data from a print job.

58. A host communication message manager as recited in claim 51 wherein said job handler includes means responsive to operation information in said message for uploading a print job from said local processing system to said host processing system.

59. A host communication message manager as recited in claim 51 wherein said job handler includes means responsive to operation information in said message for reprinting a print job stored in said memory.

60. A host communication message manager as recited in claim 41 wherein said memory stores alphanumeric string data in files and said message handler means includes a file handler.

61. A host communication message manager as recited in claim 60 wherein said file handler includes means responsive to operation information in said message and to data in said message for writing said data to said file.

62. A host communication message manager as recited in claim 60 wherein said file handler includes means responsive to operation information in said message for uploading a file to said host processing system from said local processing system.

63. A host communication message manager as recited in claim 60 wherein said file handler includes means responsive to operation information in said message for deleting a file from said memory.

64. A host communication message manager as recited in claim 41 wherein said local processing system includes a display means for displaying information to a user including a menu of selectable operations, said message handler means includes a plurality of message handlers each for performing one or more of said allowable operations and said receiving means includes means for generating a dynamic menu for display on said display means, said dynamic menu listing selecting operations in accordance with the message handlers included in said data maintenance and print controller.

65. A host communication message manager as recited in claim 41 wherein said local processing system includes a display for displaying information to a user including user selectable allowable operations and input means actuable by a user to allow a user to select an allowable operation to be performed on selected data stored in said memory, said receiving means being responsive to a user selected operation and data to generate a host message coupled to said message handler means to perform said operation on said data.

66. A host communication message manager as recited in claim 65 wherein said user selectable allowable operations include the uploading of an alphanumeric string table stored in said memory to said host processing system.

67. A host communication message manager as recited in claim 65 wherein said user selectable allowable operations include the uploading of job data stored in said memory to said host processing system, said job data including header data and line item data.

68. A host communication message manager as recited in claim 65 wherein said user selectable allowable operations include the uploading of a data table stored in said memory to said host processing system.

69. A host communication message manager as recited in claim 65 wherein said user selectable allowable operations include the uploading of selected data records in a data table stored in said memory to said host processing system.

70. A host communication message manager as recited in claim 65 wherein said user selectable allowable operations include the printing and reprinting of job data stored in said memory, said job data including header data and line item data.

71. A host communication message manager as recited in claim 65 wherein said user selectable allowable operations wherein at least a portion of said data stored in said memory includes a plurality of fields and said fields are identified by associated names to enable a new field of data to be added to a group of data fields without requiring the identity of any field in said group to be changed.

72. A host communication message manager as recited in claim 41 wherein said host processing system includes a hand held data collector.

73. A host communication message manager as recited in claim 41 wherein said host processing system includes a hand held labeler with data collection capabilities.

74. A host communication message manager as recited in claim 41 wherein said local processing system is in communication with a plurality of remote host processing systems.

75. A host communication message manager as recited in claim 74 wherein at least one of said host processing systems includes a hand held data collector.

76. A host communication message manager as recited in claim 74 wherein at least one of said host processing systems includes a hand held labeler with data collection capabilities.

77. A host communication message manager as recited in claim 74 wherein at least one of said host processing systems includes a mainframe computer at a distribution center.

78. A host communication message manager as recited in claim 41 including journalling means responsive to said message handler means for storing information in said memory representative of the disposition of a message coupled thereto.

79. A host communication message manager as recited in claim 41 wherein said memory stores data for a print job, said data including header field data and line item field data and said memory stores a configuration file for a print job defining the layout of each data field for a print job, said configuration file including information identifying the number of header fields for said print job, the number of line item fields for said print job and a group of fields to be repeated a number of times.

* * * * *